United States Patent
Alidori et al.

(10) Patent No.: US 12,217,055 B2
(45) Date of Patent: Feb. 4, 2025

(54) METHOD AND DEVICE FOR VARIABLE PRECISION COMPUTING

(71) Applicant: Commissariat à l'Energie Atomique et aux Energies Alternatives, Paris (FR)

(72) Inventors: Riccardo Alidori, Grenoble (FR); Andrea Bocco, Grenoble (FR)

(73) Assignee: Commissariat à l'Energie Atomique et aux Energies Alternatives, Paris (FR)

(*) Notice: Subject to any disclaimer, the term of this patent is extended or adjusted under 35 U.S.C. 154(b) by 20 days.

(21) Appl. No.: 18/330,508

(22) Filed: Jun. 7, 2023

(65) Prior Publication Data
US 2023/0401059 A1 Dec. 14, 2023

(30) Foreign Application Priority Data
Jun. 10, 2022 (FR) ..................................... 2205595

(51) Int. Cl.
*G06F 9/30* (2018.01)
(52) U.S. Cl.
CPC ...... *G06F 9/30025* (2013.01); *G06F 9/30043* (2013.01); *G06F 9/30101* (2013.01)
(58) Field of Classification Search
CPC ............. G06F 9/30025; G06F 9/30043; G06F 9/30101
See application file for complete search history.

(56) References Cited

U.S. PATENT DOCUMENTS

| | | | | |
|---|---|---|---|---|
| 5,805,475 A | * | 9/1998 | Putrino | G06F 9/30014 708/204 |
| 7,509,366 B2 | * | 3/2009 | Hansen | G06F 15/7842 708/501 |
| 10,825,127 B2 | * | 11/2020 | Mellempudi | G06F 7/501 |
| 11,966,740 B2 | * | 4/2024 | Gore | G06F 7/483 |
| 2011/0004644 A1 | * | 1/2011 | Henry | G06F 9/30014 708/231 |

(Continued)

OTHER PUBLICATIONS

Preliminary Search Report for French Application No. 2205595 dated Jan. 11, 2023, 2 pages.
(Continued)

*Primary Examiner* — Corey S Faherty
(74) *Attorney, Agent, or Firm* — Jordan IP Law, LLC

(57) ABSTRACT

The present disclosure relates to a floating-point computation circuit comprising: an internal memory (104, 114) storing one or more floating-point values in a first format; status registers (124) defining a plurality of floating-point number format types associated with corresponding identifiers, each format type indicating at least a maximum size (BIS, MBB); and a load and store unit (108, 118) for loading floating-point values from and storing floating-point values to an external memory (120, 122), the load and store unit (108, 118) being configured: to receive, in relation with a first store operation, a first floating-point value from the internal memory (104, 114) and a first of said identifiers; and to convert the first floating-point value from the first format to a first external memory format having a maximum size (BIS, MBB) defined by the floating-point number format type designated by the first identifier.

17 Claims, 23 Drawing Sheets

(56) References Cited

U.S. PATENT DOCUMENTS

2020/0285468 A1* 9/2020 Bocco .................... G06F 12/04
2023/0401059 A1* 12/2023 Alidori .............. G06F 9/30025

OTHER PUBLICATIONS

Bocco, Andrea. "A variable precision hardware acceleration for scientific computing." PhD diss., Université de Lyon, 2020.

"IEEE Standard for Floating-Point Arithmetic," in IEEE Std 754-2019 (Revision of IEEE 754-2008), vol., No., pp. 1-84, Jul. 22, 2019, doi: 10.1109/IEEESTD.2019.8766229.

Bocco, Andrea, Yves Durand, and Florent De Dinechin. "Hardware support for UNUM floating point arithmetic." In 2017 13th Conference on Ph.D. Research in Microelectronics and Electronics (Prime), pp. 93-96. IEEE, 2017.

Gustafson, John L. The end of error: Unum computing. CRC Press, 2017.

Gustafson, John L., and Isaac T. Yonemoto. "Beating floating point at its own game: Posit arithmetic." Supercomputing frontiers and innovations 4, No. 2 (2017): 71-86.

De Dinechin, Florent, Luc Forget, Jean-Michel Muller, and Yohann Uguen. "Posits: the good, the bad and the ugly." In Proceedings of the Conference for Next Generation Arithmetic 2019, pp. 1-10. 2019.

Bocco, Andrea, Yves Durand, and Florent de Dinechin. "Dynamic precision numerics using a variable-precision UNUM type I Hw coprocessor." In 2019 IEEE 26th Symposium on Computer Arithmetic (Arith), pp. 104-107. IEEE, 2019.

Bocco, Andrea, Yves Durand, and Florent De Dinechin. "SMURF: Scalar multiple-precision unum risc-V floating-point accelerator for scientific computing." In Proceedings of the Conference for Next Generation Arithmetic 2019, pp. 1-8. 2019.

Bocco, Andrea, Tiago T. Jost, Albert Cohen, Florent de Dinechin, Yves Durand, and Christian Fabre. "Byte-aware floating-point operations through a UNUM computing unit." In 2019 IFIP/IEEE 27th International Conference on Very Large Scale Integration (VLSI-SoC), pp. 323-328. IEEE, 2019.

* cited by examiner

A | 0 | 1 | 1 | 1 | 0 | 1 | 1 | 1 | 0 | 1 | 1 |

$+ \quad 16^{+2} \quad \times \quad 2^3 \quad \times \quad (1+11/16) = 3456.0$

B | 0 | 1 | 1 | 1 | 1 | 0 | 0 | 1 | 0 | 1 | 1 |

$+ \quad 16^{+3} \quad \times \quad 2^0 \quad \times \quad (1+11/16) = 6912.0$

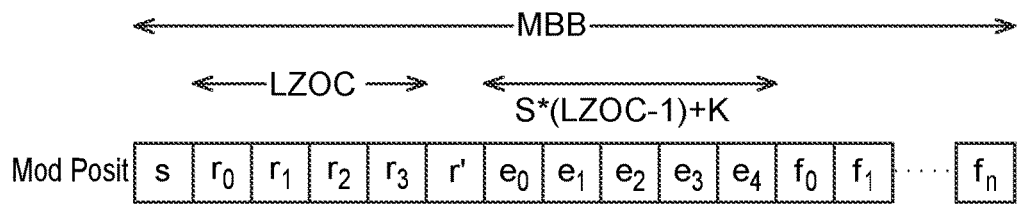
Fig. 13
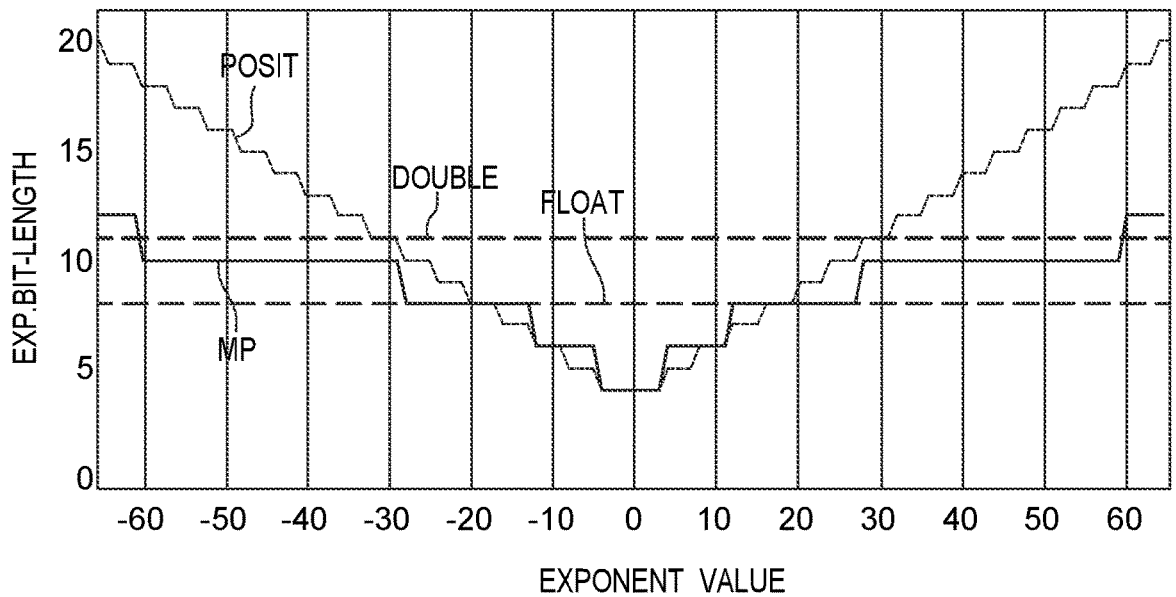
Fig. 14
Fig. 15

| 25 24 23 | | 21 20 | 17 16 | 14 13 | 10 9 | 7 6 | 0 |
|---|---|---|---|---|---|---|---|
| unused (38) | RND | $D_{ESS}$ (3) | $D_{FSS}$ (4) | $S_{ESS}$ (3) | $S_{FSS}$ (4) | WGP (3) | MBB (7) |

| | 63 | 47 | 31 | 23 | 18 | 15 | 0 |
|---|---|---|---|---|---|---|---|
| IL08 | 0000000--0 | OTHER | ES | 0s | RND | BIS | |
| | | 16 | 8 | 5 | 3 | 16 | |
| UNUM | 1100000--0 | OTHER | ESS | FSS | RND | BIS | |
| PSTD | 1010000--0 | OTHER | ES | 0s | RND | BIS | |
| PCUST | 1001000--0 | OTHER | ES | DYN | RND | BIS | |
| NCP | 1000100--0 | OTHER | IEEE_ES_M1 | ES_POSIT | RND | BIS | |
| MP | 1000010--0 | OTHER | K | S | RND | BIS | |

Fig. 19B

| IL08 | 0000000--000 | OTHER | ES | 0s | RND | BIS |
|---|---|---|---|---|---|---|
| | 63   47 | 47   31 | 31   23 | 23   18 | 18   15 | 15   0 |
| | 16 | 16 | 8 | 5 | 3 | 16 |

| IL08 | 0000000--001 | OTHER | ESS | 0s | RND | BIS |
|---|---|---|---|---|---|---|

| IL08 | 0000000--010 | OTHER | ES | 0s | RND | BIS |
|---|---|---|---|---|---|---|

| IL08 | 0000000--011 | OTHER | ES | 0s | RND | BIS |
|---|---|---|---|---|---|---|

| IL08 | 0000000--100 | OTHER | ES | 0s | RND | BIS |
|---|---|---|---|---|---|---|

| IL08 | 0000000--101 | OTHER | ES | 0s | RND | BIS |
|---|---|---|---|---|---|---|

Fig. 19C

METHOD AND DEVICE FOR VARIABLE PRECISION COMPUTING

FIELD

The present disclosure relates generally to the field of computing, and in particular to a method and device for computing using a floating-point representation having variable precision.

BACKGROUND

The IEEE 754-2008 standard defines a Floating-point (FP) format according to which numbers are represented using a fixed number of bits, most commonly 16, 32, 64 or 128 bits, although non-binary numbers and numbers larger than 128 bits are also supported.

A drawback of the IEEE 754-2008 FP representation is that, due to the discrete nature of the bit lengths, computations based on FP numbers can be affected by computational errors such as rounding errors, cancellation errors and absorption errors.

Cancellation errors occur when a FP number having a very large value is subtracted from another FP number having a very large value, the two FP numbers being relatively close in value to each other, but not equal. In view of the precision associated with these large FP numbers, the subtraction outputs zero.

Absorption errors occur when a FP number having a very small value is added or subtracted with/from a FP number having a very large value, and in view of the precision associated with the very large FP number, the addition or subtraction does not result in any modification of the large FP number.

The accumulation of rounding, cancellation and absorption errors can quickly lead to very significant inaccuracies in the computation.

Variable precision (VP) computing, also known in the art as multiple precision, trans precision and controlled precision computing, provides a means for obtaining improvements in terms of precision where needed, thereby reducing computational errors. VP computing is particularly relevant for solving problems that are not very stable numerically, or when particularly high precision is desired at some points of the computation.

VP computing is based on the assumption that each variable is fine-tuned in its length and precision by the programmer, optimizing the algorithm error, and/or latency and/or memory footprint depending on the running algorithm requirements. Examples of VP formats that have been proposed include the Universal NUMber (UNUM) format, and the Posit format.

VP computing solutions generally involve the use of a processing unit, which performs operations on VP floating-point values. One or more memories, such as cache memory and/or main memory, are used to store the results of the floating-point computations, as well as intermediate results. A load and store unit (LSU) is often employed as an interface between the FPU and the memory.

There is, however, a challenge in providing an LSU and/or rounding solution permitting FP formats to be modified between internal and external memories with relatively high flexibility and relatively low complexity.

SUMMARY

According to one aspect, there is provided a floating-point computation circuit comprising: an internal memory storing one or more floating-point values in a first format; status registers defining a plurality of floating-point number format types associated with corresponding identifiers, each format type indicating at least a maximum size; and a load and store unit for loading floating-point values from an external memory to the internal memory and storing floating-point values from the internal memory to the external memory, the load and store unit being configured:
to receive, in relation with a first store operation, a first floating-point value from the internal memory and a first of said identifiers; and
to convert the first floating-point value from the first format to a first external memory format having a maximum size defined by the floating-point number format type designated by the first identifier.

According to one embodiment, each maximum size is designated with a bit granularity.

According to one embodiment, a floating-point number format type designated by a second of the identifiers corresponds to a second external memory format different to the first external memory format, the load and store unit comprising:
a first internal to external format conversion circuit configured to convert floating-point values from the first format to the first external memory format; and
a second internal to external format conversion circuit configured to convert floating-point values from the first format to the second external memory format.

According to one embodiment, the load and store unit further comprises:
a first demultiplexer configured to selectively supply the at least one floating-point value to a selected one of the first and second internal to external format conversion circuits; and
a first multiplexer configured to selectively supply the converted value generated by the first or second internal to external format conversion circuit to the external memory, wherein the selections made by first demultiplexer and first multiplexer are controlled by a first common control signal.

According to one embodiment, the load and store unit is configured to supply the at least one floating-point value to both of the first and second internal to external format conversion circuits, the load and store unit further comprising a control circuit configured to selectively enable either or both of the first and second internal to external format conversion circuits in order to select which is to perform the conversion.

According to one embodiment, the load and store unit further comprises:
a first external to internal format conversion circuit configured to convert at least one variable precision floating-point value loaded from the external memory from the first external memory format to the first format, and to store the result of the conversion to the internal memory; and
a second external to internal format conversion circuit configured to convert at least one further value loaded from the external memory from the second external memory format to the first format, and to store the result of the conversion to the internal memory.

According to one embodiment, the first external memory format is a Custom Posit variable precision floating-point format comprising, for representing a number, a sign bit, a regime bits field filled with bits of the same value, the length of the regime bits field indicating a scale factor of the number and being bounded by an upper limit, an exponent part of at least one bit and a fractional part of at least one bit, and wherein the load and store unit comprises circuitry for computing the upper limit.

According to one embodiment, the first external memory format is of a type, such as the Not Contiguous Posit variable precision floating-point format, comprising, for representing a number, either:
- a flag bit having a first value, and a Posit or Custom Posit format comprising a sign bit, a regime bits field filled with bits of the same value, the length of the regime bits field indicating a scale factor of the number and being bounded by an upper limit, an exponent part of at least one bit and a fractional part of at least one bit; or
- the flag bit having a second value, and a default format representing the number, the default format having a sign bit, an exponent part of at least one bit and a fractional part of at least one bit;

wherein the load and store unit comprises circuitry for computing an exponent size based for example on the Custom Posit format, and comparing the exponent size with an exponent size of the default format, and setting the value of the flag bit accordingly.

According to one embodiment, the first external memory format is a Modified Posit variable precision floating-point format comprising a sign bit, a regime bits field filled with bits of the same value, a length lzoc of the regime bits field indicating a scale factor of the number and being bounded by an upper limit, an exponent part of at least one bit and a fractional part of at least one bit, wherein the load and store unit comprises circuitry for computing the length lzoc such that the exponent exp of the number is encoded by the following equation:

$$\exp = \begin{cases} +\left[\left(\sum_{i=1}^{lzoc} 2^{i+(K-2)+((S-1)\cdot(i-2))}\right) - 2^{(K-1)+((S-1)\cdot(i-2))}\right] + e & \text{if positive exponent} \\ -\left[\left(\sum_{i=1}^{lzoc} 2^{i+(K-1)+((S-1)\cdot(i-1))}\right)\right] + e & \text{if negative exponent} \end{cases}$$

where K represents the minimal exponent length when the size of the regime bits field equals one bit, and S represents the regime bits increment gap.

According to one embodiment, the first external memory format is a first variable precision floating-point format, and the second external memory format is a second variable precision floating-point format different to the first variable precision floating-point format.

According to one embodiment, the first variable precision floating-point format and/or the second variable precision floating-point format supports both unbiased and biased exponent encoding.

According to one embodiment, the floating-point number format type designated by the first identifier corresponds to a first external memory format, a floating-point number format type designated by a second of the identifiers corresponds to a second external memory format different to the first external memory format, and a floating-point number format type designated by a third of the identifiers corresponds to a third external memory format different to the first and second external memory formats.

According to one embodiment, the floating-point computation circuit further comprises a floating-point unit configured to perform a floating-point arithmetic operation on at least one floating-point value stored by the internal memory, wherein the floating-point unit comprises the load and store unit or is configured to communicate therewith.

According to a further aspect, there is provided a method of floating-point computation comprising: storing, by an internal memory of a floating-point computation device, one or more floating-point values in a first format; loading, by a load and store unit of a floating-point computation device, floating-point values from an external memory to the internal memory, and storing, by the load and store unit, a first floating-point value from the internal memory to the external memory, wherein the load and store unit is configured to perform said storing by:
- receiving, in relation with a first store operation, the first floating-point value from the internal memory and a first identifier;
- obtaining, from status registers defining a plurality of floating-point number format types associated with corresponding identifiers, at least a maximum size associated with the first identifier; and
- converting the first floating-point value from the first format to an external memory format having a maximum size defined by the floating-point number format type designated by the first identifier.

According to one embodiment, the floating-point number format type designated by the first identifier corresponds to a first external memory format, and the load and store unit is configured to perform said converting by:
- converting, by a first internal to external format conversion circuit, the first floating-point value from the first format to the first external memory format; and wherein the method further comprises:
- receiving, by the load and store unit in relation with a second store operation, a second floating-point value from the internal memory and a second identifier;
- obtaining, from the status registers, at least a maximum size associated with the second identifier; and
- converting, by a second internal to external format conversion circuit, the second floating-point value from the first format to a second external memory format having a maximum size defined by the floating-point number format type designated by the second identifier.

According to one embodiment, the load and store unit is configured to perform said loading by:
- converting, by a first external to internal format conversion circuit, at least one variable precision floating-point value loaded from the external memory from the first external memory format to the first floating-point format and storing the result of the conversion to the internal memory; and
- converting, by a second external to internal format conversion circuit, at least one further value loaded from the external memory from the second external memory format to the first floating-point format, and storing the result of the conversion to the internal memory.

According to one embodiment, the method further comprises performing, by a floating-point unit, a floating-point arithmetic operation on at least one floating-point value stored by the internal memory.

According to a further aspect, there is provided a floating-point computation device comprising: a first floating-point operation circuit comprising a first processing unit configured to perform a first operation on at least one input FP value to generate a result; a first rounder circuit configured to perform a rounding operation on the result of the first operation; and a first control circuit configured to control a bit or byte length applied by the rounding operation of the first rounder circuit, wherein the control circuit is configured to apply a first bit or byte length if the result of the first operation is to be stored to an internal memory of the floating-point computation device to be used for a subsequent operation, and to apply a second bit or byte length, different to the first bit or byte length, if the result of the first operation is to be stored to an external memory.

According to one embodiment, the floating-point computation device further comprises a load and store unit configured to store to memory a rounded number of the second bit or byte length generated by the first rounder circuit, the load and store unit not comprising any rounder circuit.

According to one embodiment, the first floating-point operation circuit comprises the first rounder circuit, and the computation device further comprises: a second floating-point operation circuit comprising a second processing unit configured to perform a second operation on at least one input FP value to generate a result and a second rounder circuit configured to perform a second rounding operation on the result of the second operation; and a second control circuit configured to control a bit or byte length applied by the second rounding operation, wherein the load and store unit is further configured to store to memory a rounded number generated by the second rounder circuit.

According to one embodiment, the floating-point computation device further comprises a second floating-point operation circuit comprising a second processing unit configured to perform a second operation on at least one input FP value to generate a result, wherein the first rounder circuit is configured to perform a second rounding operation on the result of the second operation and the first control circuit is configured to control a bit or byte length applied by the second rounding operation.

According to one embodiment, the first control circuit comprises a multiplexer having a first input coupled to receive a first length value representing the first bit or byte length, and a second input coupled to receive a second length value representing the second bit or byte length, and a selection input coupled to receive a control signal indicating whether the result of the first operation is to be stored to the internal memory or to the external memory.

According to one embodiment, the floating-point computation device implements an instruction set architecture, and the first and second bit or byte lengths are indicated in instructions of the instruction set architecture.

According to one embodiment, the processing unit is an arithmetic unit, and the operation is an arithmetic operation, such as addition, subtraction, multiplication, division, square root (sqrt), 1/sqrt, log, and/or a polynomial acceleration, and/or the operation comprises a move operation.

According to a further aspect, there is provided a method of floating-point computation comprising: performing, by a first processing unit of a first floating-point operation circuit, a first operation on at least one input FP value to generate a result; performing, by a first rounder circuit, a first rounding operation on the result of the first operation; and controlling a bit or byte length applied by the first rounding operation, comprising applying a first bit or byte length if the result of the first operation is to be stored to an internal memory of the floating-point computation device to be used for a subsequent operation, and applying a second bit or byte length, different to the first bit or byte length, if the result of the first operation is to be stored to an external memory.

According to one embodiment, the method further comprises storing, by a load and store unit of the floating-point computation device, a rounded number of the second bit or byte length generated by the first rounder circuit, wherein the load and store unit does not comprise any rounder circuit.

According to one embodiment, the method further comprises: performing, by a second floating-point operation circuit comprising a second processing unit, a second operation on at least one input FP value to generate a result; performing, by a second rounder circuit, a second rounding operation on the result of the second operation; controlling, by a second control circuit, a bit or byte length applied by the second rounding operation; and storing to memory, by the load and store unit, a rounded number generated by the second rounder circuit.

According to one embodiment, the method further comprises: performing, by a second floating-point operation circuit comprising a second processing unit, a second operation on at least one input FP value to generate a result; performing, by the first rounder circuit, a second rounding operation on the result of the second operation; and controlling, by the first control circuit, a bit or byte length applied by the second rounding operation of the first rounder circuit.

According to one embodiment, the control circuit comprises a multiplexer having a first input coupled to receive a first length value representing the first bit or byte length, and a second input coupled to receive a second length value representing the second bit or byte length, and a selection input coupled to receive a control signal indicating whether the result of the first operation is to be stored to the internal memory or to the external memory.

According to one embodiment, the floating-point computation device implements an instruction set architecture, and the first and second bit or byte lengths are indicated in instructions of the instruction set architecture.

According to one embodiment, the first operation is an arithmetic operation, such as addition, subtraction, multiplication, division, square root, 1/sqrt, log, and/or a polynomial acceleration, or a move operation.

BRIEF DESCRIPTION OF THE DRAWINGS

The foregoing features and advantages, as well as others, will be described in detail in the following description of specific embodiments given by way of illustration and not limitation with reference to the accompanying drawings, in which:

FIG. 13 represents a Modified Posit format;

FIG. 14 represents conversion examples based on the Modified Posit format;

FIG. 15 is a graph representing an exponent bit-length for four different FP formats;

FIG. 19B represents status registers according to a further example embodiment;

FIG. 19C represent status registers according to yet a further example embodiment;

DETAILED DESCRIPTION OF THE PRESENT EMBODIMENTS

Figure 1:
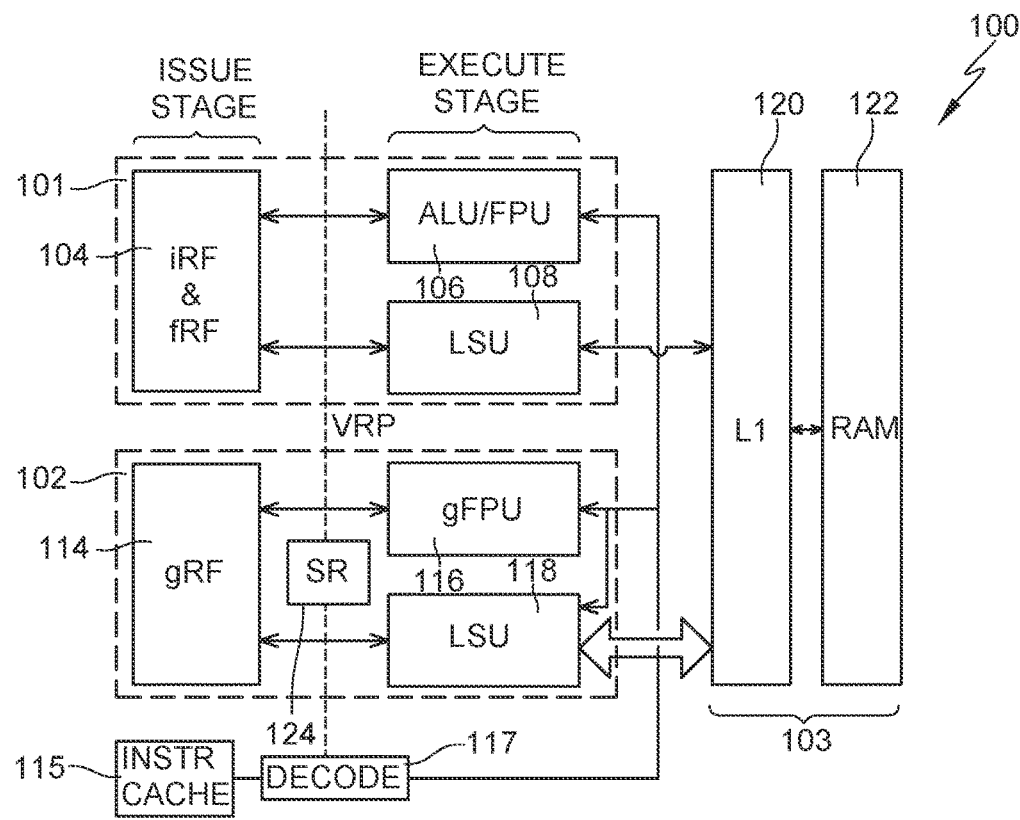
FIG. 1 schematically illustrates a VP FP computing device according to an example embodiment.

Like features have been designated by like references in the various figures. In particular, the structural and/or functional features that are common among the various embodiments may have the same references and may dispose identical structural, dimensional and material properties.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

In the following specification, the following terms will be considered to have the following meanings:

floating-point (FP) number or value: a number expressed in the form of an exponent e and a mantissa or fraction f;

an FP number format: a defined set of fields in a defined order used to represent a FP number, and having at least one field representing the exponent e, and another field representing the mantissa or fraction f;

an FP number format type: a particular configuration of a given FP number format, defined for example by at least a corresponding maximum bit length, defined for example by a maximum byte budget (MBB) or a bits stored parameter (BIS), both of which are described in more detail below;

self-descriptive variable precision (VP) FP format: any floating-point number format having an exponent field, a mantissa field, and for instance an indication of which bits form the exponent and mantissa fields, this indication for example comprising at least one size field indicating the size of the exponent field and/or mantissa field. For example, the size field comprises bits that are used to express either the length of the exponent field, the length of the mantissa field, a bit ratio between the exponent and mantissa fields, or a combined length of the exponent and mantissa fields or of the whole FP number. The VP FP format described herein optionally comprises a sign bit, an uncertainty bit and either or both of an exponent size field indicating the size of the exponent and a mantissa size field indicating the size of the mantissa;

bounded memory format: a VP FP format as defined above, and for which no value exceeds the maximum bit length defined by the maximum byte budget (MBB) or the bits stored parameter (BIS); and special FP value type: any undefined or non-representable value, examples being values that are not numbers (NaN), that are at almost positive or negative infinity, at exact infinity, or that define intervals bounded by almost positive or negative infinity. Such concepts are related to interval arithmetic, and the UNUM format is capable of expressing such concepts and being used for interval arithmetic, while other formats could be used in emulations of interval arithmetic by setting an appropriate rounding mode when performing the FP operations in order to compute the left and right interval endpoints;

internal memory of a processing device: a memory, such as a register file, scratchpad or cache memory, which is for example directly accessible by a processing unit of the processing device using pointers, and with which data transfers to and from an main memory are performed via a load and store unit; and external memory: a memory such as a cache memory or RAM (Random Access Memory) that is external to a processing device, but may be implemented on a same chip as the processing device, and from which data to be processed by the processing device is loaded by a load and store unit of the processing device.

Variable-Precision Floating-Point (VP FP) formats are based on the assumption that the programmer can directly tune the FP format in its length and precision depending on the running application requirements. VP FP formats can be divided into two separate groups:

1. VP FP formats having arbitrary precision, where it is assumed that the size and/or precision of all variables or of specific variables is chosen by the programmer at compile time. An example of an arbitrary precision format is the IEEE-Like format described below; and
2. VP FP formats having dynamic precision, where the size of the data is predicted at compile time, but its precision varies at run time. Indeed, the precision of the dynamic precision formats, and in particular the bit-length of the exponent value, is automatically adjusted based on the computations being performed, and can thus provide improved precision when compared to arbitrary precision, at least under certain conditions. Examples of dynamic precision formats include UNUM and Posit, as well as three new formats Custom Posit, Not Contiguous Posit, and Modified Posit described below.

FIG. 1 schematically illustrates a VP FP computing device 100 according to an example embodiment of the present disclosure. The device 100 comprises a processing portion comprising, in the example of FIG. 1, two processing devices 101, 102, and a memory portion 103.

Each of the processing devices 101, 102 is for example formed of an issue stage (ISSUE STAGE) and an execute stage (EXECUTE STAGE). However, this is merely one example, and in alternative embodiments alternative or further stages could be present, such as a fetch stage.

The processing device 101 for example comprises, in the issue stage, an internal memory for example in the form of one or more register files (iRF & fRF) 104, which are for example formed of integer register files iRF and floating-point register files fRF. The register files 104 are for example configured to store data to be processed by the execute stage, and data resulting from processing by the execute stage. The processing device 101 for example comprises, in the execute stage, processing units (ALU/FPU) 106, which for example comprise one or more arithmetic logic units (ALU) and/or one or more floating-point units (FPU). The processing device 101 also for example comprises, in the execute stage, a load and store unit (LSU) 108.

The processing device 102 is for example a VP arithmetic unit, also referred to herein as a VRP (VaRiable Precision processor). The processing device 102 for example comprises, in the issue stage, one or more register files (gRF) 114, which are for example formed of one or more g-number register files gRF, configured to store data values in a g-number format, which is described in more detail below in relation with FIG. 17. The one or more register files 114 are for example configured to store data to be processed by the execute stage, and data resulting from processing by the execute stage. The processing device 102 for example comprises, in the execute stage, one or more floating-point units (gFPU) 116, which are for example g-number FPUs configured to process data values in the g-number format. The g-number FPU for example comprises a g-number adder, a g-number multiplier and/or other g-number operators. The g-number inside this FPU is for example formed of L=4 64-bit mantissa chunks, in addition to other fields. The precision of the g-number is for example stored in the L field of each g-number.

The processing device 101 also for example comprises, in the execute stage, a load and store unit (LSU) 118.

In some embodiments, one or more Status Registers (SR) 124 are provided. These status registers 124 are for example internal status registers implemented in the processing device 102. The status registers 124 for example store information defining a plurality of FP format types that can be selected for an FP value to be stored to external memory, and/or information defining the computation precision of the FPU 116. However, other solutions for defining the computation precision, and other precisions in the system, would be possible.

Each FP format type for example defines the configuration of parameters such as rounding modes and the configuration of the data in memory, e.g. its size in bytes MBB or bits stored BIS, its exponent length (or size) ES, and other parameters for VP formats. Furthermore, in some embodiments, there are multiple instances of these status registers such that, depending on the data sent to be processed, the status register values can be preloaded and/or precomputed in order to accelerate applications and not lose clock cycles in modifying the status register.

While, in the example of FIG. 1, the one or more status registers 124 are illustrated as a separate element from the register file gRF 114, processing unit gFPU 116, and LSU 118, in alternative embodiments they could be hosted elsewhere in the system, such as stored as part of the register file 114 stored in memory, or stored as external status registers.

In some embodiments, the status registers 124 comprise a WGP (Working G-number Precision) parameter, which for example defines the precision of the g-numbers, such as the precision of the output of an arithmetic (e.g. addition).

The processing units 106, 116 in the execute stages of the processing devices 101, 102 are for example configured to execute instructions from an instruction cache (INSTR CACHE) 115. For example, instructions are fetched from the instruction cache 115 in the issue stage, and then decoded, for example in a decode stage (DECODE) 117 between the issue and execute stages, prior to being executed by the execute stage.

The processing units 106, 116 are for example configured to process data values in one or more execution formats. For example, the execution format supported by the one or more floating-point units 116 is the g-number format. The execution format supported by the one or more processing units 106 depends for example on the processor type. In the case of an ALU, the processing of signed or unsigned integers is for example supported. In the case of an FPU, float and/or double IEEE-754 formats are for example supported. In order to simplify the hardware implementation of the processing units 106, 116, these units are for example configured to perform processing on data values of a fixed execution bit-length EBL, equal for example to 32-bits or 64-bits. Thus, the data within the processing units 106, 116 is for example divided into mantissa chunks having a bit-width EBL, equal in some embodiments to 512 bits. However, the data widths processed by some or all of the pipeline stages may be less than the bit-width EBL. For example, some pipeline stages, such as the mantissa multiplier, process data in chunks of 64-bits, while some others, such as the mantissa adder, could process data in chunks of 128-bits, while yet others, such as move, leading zero count, and shift (described in more detail below), could process data with the full EBL length of 512-bits. The "chunk parallelism" on which the mantissa computing can be done for example depends on the "available slack" in the final hardware implementation of the unit.

Memory portion 103 of the computation device 100 for example comprises a cache memory 120, which is for example a level one (L1) cache memory, and a further RAM memory 122 implemented for example by DRAM (Dynamic Random Access Memory). In some embodiments, the processing devices 101, 102, and the cache memory 120, are implemented by a system-on-chip (SoC), and the memory 122 is an external memory, which is external to the SoC. As known by those skilled in the art, the cache memory 120 is for example a memory of smaller size than the memory 122, and having relatively fast access times, such that certain data can be stored to or loaded from the cache memory 120 directly, thereby leading to rapid memory access times. In alternative embodiments, the external memory 103 could be a RAM memory, a hard disk, a Flash drive, or other memory accessed for example via an MMU (memory management unit—not illustrated).

The load and store units 108, 118 are for example responsible for loading data values from the memory 120, 122 to the register files 104, 114 respectively, and for storing data values from the register files 104, 114 respectively, to the memory 120, 122.

While in the example of FIG. 1 the processing units 106, 116 are implemented in hardware, it would also be possible for either or both of these processing units 106, 116 to be implemented by a software implementation based on a software library such as softfloat (the name "softfloat" may correspond to one or more registered trademarks).

First Aspect—Support for Multiple Types of FP Formats

As will be described in more detail below, advantageously, the storage format used to store data values in the memory 103 is different to the execution format or formats used by the processing units 106, 116, and furthermore, a plurality of different FP format types and/or a plurality of different VP FP formats are supported for the storage of the data values in the memory 103. In particular, the load and store units 108, 118 of the execute stages of the processing devices 101, 102 are for example configured to load data values from the memory 103 in a storage format, to perform format conversion from the storage format to an execution format, and to store the converted data values to a corresponding register file 104, 114. The load and store units 108, 118 are also for example configured to convert data values in the corresponding register files 104, 114 from an execution format to a storage format, and to store the converted data values to the memory 103.

The use of VP FP formats for the storage of data values to memory provides certain technical advantages. Indeed, a standard Floating-Point number has a limited precision, equal for example to 53 bits of mantissa for double or FP64, which is equivalent to 14-17 decimal digits, and is enough for implementing many mathematical problems, but in some cases higher precision may be desired. For most VP FP formats (not valid for IEEE-like described below), in the case of VP FP values with exponent part close to and centered around 1, in other words an exponent centered around zero, higher precision can be achieved and the cancellation effect is reduced.

Furthermore, VP FP formats provide advantages for both high-precision and low-precision applications:

High-precision applications are influenced by many known errors that affect the computational result, such as rounding, absorption and cancellation. These issues can be reduced by enlarging the bit-width to store in the memory.

Low-precision applications tend to not use all of the precision offered by the format adopted. Therefore, adopting a more compact format will speed up the application since cache lines can be filled with more data. This problem can be reduced by decreasing the bit-length to store in the memory. Indeed, in the case of low precision applications, either all of the precision is not used, in which case the size of data can be reduced, or all of the precision is used, in which case the data size can be reduced in cases in which the application has exponent values centered around zero, which allows the mantissa precision to be increased around these values.

Moreover, a part of the error contribution is coming from the limited flexibility that the hardware has when exchanging data with the memory. Indeed, it is pointless to have a very precise Floating-Point unit, FPU, which is able to compute numbers with many bits of precision, if they end up to be truncated when sent to the main memory.

These issues can be minimized by using special encoding formats, which are able to provide improved memory footprint, but without over complicating the execution stage of the computation device. VP FP can indeed be used to minimize the calculation error of an algorithm, or save space in the data memory to an acceptable level by means of a "general purpose" hardware able to support these two features at the same time. This is done by tuning the precision of the software variables in the running application.

Advantageously, the load and store unit 108 and/or 118 of the computation device 100 comprises means for performing format conversion of floating-point values between one or more execution formats and one or more storage formats, as will now be described in more detail.

For example, the LSU 118 is capable of supporting a plurality of FP formats. In some embodiments:

these formats have a bit-length that can vary at execution time, and is programmable; and/or these formats have a bit-length that it is not standard; and/or these formats have a bit-length that can be larger than the width of the memory data bus between the LSU 118 and the external memory 120, 122. Hence, the LSU 118 is for example capable of handling load and store operations of data larger than, for example, 64 bits, on a bus of 64 bits.

In other words, since the supported formats "break the rule" that data during calculation should be a power-of-two in size, and that the size should be lower than or equal to the memory bus bit-width, the LSU 118 is for example a dedicated LSU that handles new data formats in a manner that is transparent to the programmer, by splitting the memory operations into several standard memory operations (e.g. split a 192 bit store in three 64-bit stores).

The above remains true even if the LSU 118 supports only one VP format, and/or if the LSU 108 is not designed to support numbers that have a bit-length that it is not a power-of-two.

According to embodiments described herein, the status registers 124 of FIG. 1 provide a simple and effective manner for allowing a selection of a desired FP format type to be applied to an FP data value that is to be stored to memory, as will now be described in more detail.

The status registers 124 define a plurality of floating-point number format types associated with corresponding identifiers, each format type indicating at least a maximum size of the floating-point value. The load and store unit 108 and/or 118 is for example configured to load floating-point values from the external memory 120, 122 to the internal memory 104 or 114, and store floating-point values from the internal memory 104 or 114 to the external memory 120, 122. In particular, the load and store unit 108 and/or 118 is configured to receive, in relation with each store operation, a floating-point value from the internal memory 104 or 114, and one of the identifiers; and to convert the floating-point value to the external memory format having a maximum size defined by the floating-point number format type designated by the identifier.

In some embodiments, the maximum size of each FP number format type is designated with a bit granularity.

In some embodiments, the floating-point number format type designated by one of the identifiers is an external memory format, and a floating-point number format type designated by another of the identifiers is another, different, external memory format, and the load and store unit 108 and/or 118 comprises a plurality of format conversion circuits, as will now be described in more detail with reference to FIG. 2.

Figure 2:
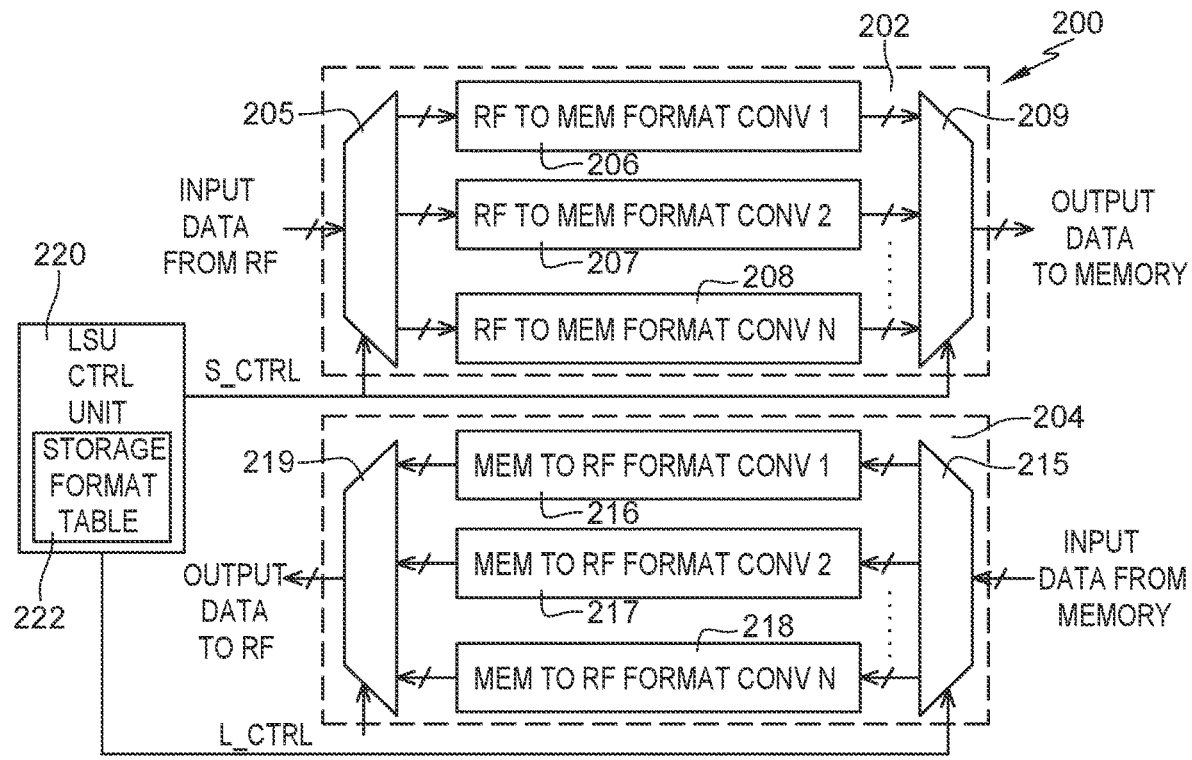
FIG. 2 schematically illustrates a format conversion circuit of a load and store unit of the VP FP computing device of FIG. 1 according to an example embodiment.

FIG. 2 schematically illustrates a format conversion circuit 200 of the load and store unit 108 or 118 of the VP FP computing device of FIG. 1 according to an example embodiment. In some embodiments, at least the LSU 118 is equipped with such a conversion circuit 200.

The format conversion circuit 200 for example comprises an RF to memory format conversion unit 202 configured to perform internal to external format conversion, for example in order to convert data values from an execution format used in the internal memory of the processing device 101 or 102, for example by one of the register files 104, 114, into a storage format for storage to the external memory 103. The format conversion circuit 200 also for example comprises a memory to RF format conversion unit 204 configured to perform external to internal format conversion, for example in order to convert data values from a storage format used in the external memory 103 into an execution format used in the internal memory, for example by one of the register files 104, 114.

The RF to memory format conversion unit 202 for example comprises a plurality of converters, each capable of performing a different type of format conversion. In the example of FIG. 2, there are N converters (RF TO MEM CONV 1, 2, . . . , N), the first, second and Nth converters being shown in FIG. 2 labelled 206, 207, 208. The number N of converters is for example equal to at least 2, and for example at least 3 in some embodiments. In some embodiments, each of the converters 206 to 208 is configured to perform conversion from a same FP format used to store the data value in the register file, into a corresponding plurality of N different storage formats. The conversion unit 202 for example comprises a demultiplexer 205 configured to receive, at a data input, an input data value (INPUT DATA FROM RF) from the register file to be converted. The demultiplexer 205 for example comprises N data outputs, a corresponding one of which is coupled to each of the N converters 206 to 208. The conversion unit 202 for example comprises a multiplexer 209 having N data inputs coupled respectively to outputs of corresponding ones of the N converters 206 to 208, and a data output configured to provide an output data value (OUTPUT DATA TO RAM) for storage to the memory 103. For example, the data provided by each of the N converters 206 is stored to the memory 103 via a common memory interface (not illustrated).

Similarly, the memory to RF format conversion unit 204 for example comprises a plurality of converters, each capable of performing a different type of format conversion. In the example of FIG. 2, there are N converters (MEM TO RF CONV 1, 2, . . . , N), the first, second and Nth converters being shown in FIG. 2 labelled 216, 217, 218. The number N of converters is for example the same as the number of converters of the unit 202. However, in alternative embodiments, it would equally be possible for the LSU 108 and/or LSU 118 to comprise less converters for converting from the internal to external formats than for converting from the external to internal memory formats. Indeed, the conversion from internal to external formats for which there is no converter can for example be performed in software, or by another processing device. It would be equally possible for the LSU 108 and/or LSU 118 to comprise less converters for converting from the external to internal formats than for converting from the internal to external memory formats. Indeed, the conversion from external to internal formats for which there is no converter can for example be performed in software, or by another processing device.

In some embodiments, each of the converters 216 to 218 is configured to perform conversion from a corresponding plurality of N different storage formats into a same FP format used to store the data value in the register file.

In the embodiment represented in FIG. 2, the conversion unit 204 comprises a demultiplexer 215 configured to receive, at a data input, an input data value (INPUT DATA FROM RAM) from the memory to be converted. The demultiplexer 215 for example comprises N data outputs, a corresponding one of which is coupled to each of the N converters 216 to 218. For example, the data provided to each of the converters 216 to 218 from the memory 103, for example via the demultiplexer 215, is provided via a common memory interface (not illustrated), which is for example the same interface as described above used for storing the data to the memory 103. The conversion unit 204 also for example comprises a multiplexer 219 having N data inputs coupled respectively to outputs of corresponding ones of the N converters 216 to 218, and a data output configured to provide an output data value (OUTPUT DATA TO RF) for storage to the register file.

The demultiplexers 205, 215 and multiplexers 209, 219 of the conversion units 202, 204 are for example controlled by a control circuit (LSU CTRL UNIT) 220. For example, the demultiplexer 205 and multiplexer 209 of the conversion unit 202 are controlled by a store control signal S_CTRL generated by the control unit 220, and the demultiplexer 215 and multiplexer 219 of the conversion unit 204 are controlled by a load control signal L_CTRL generated by the control unit 220. Indeed, the storage conversion format selected for storage of the input data to memory is for example selected as a function of a desired precision and/or memory footprint of the data value in the memory, while the execution format selected for conversion of the input data from memory is for example selected as a function of the format that was used for the storage of this data value.

In alternative embodiments, rather than the conversion unit 202 comprising the demultiplexer 205 and multiplexer 209, some or all of the converters 206 to 208 of the conversion unit 202 are for example configured to receive the input data from the internal memory to be converted, but control circuit 220 is configured to generate an enable signal to some or each of the converters 206 to 208 that only enables a selected one of the converters to perform the conversion and provide the output data to the external memory. Additionally or alternatively, rather than the conversion unit 204 comprising the demultiplexer 215 and multiplexer 219, some or all of the converters 216 to 218 of the conversion unit 204 are for example configured to receive the input data from the external memory to be converted, but control circuit 220 is configured to generate an enable signal to some or each of the converters 216 to 218 that only enables a selected one of the converters to perform the conversion and provide the output data to the internal memory.

It would also be possible for more than one of the converters 206 to 208 of the conversion unit 202 to operate in parallel, and for the control unit 220 to control the readout of the values from the converters 206 to 208 on a request-grant basis, or on a round-robin basis, once the conversions have been completed. In such a case, it would also be possible for two or more of the converters 206 to 208 to be configured to perform the same type of format conversion, and to operate in parallel on different values. Similarly, it would also be possible for more than one of the converters 216 to 218 of the conversion unit 204 to operate in parallel, and for the control unit 220 to control the readout of the values from the converters 216 to 218 on a request-grant basis, or on a round-robin basis, once the conversions have been completed. In such a case, it would also be possible for two or more of the converters 216 to 218 to be configured to the perform the same type of format conversion, and to operate in parallel on different values.

The status registers 124 are for example used to indicate the internal to external format conversion that is to be performed, and the external to internal format conversion that is to be performed. For example, each time input data is received to be converted, the control unit 220 is configured to read the status registers 124, or otherwise receive as an input from the status register 124, an indication of the conversion type that is to be used for the conversion. Based on this indication, the control unit 220 is configured to select the appropriate converter. In this way, the format conversion circuit 200 may operate during a first period in which data is converted from an internal memory format to a first external memory format based on a first value stored by the status register, and during a second period in which data is converted from the internal memory format to a second external memory format based on a second value stored by the status register. Similarly, the format conversion circuit 200 may operate during the first period, or a third period, in which data is converted from the first external memory format to the internal memory format based on the first value, or a third value, stored by the status register, and during the second period, or a fourth period, in which data is converted from the second external memory format to the internal memory format based on the second value, or a fourth value, stored by the status register.

In alternative embodiments, in addition to or instead of using the status registers 124, the LSU control unit 220 comprises a storage format table (STORAGE FORMAT TABLE) 222 indicating, for each address to which a data value is stored in the memory 103, the format of the data value. In this way, when the value is to be loaded again from memory, the LSU control unit 220 is able to select the appropriate converter, among the converters 216 to 218, that is capable of converting from this storage format. The LSU control unit 220 is for example configured to update that table 222 upon each store operation of a data value to the memory 103.

In alternative embodiments, the store operations from the internal memory to the external memory are based on store instructions that specify the format conversion that is to be performed, and the load operations from the external memory to the internal memory are based on load instructions that specify the format conversion that is to be performed. The control circuit 220 is for example configured to receive the load and store instructions, and to select appropriate converters accordingly.

While the format conversion circuit 200 is described based on the conversion of one data value at a time, it would also be possible to support vectorial operations according to which vectors containing more than one data value are loaded or stored, the conversion of these values for example being implemented in series, or in parallel by a parallel implementation of a plurality of converters for each supported format conversion.

Examples of VP FP formats will now be described in more detail with reference to FIGS. 3 to 17.

The IEEE-Like Format

Figure 3:
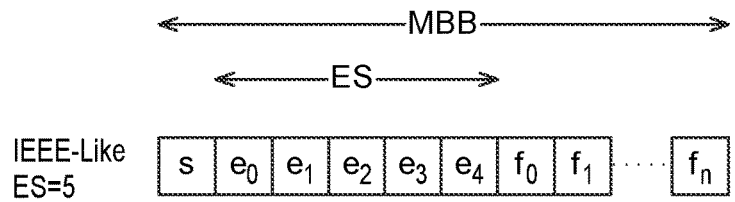
FIG. 3 represents the IEEE-like format.

FIG. 3 represents the IEEE-like format. The IEEE-Like format falls within the arbitrary precision formats. This format resembles the one specified in the IEEE-754 standard "IEEE Standard for Floating-Point Arithmetic", in IEEE Std 754-2019, (Revision of IEEE 754-2008), pp. 1-84, 22 Jul. 2019, doi: 10.1109/IEEESTD.2019.8766229. The IEEE-Like has the same fields as the one of IEEE-754 standard: 1) a sign bit s, 0 for positive, 1 for negative numbers; 2) a certain number of exponent bits ($e_0$ to $e_4$ in FIG. 3) of size Exponent Size (ES); 3) a fractional (or mantissa) part ($f_0$ to $f_n$ in FIG. 3) for the rest of the encoding.

In order to make the IEEE-Like format as compatible as possible to a VP one, the two following parameters are for example introduced:

MBB: a Maximum Byte Budget, as described in more detail in the patent publication US/2020/0285468, which specifies the width of the VP FP format in terms of bytes. It would equally be possible to express this width as the value BIS (Bits Stored) expressed in terms of bits rather than bytes.

ES: an Exponent Size representing the number of bits to be reserved inside the format encoding for the exponent value of the IEEE-Like format. The example of FIG. 3 has an ES value of 5, an MBB==ceil((1+5+(n+1))/8) or BIS=1+5+(n+1).

The MBB and ES parameters, shown FIG. 3, can be tuned by the programmer at programming time. The value x of an IEEE-Like FP number is expressed by the following equation (Equation 1):

$$x = (-1)^s \cdot 2^{e-bias} \cdot \left(1 + \frac{f}{2^{fs}}\right) \quad \text{[Math 1]}$$

where s is the sign, e is the exponent, and f is the fractional (or mantissa) part. For example, both biased and unbiased exponent encoding is supported, and in the case that biased is used, the bias value is $2^{(ES-1)}$, whereas otherwise, for two's complement exponent encoding, bias=0.

Table 1 below shows special encodings according to the IEEE-like format.

TABLE 1

IEEE-like special encodings

| | Sign | Exponent | Mantissa |
|---|---|---|---|
| Zero | 0 | exp_min | 0.000~00 |
| +Inf | 0 | exp_max | 1.111~10 |
| −Inf | 1 | exp_max | 1.111~10 |
| sNaN | 1 | exp_max | 1.111~11 |
| qNaN | 0 | exp_max | 1.111~11 |

Table 1 actually defines the NaN (not a number) as two separate representations: quiet NaN (qNaN) and signaling NaN (sNaN).

The UNUM Format

Figure 4:
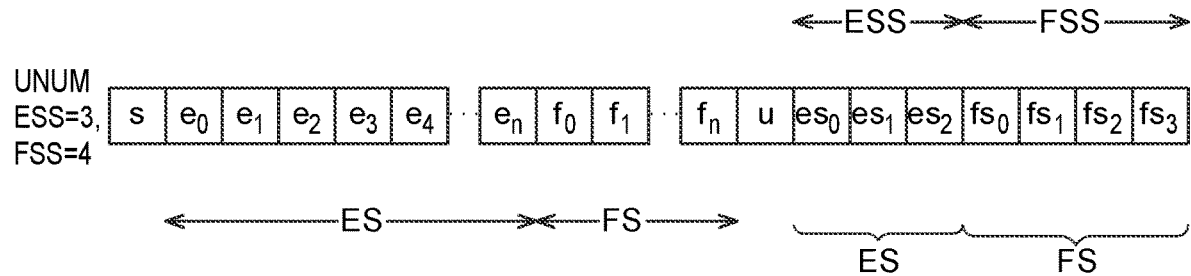
FIG. 4 represents the UNUM format.

FIG. 4 represents UNiversal NUMber (UNUM) format, which was introduced by John Gustafson in his 2015 publication entitled "The End of Error: Unum Computing", 10.1201/9781315161532. The two main features of the UNUM format are:

the Variable-size storage format for the mantissa and exponent fields ($e_0$ to $e_n$ and $f_0$ to $f_n$ in FIG. 4); and the intervals support (not described in detail herein).

The decimal value x of a UNUM VP FP number is expressed by the following equation (Equation 2):

$$x = \begin{cases} (-1)^s \cdot 2^{e-(2^{es-1}-1)} \cdot \left(1 + \frac{f}{2^{fs}}\right) & \text{if } e > 0 \\ (-1)^s \cdot 2^{e-(2^{es-1}-1)+1} \cdot \left(\frac{f}{2^{fs}}\right) & \text{otherwise} \end{cases} \quad \text{[Math 2]}$$

The variable bit-width characteristic of this format is due to the two self-descriptive fields at the right-most part of the UNUM format, shown in FIG. 4. The size of these two fields, Exponent Size Size (ESS), which in the example of FIG. 4 is three bits $es_0$ to $es_n$, and Fraction Size Size (FSS), which in the example of FIG. 4 is four bits $fs_0$ to $fs_n$, is chosen at programming time. These two fields contain the Exponent Size minus 1 (ES−1) and the Fraction Size minus 1 (FS−1) respectively of the current UNUM number. An additional information stored inside the UNUM is the u-bit, which is used as a flag for indicating whether the number is an exact number (u=0) or an open interval (u=1) between the encoded number, and the next one with the fraction field incremented by one.

The Posit Format

Figure 5:
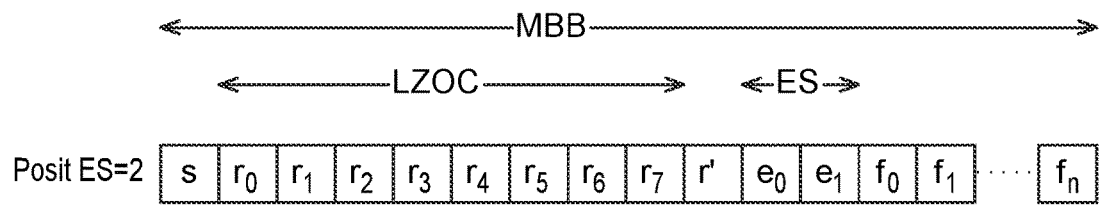
FIG. 5 represents the Posit format.

FIG. 5 represents the Posit format. As the UNUM format was found not to be hardware-friendly, the same John Gustafson, in 2017, proposed a new version of the UNUMs, Posit, in the publication Gustafson, John & Yonemoto, I. (2017). Beating floating point at its own game: Posit arithmetic. Super-computing Frontiers and Innovations. 4. 71-86. 10.14529/jsfi170206.

With reference to FIG. 5, the Posit format is constructed as follows:

1. a sign bit s, 0 for positive, 1 for negative numbers;
2. a Regime Bits (RB) field, which is a binary string ($r_0$ to $r_7$ in FIG. 5) filled with bits of the same value. The length of the RB is indicated as Leading Zero One Count (LZOC). The Regime Bits indicate a scale factor $useed^k$ (see Equation 4 below). To compute the value of a posit number starting from the encoding, $useed^k$ is for example indicated by the length LZOC. For example, k=−LZOC if the regime bits are 0 (positive exponent), or k=LZOC−1 if regime bits are 1 (negative exponent). If the RB bits are all 0 s, they are expressing that the FP number exponent has a negative sign; on the other hand, all 1 s are representing a positive exponent sign.
3. The RB are followed by 1 bit r' of the opposite sign. This last one, also called Termination Bit (TB) is used for marking the end of the RB field.
4. Right after the termination bit, there are a number Exponent Size (ES) of bits (two in the example of FIG. 5) $e_0$ and $e_1$ that encode the exponent e. This field is expressed as an unsigned integer, giving an additional contribution to the final exponent of 2e (see Equation 3 below).
5. Any other remaining bit of the encoding is reserved for the fractional part $f_0$ to $f_n$.

If the number is negative, the whole encoding is represented in two's complement.

Given p the value of the Posit encoding as signed integer and n the number of bit of the Posit format, the following Equation 3 gives the decimal value x represented by the Posit format, the following Equation 4 gives the useed value, and the following Equation 5 gives k, which is the run-length of the regime bits:

$$x = \begin{cases} 0, & p = 0, \\ NaR, & p = -2^{n-1} \\ \text{sign}(p) \cdot useed^k \cdot 2^e \cdot f, & \text{all other } p \end{cases} \quad \text{[Math 3]}$$

$$useed = 2^{2^{ES}} \quad \text{[Math 4]}$$

$$k = \frac{\exp - e}{2^{ES}} \quad \text{[Math 5]}$$

The following Table 2 indicates Posit special encodings.

TABLE 2

Posit special encodings

| | Bitstream |
|---|---|
| Zero | 0000~00 |
| NaR | 1000~00 |

In Posit, depending on the exponent value to be encoded in it, the RB field can span the whole encoding, including even the TB field. By doing this, there might be Posit numbers which do not contain any bit for the fractional part.

Unlike the other formats, Posit does not distinguish between foo and NaN. These are all subjected to Not a Real (NaR) (see Table 2).

Figure 6:
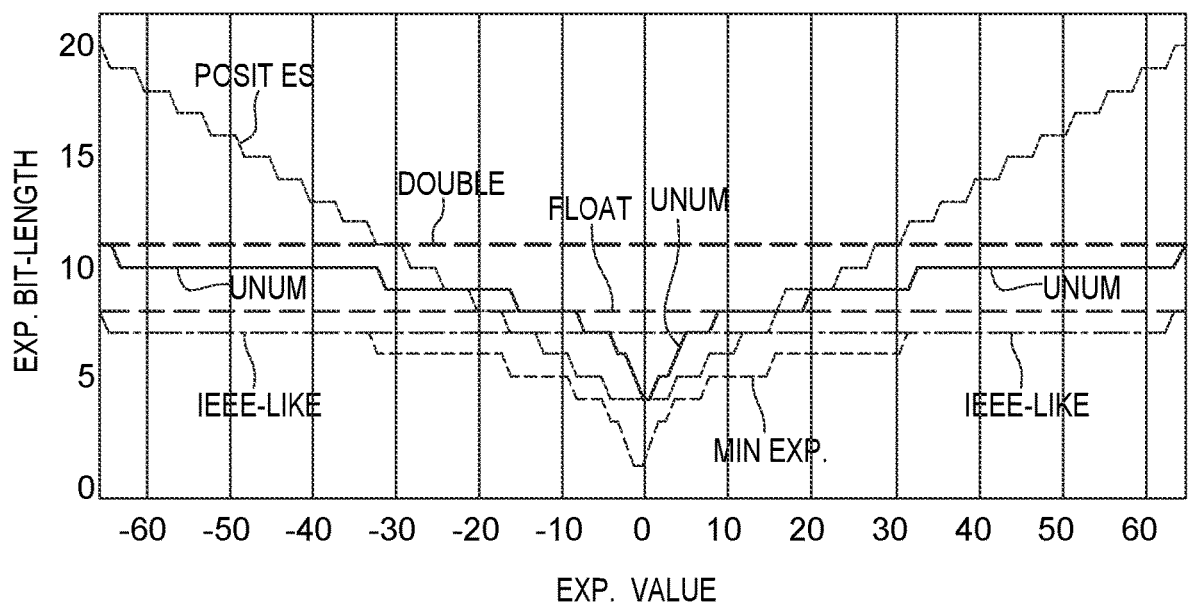
FIG. 6 is a graph representing an exponent bit-length for five different FP formats with respect to a minimum exponent overhead.

FIG. 6 is a graph representing an exponent bit-length (EXP. BIT-LENGTH) as a function of the exponent value (EXP. VALUE) for five different FP formats POSIT ES, UNUM, IEEE-LIKE, and the IEEE-754 float (FLOAT) and double (DOUBLE), with respect to a "minimum exponent" overhead MIN EXP. The IEEE-754 formats float and double are represented by horizontal lines at values 8 and 11 respectively. The "minimal exponent" curve indicates the minimum number of bits for representing, in two's complement representation, a given number (an exponent value in this case).

FIG. 6 demonstrates that dealing with Variable-Precision does not mean exactly representing a given value with the minimum number of exponent bits. Instead, it is desirable to be able to cover a largest exponent range with the minimum exponent overhead. As an example, Posit is relatively good in encoding small values, but tends to explode in exponent bit-length very easily as the exponent value increases. This might lead to a state in which Posit is not the best VP format for every kind of application, particularly high exponent values ones. On the other hand, the IEEE-Like format, for instance, tends to behave in exactly opposite manner: its exponent footprint does not increase with increases to the exponent, but at around the zero value, it has an additional overhead with the respect to the dynamic-precision formats.

Thus, each of the formats has some advantages and disadvantages. The choice of the Variable Precision (VP) Floating-point (FP) format might depend on the particular application. FIG. 6 demonstrates that no one format exponent encoding is an absolute improvement on all the others, and any of the formats may be more suited than the others for a given kind of application.

Three new formats, a Custom Posit (PCUST) format, a Not Contiguous Posit (NCP) format, and a Modified Posit (MP) format, are described in more detail below.

The Custom Posit format is designed to optimize the hardware implementation of the Posit format, while preserving its characteristics. In addition, the Custom Posit is compatible with the existing VP FP formats in terms of special values representation (foo and NaN support).

The Not Contiguous Posit format combines the Posit and IEEE-Like format in a single representation, leading to a relatively compact exponent encoding for the near-zero values representation, while constraining the exponent length to a maximum value for high exponent numbers, and so bounding the precision.

Finally, the Modified Posit format tries to exploit some characteristics of Posit, but tends to bound the expansion of the exponent field in a logarithmic growth. This results in a more precise representation with respect to Posit.

The Custom Posit (PCUST) Format

The Posit format has three main different weak points:

The Posit encoding's two's complement is just a way of avoiding representing the "negative zero" value. By removing this condition in the Custom Posit format, this leads to a more compact hardware implementation.

The Regime Bits (RB) field that can span the whole format encoding is a drawback in terms of format precision. Big exponent numbers can have just 1, 2 or even 0 bits of precision, resulting in a number that is of little use from an algorithmic point of view, due to a high error result.

The Posit format does not distinguish between Infinity and NaN, which can be a limitation when comparing it with the running standard, IEEE 754.

Therefore, a new format called Custom Posit, or PCUST, is proposed in order to overcome these three limitations.

Definition 1: The Custom Posit format has the same rules as the Posit format (sign, exponent and mantissa interpretation), but no two's complement occurs during the negative number conversion.

Given p the value of the Custom Posit encoding as a signed integer and n the number of bit of the Custom Posit format, the following Equation 6 gives the value x represented by the Custom Posit format:

$$x = \begin{cases} 0, & p = 0, \\ +\infty, & p = +2^{n-1} - 2, \\ -\infty, & p = -2^{n-1} + 1, \\ qNaN, & p = +2^{n-1} - 1, \\ sNaN, & p = -2^{n-1}, \\ sign(p) \cdot useed^k \cdot 2^e \cdot f & \text{all other } p \end{cases} \quad [\text{Math 6}]$$

Definition 2: The Regime Bits (RB) can grow up to a given threshold which will be called lzoc_max (see Equation 9 below). If the RB are supposed to be larger than the lzoc_max, the termination bit is automatically absorbed. When this situation occurs, one bit of precision is gained (see FIG. 8).

Since, in the Custom Posit format, the RB field is not able to grow to more than lzoc_max, a minimum number of mantissa bits are always present.

Definition 3: The Custom Posit format always guarantees a minimum number of mantissa bits greater than zero, because the RB field is upper limited to lzoc_max.

Definition 4: The Custom Posit format can be tuned using three parameters:

1) its byte-length: MBB;
2) its exponent size: ES; and
3) the maximum two's complement value that the Custom Posit exponent can assume: ES_MAX_DYNAMIC (see Equation 7 below).

With the aim of giving a concrete example over the Definition 4, ES_MAX_DYNAMIC=5 means that the number that can be encoded with the Custom Posit format can span between the exponent range exp_min=$2^{-16}$ and exp_max=$2^{+15}$ (see Equations 8 and 7). Any value outside this range is rounded to Zero or $\pm\infty$ (see Table 3). Otherwise, if the exponent is inside the range, the Regime Bit field size is computed (lzoc), Equation 10, which is smaller or equal to the lzoc_max, Equation 9.

Figures 7, 8:
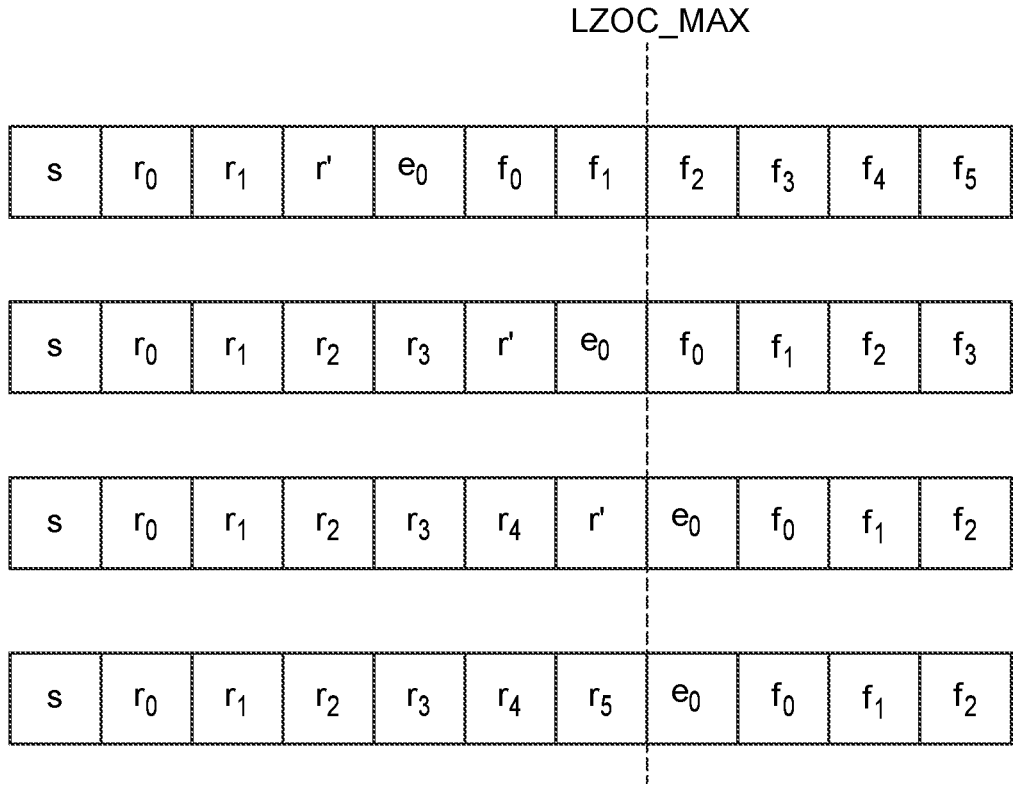
FIG. 7 represents conversion examples based on a Custom Posit format.
FIG. 8 represents examples of the Custom Posit format.

FIG. 7 details two number conversions in the PCUST format. In both A and B, the lzoc_max result is 4. In A, k=2 (Equation 11 below) and lzoc=3 (Equation 10 below). In B, k=3 and lzoc=4. Note that the way lzoc is obtained in the same as for the Posit format.

The following equations 7 to 11 respectively provide exp_max, exp_min, lzoc_max, lzoc and k:

$$\exp\_max = +2^{ES\_MAXDYNAMIC-1} - 1 \quad [\text{Math 6}]$$

$$\exp\_min = -2^{ES\_MAX\_DYNAMIC-1} \quad [\text{Math 7}]$$

$$lzoc\_max = \begin{cases} (MBB*8) - 1 & \text{Standard } Posit \\ \dfrac{\exp\_max - (2^{ES} - 1)}{2^{ES}} + 1 & \text{Custom } Posit \end{cases} \quad [\text{Math 8}]$$

$$lzoc = \begin{cases} -k & \text{if } k < 0 \\ k+1 & \text{if } k \geq 0 \end{cases} \quad [\text{Math 9}]$$

$$k = \frac{\exp - e}{2^{ES}} \quad [\text{Math 10}]$$

In Equation 11, exp is the integer value of the input exponent, while e is the integer value of the ES part of the input exponent.

FIG. 8 represents examples of the Custom Posit format, and demonstrates support for ES Maximum, lzoc_max=5, ES=1.

Finally, in view of Definition 3 above, it is possible to provide the following Definition 5:

Definition 5: Custom Posit can encode ±∞ and NaN, as represented in the following Table 3:

TABLE 3

| Custom Posit special encodings | |
|---|---|
| | bit-stream |
| Zero | 0000~00 |
| +Inf | 0111~10 |
| −Inf | 1111~10 |
| sNaN | 1111~11 |
| qNaN | 0111~11 |

Figure 9:
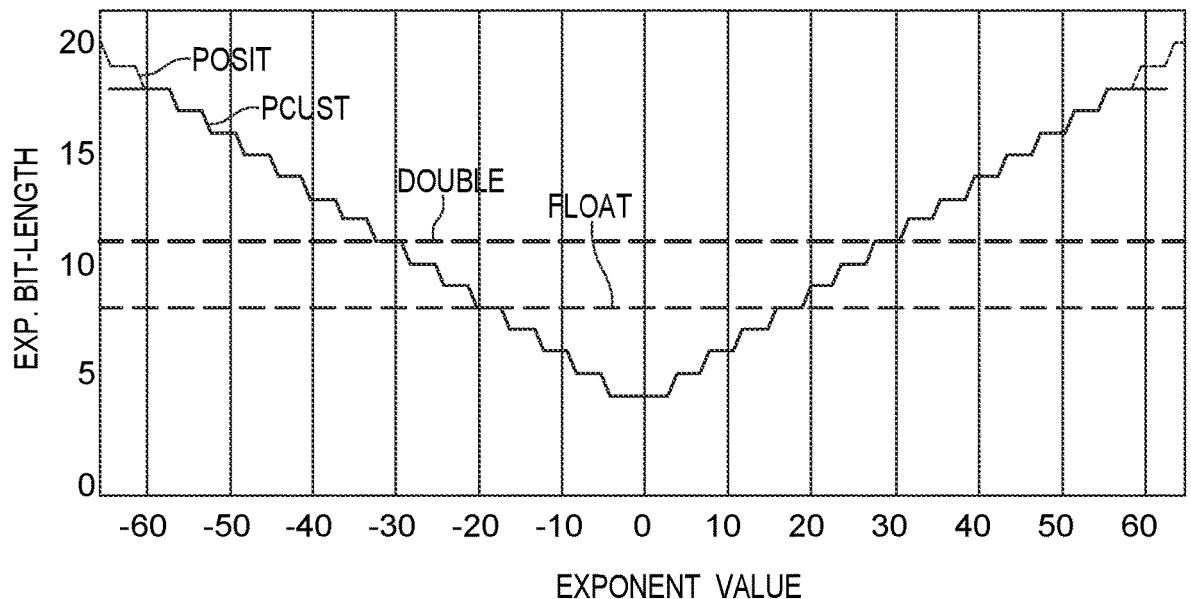
FIG. 9 is a graph representing an exponent bit-length for four different FP formats.

FIG. 9 is a graph representing an exponent bit-length (EXP. BIT-LENGTH) as a function of the exponent value (EXPONENT VALUE) for the four different FP formats double (DOUBLE), float (FLOAT), Posit with ES=2 (POSIT) and Custom Posit with ES=2 and ES_MAX_DYNAMIC=7 (PCUST). This figure shows that, for exponent values between −56 and +55, the Posit and Not Contiguous Posit (see below) performances are identical. However, due to the ES_MAX_DYNAMIC limitation, and the termination bit absorption, the PCUST format limits its maximum exponent size at 11 bits. Any exponent value outside the range −64 to +63 is rounded to ±∞. The Posit format instead continues expanding its exponent size field, until the entire length of the encoding is filled. In terms of exponent encoding size, there is no value in which the PCUST is worse than POSIT, except for values rounded to INF.

The not Contiguous Posit (NCP) Format

This section describes the Not Contiguous Posit (NCP) format, which is also for example described in the publication A. Bocco, "A Variable Precision hardware acceleration for scientific computing", July 2020.

As discussed above, both Posit and the IEEE-Like formats have some advantages and disadvantages in terms of memory footprint and precision, depending on the actual represented value. Indeed, it has been shown that the Posit format has a more compact exponent encoding when representing small values, close to zero, while the IEEE-Like does the opposite (see FIG. 6).

Definition 6: The Not Contiguous Posit format can encode the exponent in a similar manner to either the IEEE-Like format or the Posit format, depending on the actual value of the input exponent. If the Regime Bit size+termination bit+ES_POSIT are ≥ES_IEEE, then an IEEE-Like encoding is for example chosen.

Definition 7: In order to distinguish between the Posit and IEEE-Like representations, the NCP has the threshold flag bit, or simply T-flag. The T-flag comes after the sign bit. The T-flag is set to 0 for indicating a Posit encoding, 1 for the IEEE-Like one. The NCP format sets the T-flag autonomously.

Starting from Definition 6, a characteristic of the NCP format is to choose between IEEE-Like or Posit encoding in order to minimize the exponent field length. If a possible Posit exponent encoding results in a longer encoding than an IEEE-Like exponent encoding, then the IEEE-Like format is chosen, as demonstrated by Equation 12:

$$T\text{-flag} = \begin{cases} 1, & \text{if}(lzoc + 1 + \text{ES\_POSIT}) \geq \text{ES\_IEEE} \\ 0, & \text{otherwise} \end{cases} \quad [\text{Math 11}]$$

Given p the value of the Not Contiguous Posit encoding as signed integer, and n the number of bits of the Not Contiguous Posit format, the following Equation 13 gives the value x represented by the Not Contiguous Posit format:

$$x = \begin{cases} 0, & p = 0 \\ +\infty, & p = +2^{n-1} - 2 \\ -\infty, & p = -2^{n-1} + 1 \\ qNaN, & p = +2^{n-1} - 1 \\ sNaN, & p = -2^{n-1} \\ \text{sign}(p) \cdot useed^k \cdot 2^e \cdot f, & \text{all other } p \text{ if } T\text{-flag} = 0 \\ \text{sign}(p) \cdot 2^e \cdot (1 + \frac{f}{2^{fe}}), & \text{all other } p \text{ if } T\text{-flag} = 1 \end{cases} \quad [\text{Math 12}]$$

From Definition 6 and Equation 12, the NCP uses a Posit encoding for representing values close to zero, while it uses an IEEE-Like encoding for values far from the zero value.

Definition 8: In case the NCP has the T-flag set to 1, IEEE-Like encoding, the exponent can be either represented in two's complement or biased form.

Figure 10:
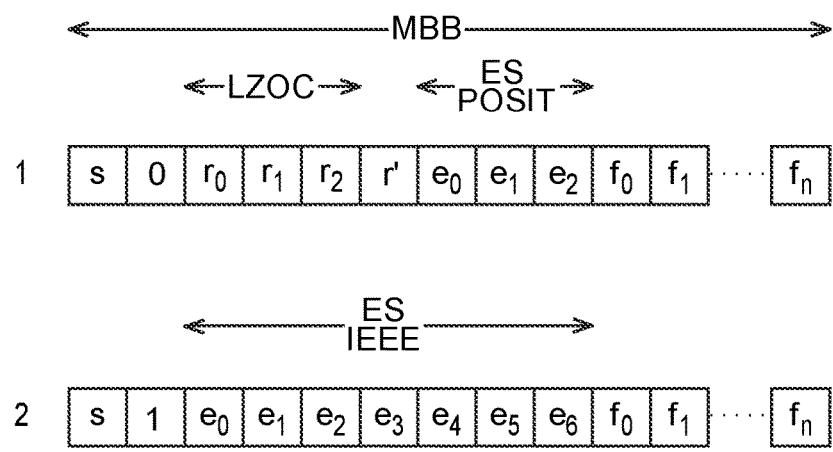
FIG. 10 represents a Not Contiguous Posit format.

FIG. 10 represents two cases 1 and 2 of the Not Contiguous Posit format. The T-flag, which is the bit following the sign s, is for example equal to 0 for the Posit encoding (case 1), and to 1 for the IEEE-Like encoding (case 2).

Starting from Definition 7, in FIG. 10, it can be observed that case 1 looks like a Posit encoding, while case 2 an IEEE-Like encoding.

Definition 9: In the NCP format, if the T-flag is set to 0 (Posit encoding), the fields after the T-flag are Regime+ Termination bits, exponent and mantissa. Otherwise, if the T-flag is set to 1, the fields after the T-flag are exponent and mantissa, as the IEEE-Like.

Definition 10 The NCP format has four parameters to be tuned: in addition to MBB, two different Exponent Sizes (ES) can be configured, ES_IEEE and ES_POSIT. Finally, it is possible to tune the IEEE-Like exponent encoding type, as biased or two's complement.

The advantage of using the Not Contiguous Posit format with respect to the Posit format is that NCP can have a minimal guaranteed precision. Therefore, it is possible to analyze the error of an algorithm a priori. Using the Posit format, for instance, makes the error estimation impossible, since there is no guarantee concerning the limited exponent length.

Definition 11: Since the NCP guarantees a minimum number of mantissa bits, this format allows the representation of Infinity, NaN and zero values, like the IEEE-Like with biased exponent—see Table 4 below.

TABLE 4

| Not Contiguous Posit special encodings | |
|---|---|
| | bit-stream |
| Zero | 0000~00 |
| +Inf | 0111~10 |
| −Inf | 1111~10 |
| sNaN | 1111~11 |
| qNaN | 0111~11 |

Figures 11, 12:
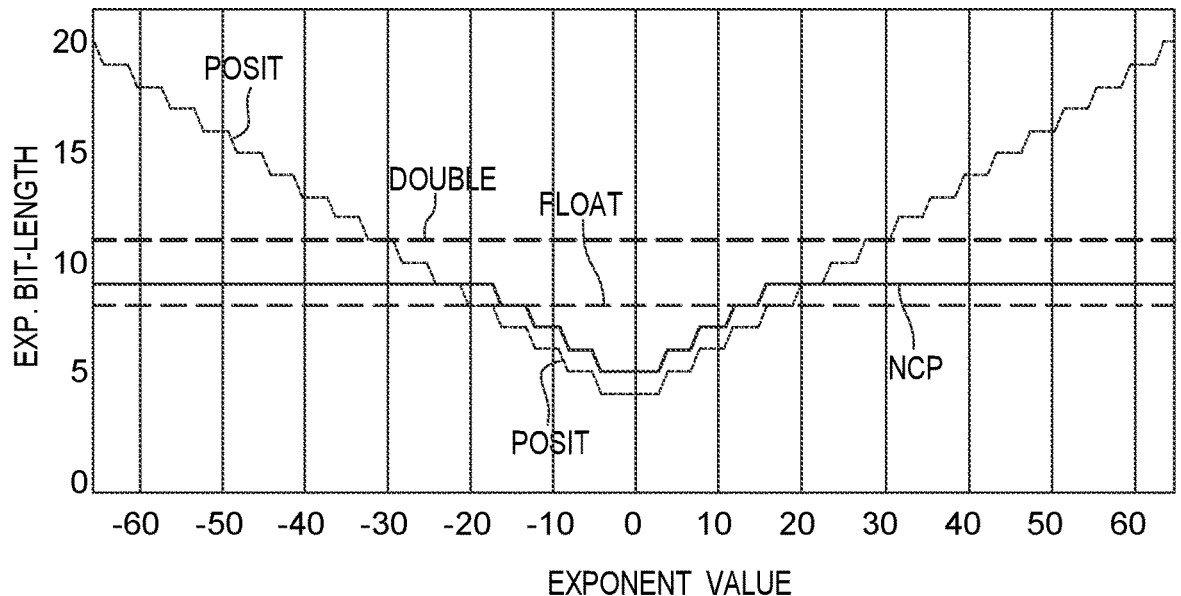
FIG. 11 represents conversion examples based on the Not Contiguous Posit format.
FIG. 12 is a graph representing an exponent bit-length for four different FP formats.

FIG. 11 represents conversion examples based on the Not Contiguous Posit format, for two values A and B. For value A, the T-flag (second bit from the left), is set to 0. This indicates that the rest of the NCP encoding is intended as a Posit format. The value of the NCP in this case is computed as a Posit format (Equation 13). For value B, the T-flag (second bit from the left) is set to 1. This indicates that the rest of the NCP encoding is intended as an IEEE-Like format. The value of the NCP in this case is computed as an IEEE-Like format (Equation 13).

FIG. 12 is a graph representing an exponent bit-length (EXP. BIT-LENGTH) as a function of the exponent value (EXPONENT VALUE) for the four different FP formats: double (DOUBLE), float (FLOAT), Posit with ES=2 (POSIT) and NCP format configuration with parameters ES_IEEE=8 and ES_POSIT=2. As expected, the combination of the Posit and IEEE-Like formats leads to a combination of the advantages of the two SoA formats. The NCP format uses few bits for the exponent encoding for values round zero, since it uses the Posit format for encoding these small values. In this case the T-flag is 0. Otherwise, the linear exponent growth of Posit with increases in the exponent value is limited by adopting an IEEE-Like encoding instead. In this case the T-flag is 1.

The NCP format exponent size is considered as:
1) T-flag+Regime Bit+Termination Bit+ES_POSIT, if T-flag equals 0; or
2) T-flag+ES_IEEE, if T-flag equals 1.

The Modified Posit Format

FIG. 13 represents the Modified Posit (ModPosit or MP) format.

The Modified Posit format is described in more detail in the publication: A. Bocco, "A Variable Precision hardware acceleration for scientific computing", July 2020. It exploits some characteristics of Posit, but tends to bound the expansion of the exponent fields in a logarithmic growth. This implies a more precise representation with respect to Posit.

Definition 12 Modified Posit is formed of:
1) a sign bit s;
2) an exponent field containing the Regime Bits (RB) ($r_0$ to $r_3$ in FIG. 13), a Termination bit r', and exponent field ($e_0$ to $e_4$ in FIG. 13) for a portion of the explicit exponent (unsigned integer);
3) a fractional part (mantissa) ($f_0$ to $f_n$ in FIG. 13).

Definition 13 The Modified Posit has three parameters:
1) K: represents the minimal exponent length when the RB size equals one bit, K for example being provided as an input parameter;
2) S: represents the regime bits increment gap.
3) the MP format can be tuned in its byte-length by using the MBB parameter mentioned above.

The Modified Posit format parametrizes the size of the exponent field e, as shown in FIG. 13 and Equation 14 below. In this way, the exponent field in the MP format expands linearly with the RB size, Leading Zero Count (LZOC), value.

Equation 14:

$$ES = (S \cdot (LZOC-1) + K) \quad \text{[Math 13]}$$

The following Equation 15 expresses the formula for decoding the exponent value exp in the Modified Posit format:

$$\exp = \begin{cases} +\left[\left(\sum_{i=1}^{lzoc} 2^{i+(K-2)+((S-1)\cdot(i-2))}\right) - 2^{(K-1)+((S-1)\cdot(i-2))}\right] + e & \text{if positive exponent} \\ -\left[\left(\sum_{i=1}^{lzoc} 2^{i+(K-1)+((S-1)\cdot(i-1))}\right)\right] + e & \text{if negative exponent} \end{cases} \quad \text{[Math 14]}$$

In the MP format, once that the exponent is obtained from Equation 15 above, the values x and lzoc_max are expressed by the following Equations 16 and 17:

$$x = (-1)^s \cdot 2^{e-bias} \cdot \left(1 + \frac{f}{2^{fs}}\right) \quad \text{[Math 15]}$$

For example, both biased and unbiased exponent encoding is supported, and in the case that biased is used, the bias value is $2^{(ES-1)}$, whereas otherwise, for two's complement exponent encoding, bias=0.

$$lzoc\_max = \left\lfloor \frac{mbb\_bit - (K-S) - 2}{S+1} \right\rfloor \quad \text{[Math 16]}$$

The following Equation 18 provides the value of the absolute maximum lzoc, which represents the lzoc value that cannot be exceeded:

$$absolute\_lzoc\_max = EXPONENT\_IN\_LEN - K \quad \text{[Math 17]}$$

Definition 14 In the Modified Posit format, the parameters are chosen such that there is always at least 1 bit of mantissa.

Definition 15 In the Modified Posit format, when the Regime Bit (RB) size, lzoc is equal to lzoc_max (Equation 17), the Termination Bit (TB) disappears.

In the MP format, the maximum exponent exp_max is obtained, in accordance with Equation 19 below, using the Equation 15 with two modifications:
1) lzoc is substituted in the upper limit of the summation by lzoc_max (Equation 17); and
2) the +e contribution in Equation 15 is removed.

[Math 18]

$$\exp\_max = \begin{cases} +\left[\left(\sum_{i=1}^{lzoc\_max} 2^{i+(k-2)+((S-1)\cdot(i-2))}\right) - 2^{(k-1)+((S-1)\cdot(i-2))}\right] & \text{if positive exponent} \\ -\left[\left(\sum_{i=1}^{lzoc\_max} 2^{i+(k-1)+((S-1)\cdot(i-1))}\right)\right] & \text{if positive exponent} \end{cases}$$

The minimum exponent exp_min is given by the following Equation 20:

$$\exp\_min = -\exp\_max - 1 \quad \text{[Math 19]}$$

Starting from Definitions 14 and 15, special values are encoded as shown in Table 5:

TABLE 5

| Modified Posit special encodings | |
|---|---|
| | bit-stream |
| Zero | 0000~00 |
| +Inf | 0111~10 |
| −Inf | 1111~10 |
| sNaN | 1111~11 |
| qNaN | 0111~11 |

FIG. 14 represents conversion examples of two values A and B based on the Modified Posit format, with A: K=4 and S=1; and B: K=2 and S=1.

In value A, the RB size is 1 bit, (second bit from the left). Therefore, the size of the explicit exponent (fourth to seventh bits), is equal to 4 (Definition 13, Equation 14). The final exponent value is given by two contributions (Equation 15):

1) the value of the summation, which depends on the RB field size, lzoc; and
2) the value in the explicit exponent field.

In value A, the value of the summation is 0, while the explicit exponent equals 10. In value A, the final exponent equals 10. The MP final value can be computed using Equation 16.

In value B, the RB size is 2 bits (second and third bits from the left). Therefore, the size of the explicit exponent (fifth to seventh bits), is equal to 3 (Equation 14). The two exponent contributions are: −12 for the summation and 5 from the explicit exponent field. In value B, the final exponent equals −7. Again, the MP final value can be computed with Equation 16.

FIG. 15 is a graph representing an exponent bit-length (EXP. BIT-LENGTH) as a function of the exponent value (EXPONENT VALUE) for the four different FP formats: double (DOUBLE), float (FLOAT), Posit with ES=2 (POSIT) and the Modified Posit format with parameters K=1 and S=1. It can be seen that the MP format uses less bits for representing the same exponent field with respect to the Posit format. Therefore, the MP format can be considered as more precise than the Posit format.

Figure 16:
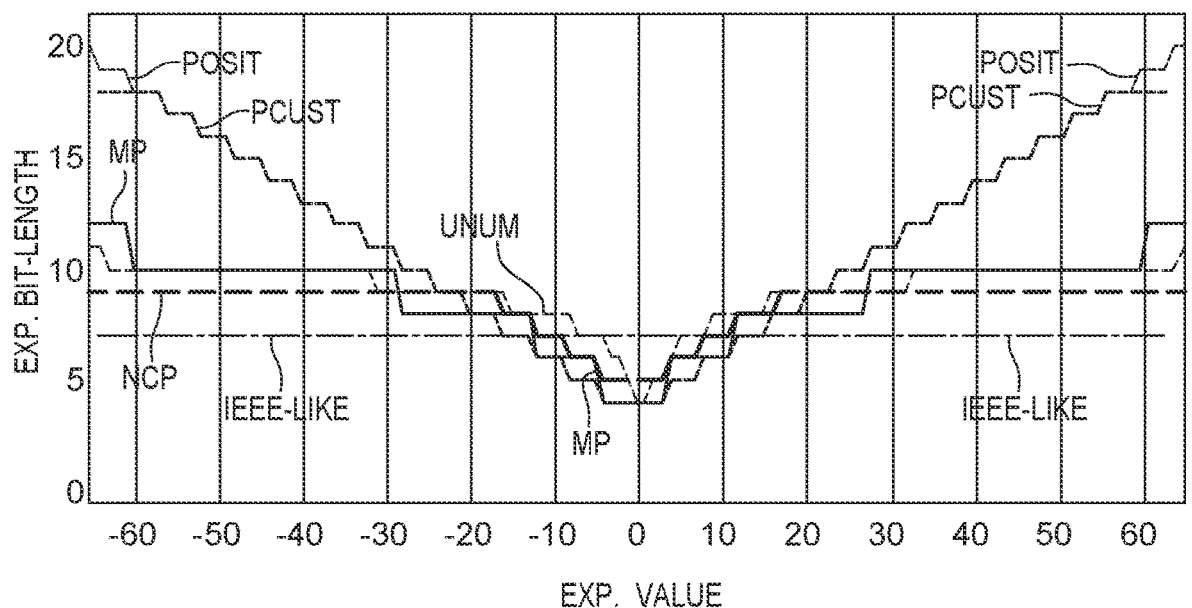
FIG. 16 is a graph representing an exponent bit-length for six different FP formats.

FIG. 16 is a graph representing an exponent bit-length (EXP. BIT-LENGTH) as a function of the exponent value (EXP. VALUE) for the six FP formats:

IEEE-Like with ES=7 (IEEE-LIKE);
Posit with ES=2 (POSIT);
UNUM with ESS=3 (UNUM);
Custom Posit with ES=2 and ES_MAX_DYNAMIC=7 (PCUST);
Not Contiguous Posit with ES_IEEE)=8, ES_POSIT=2 (NCP); and
Modified Posit with K=1, S=1 (MP).

The G-Number Binary Format

With reference again to FIGS. 1 and 2, the FP format used in the register files 104, 114 is for example a format having at least three separate fields: a sign field, exponent field and fractional part. An example of a format constructed in this way is the g-number binary format, described in more detail in the publication by Schulte "A family of variable-precision interval arithmetic processors", IEEE Transactions on Computers, Volume: 49, Issue: 5, May 2000.

Figure 17:
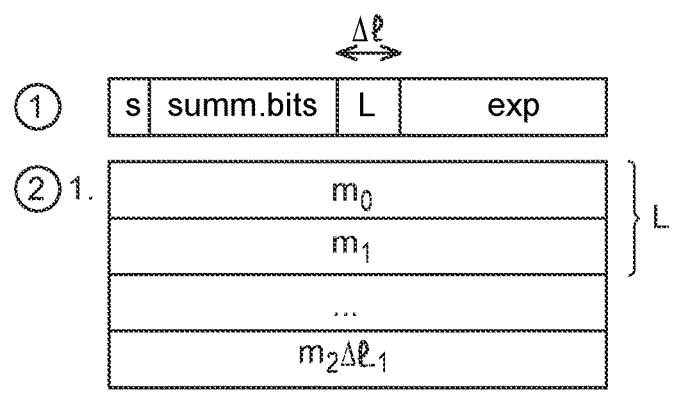
FIG. 17 represents a g-number binary format.

FIG. 17 represents the g-number binary format. There is not a proper definition in how a g-number has to be implemented. However, the modeling shown in FIG. 15 is proposed in the publication by A. Bocco referenced above. The g-number is divided into two sections.

The first section 1 is called g-number header. It has a sign bit s, followed by summary bits (summ. bits): these are just 1-bit flags for indicating special value encodings. There are for example the following six summary bits in sequence: is_zero, is_nanquiet, is_nansignaling, is_infopen, is_infclose and is_exact. After the summary bits, there is a length (L) field. It expresses the number of 64-bit mantissa chunks that the Floating-Point g-number is made of. Following this, there is an 18-bit exponent exp, represented in two's complement form.

In the second g-number section 2, there are $2^{maxL}$ mantissa chunks, starting from the most significant, $m_0$, to the least significant one, $m_{2^{maxL}-1}$. Each mantissa chunk is for example of b bits, where b is for example a power of two, equal to 64 in one example. The mantissa of the g-number is always expressed in the normalized form, 1.f. However, just L of them are used to encode the number.

G-Number Load and Store Unit

According to one example embodiment, the load and store unit 200 of FIG. 2 is a g-number load and store unit, as will now be described in more detail with reference to FIG. 18.

Figures 18, 19A:
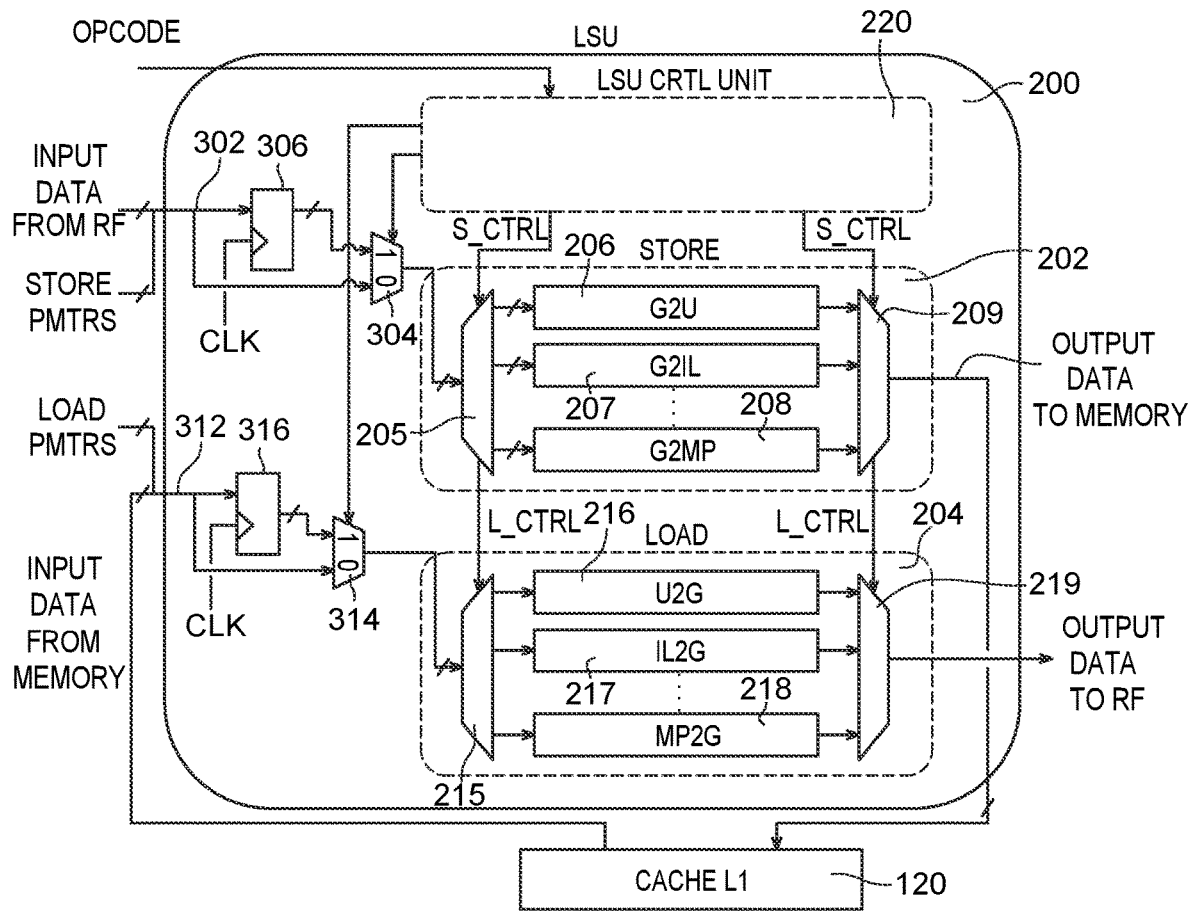
FIG. 18 schematically illustrates the format conversion circuit of FIG. 2 in more detail according to an example embodiment of the present disclosure.
FIG. 19A represents a status register according to the UNUM format.

FIG. 18 schematically illustrates the format conversion circuit 200 of FIG. 2 in more detail according to an example embodiment of the present disclosure.

In the example of FIG. 2, the converters 206, 207 and 208 of the conversion unit 202 respectively perform g-number to UNUM format conversion (G2U), g-number to IEEE-like format conversion (G2IL) and g-number to modified Posit conversion (G2MP). Similarly, the converters 216, 217 and 218 of the conversion unit 204 respectively perform UNUM format to g-number conversion (U2G), IEEE-like format to g-number conversion (IL2G) and modified Posit to g-number conversion (MP2G). Of course, these format conversions are merely examples, and alternative or additional types of conversion could be added, or one or more of these format conversions could be removed.

As represented in FIG. 18, in addition to the input data from the register file (INPUT DATA FROM RF), one or more store parameters (STORE PMTRS) are also for example provided to the conversion circuit 200. The store parameters for example include the memory address of the store operation, and/or parameters of the conversion, such as the format type or status register information. The input data and store parameters are for example provided on an input line 302 to the conversion unit 202 via a buffer 306 implemented for example by a D-type flip-flop, clocked by a clock signal CLK. The buffer 306 can for example be bypassed using a multiplexer 304 having one input coupled to the output of the buffer 306, and another input coupled to the input line 302. The output of the multiplexer 304 is for example coupled to the conversion unit 202.

FIG. 18 also illustrates the level one cache (CACHE L1) 120, which receives output data (OUTPUT DATA TO MEMORY) from the conversion unit 202, and provides input data (INPUT DATA FROM MEMORY) to the conversion unit 204. In addition to the input data from the memory, one or more load parameters (LOAD PMTRS) are also for example provided to the conversion circuit 200. The load parameters for example include an indication of the register of the register file to which the converted data of the conversion operation is to be loaded, and/or parameters of the conversion, such as the format type or status register information. The input data and load parameters are for example provided on an input line 312 to the conversion unit 204 via a buffer 316 implemented for example by a D-type flip-flop, clocked by the clock signal CLK. The buffer 316 can for example be bypassed using a multiplexer 314 having one input coupled to the output of the buffer 316, and another input coupled to the input line 312. The output of the multiplexer 314 is for example coupled to the conversion unit 204.

The multiplexers 304 and 314 are for example controlled by the LSU control unit 220 to select the input data before or after the buffers 306 and 316 to be provided to the conversion unit 202, 204. Indeed, if the conversion unit 202 is busy when a new input data value arrives for conversion, the data value, and the store parameters, are for example buffered in the buffer 306 until they can be processed, at which time an edge of the clock signal CLK is for example applied. Alternatively, if the conversion unit 202 is not busy, the input data is for example provided straight to the conversion unit 202 using the multiplexer 304 to bypass the buffer 306. Similarly, if the conversion unit 204 is busy when a new input data value arrives for conversion, the data value, and the load parameters, are for example buffered in the buffer 316 until they can be processed, at which time an edge of the clock signal CLK is for example applied. Alternatively, if the conversion unit 204 is not busy, the input data is for example provided straight to the conversion unit 204 using the multiplexer 314 to bypass the buffer 316.

In operation, VP FP data can be stored to memory, via the cache 120, with a different precision with the respect to the one that is specified by WGP. The precision to be stored in memory is for example tuned by the MBB of the status register SR, with a byte-granularity.

As a consequence of having two different precisions in the g-number FPU and in the memory implies the use of a rounding operation inside the store unit of the gLSU, and in particular within each converter. Indeed, situations might occur in which the computed g-number is more precise than the value that must be stored in memory.

FIG. 19A represents an example of a status register, among the status registers 124, according to the UNUM format. A similar status register is for example provided for each supported format. VP FP is based on the assumption that the FP format can be tuned at programming time. In order to support this in hardware, the architecture includes a means, in the form of a status register, for storing the user preferences while performing the FP operation.

Status Registers are made of different separate fields, each of them containing the user configuration. As an example, as shown in FIG. 19A, the UNUM format parameters ESS and FSS are stored in the SR. In addition to these two, the MBB and the rounding mode, RND, can be chosen at programming time, for instance. The working G-number precision (WGP) is also defined by a parameter, and for example sets the precision of the G-number FPU 116, by representing for example the number of chunks of data used during the gFPU operations, each chunk for example being of 64-bits, or of another size.

In the case of the Posit or Custom Posit formats, the status register for example includes the parameters MBB, ES and RND.

The status register of each format for example defines the parameters RND, WGP and MBB. Other parameters depend on the particular format.

The parameters defined in each status register define a data environment, which can be the computing environment in the case of formats used in the internal memory and used for computations, or the memory environment in the case of formats used for storage to the external memory. The group of status registers for each of the supported formats form for example an environment register file, that is provided in addition to the data register files 104, 114. The environment register file defines for example all of the available data environments support by the system.

In the example of FIG. 19A, the status register assumes a case in which there are two or more memory environments associated with the UNUM format, such as a Default Memory Environment (DME) and the Secondary Memory Environment (SME), and also a single computing environment WGP. However, in alternative embodiments there are additional memory, and/or computing, and/or floating-point status register file environments. In some embodiments, there is more than one status register defining a same computing format and/or more than one status registers defining a same external memory format, the different status registers for example defining different types of the formats having different values for MBB, BIS, RND and/or WGP.

The default memory environment and secondary Memory Environment are provided for example in order to permit two different configurations of the load and store operation. For example, the default memory environment is set to a relatively high precision format configuration, while the secondary memory environment is set to a relatively low precision formation configuration, or vice versa, and it is possible to swap quickly between the default and secondary configuration without having to reconfigure the status register at each change.

The SRs are for example set at programming time, for example through a dedicated RISC-V ISA Extension as described in the publication by T. Jost, "Variable Precision Floating-Point RISC-V Coprocessor Evaluation using Lightweight Software and Compiler Support", June 2019.

FIG. 19A illustrates an example of the status register that can be used to indicate the parameters of UNUM values stored to memory. This status register is for example accessible by the converters 206 and 216 of FIG. 18 in order to be able to correctly perform the data value format conversion. Similar status registers are for example provided for each supported number format.

The UNUM status register for example comprises, from left to right in FIG. 19A, an unused field (unused), two round bits (RND), two 3-bit parameters $D_{ESS}$ and $S_{ESS}$ respectively indicating the ESS value for the default memory environment and the secondary memory environment, two 4-bit parameters $D_{FSS}$ and $S_{FSS}$ respectively indicating the FSS value for the default memory environment and the secondary memory environment, a 3-bit parameter indicating the WGP and a 7-bit parameter indicating the MBB.

A peculiarity of these Status Registers is that they can for example be loaded and stored all together at once, or individually. Indeed, during coding initialization, all of the memory environments are for example initialized to the same default value, but during algorithm execution, one parameter may be changed at a time, for example in order to keep the MBB parameter constant.

FIG. 19B represent status registers according to a further example embodiment. FIG. 19B illustrates in particular an example of six status registers corresponding to the IEEE-like format (IL08), the UNUM format (UNUM), the Standard Posit format (PSTD), and the three custom VP FP formats: the Custom Posit format (PCUST), the Not Contiguous Posit format (NCP) and the Modified Posit format (MP). In the example of FIG. 19B, each status register has a length of 64 bits, although other lengths would be possible. For example, the fields of each status register include:
  a BIS field, which is for example 16 bits long (bits 0 to 15 in the example of FIG. 19B), and indicates the bit length, as an alternative to the value MBB. In alternative embodiments, the byte length or other data length metrics (i.e. 16-bit word numbers, etc.) could be provided;
  an RND field, which is for example 3 bits long (bits 16 to 18 in the example of FIG. 19B), and indicates the rounding mode, such as Round to Nearest Even, Round Up, Round Down, Round to Zero, Round to max magnitude, etc.;
  a first parameter field, which is for example 5 bits long (bits 19 to 23 in the example of FIG. 19B), and indicates a parameter that depends on the specific format, such as one of the parameters FSS (UNUM), ES_MAX_DYNAMIC, ES_POSIT (NCP) and S (MP);

a second parameter field, which is for example 8 bits long (bits 24 to 31 in the example of FIG. 19B), and indicates another parameter that depends on the specific format, such as one of the parameters ES (IL08, PSTD, PCUST), ESS (UNUM), IEEE_ES_M1 (NCP) and K (MP);

another field (OTHER), which is for example 16 bits long (bits 32 to 47 in the example of FIG. 19B), and indicates one or more other parameters, such as a stride parameter indicating the spaces between the beginning of two elements in memory, expressed for example as the number of MBB bits. For example, if stride=2, there are (2*MBB) bytes between the beginning of two consecutive elements; and a type field, which is for example 16 bits long (bits 48 to 63 in the example of FIG. 19B), and indicates the format type, which is used to select the target memory format. Depending on this type field, the bits of one or more of the fields of the Status Register for example have a different meaning. For example, based on the type field, the meaning of the bits stored in the first and/or second parameter field can be deduced. The type field is for example encoded in one-hot-encoding, or in another unequivocal encoding.

In some embodiments, a status register file stores status registers for one or more formats as represented in FIGS. 19A and 19B, and one or more further status registers define other parameters. For example, the one or more further status registers store, for arithmetic operations, parameters such as the output precision WP and/or the round mode RND, for memory operations, parameters such as the round mode RND, format configurations MBB or BIS for each format, the parameter ES for the IEEE-like and posit formats, the parameters ESS and FSS for the UNUM format, and/or parameters for FP operations, such as type, rnd, etc.

FIG. 19C represents status registers according to a further example embodiment. The status registers of FIG. 19C may be provided in addition to or instead of the status registers of 19B. The six status registers of FIG. 19C are similar to those of FIG. 19B, and contain the same fields. However, the status registers of FIG. 19C all define different types of a same FP format, in this case the IEEE-like format (IL08). Thus, a first group of bits of the type field of the status registers of FIG. 19C are for example all identical, and designate the IEEE-like format. Remaining bits define, for example, the specific format type of the IEEE-like format. Of course, while there are six status registers in the example of FIG. 19C, in alternative embodiments there could be any number, such as one, two or more such status registers.

The type fields in FIGS. 19B and 19C are identifiers that for example permit FP format types to be selected in a simple manner.

For example, each store instruction provided to the LSU 108 and/or 118 for example includes the identifier of the FP format type that is to be used in the external memory, and in particular to which the FP value is to be converted. The LSU 108 and/or 118 is for example then configured to perform the conversion by assessing the status registers 124, and obtaining from the status registers 124 the parameters of the FP format type associated with the identifier. These parameters are then for example fed to the format conversion circuit of the LSU 108 and/or 118 such that the FP value from the register file 104 or 114 is converted to the target FP format type prior to storage in the external memory. This conversion for example involves limiting the bit-length of the FP value based on a maximum size, e.g. BIS or MBB, defined by the floating-point number format type designated by the identifier.

Similarly, each load instruction provided to the LSU 108 and/or 118 for example includes the identifier of the FP format type that was used in the external memory, and in particular from which the FP value is to be converted. The LSU 108 and/or 118 is for example then configured to perform the conversion by assessing the status registers 124, and obtaining from the status registers 124 the parameters of the FP format type associated with the identifier. These parameters are then for example fed to the format conversion circuit of the LSE 108 and/or 118 such that the FP value loaded from the external memory is converted to the target FP format type prior to being stored in the register file 104 or 114.

An advantage of using the identifier of the type field of the FP format type to identify the desired FP format is that this solution permits relatively high flexibility without significantly increasing the instruction length and complexity. In particular, for a given FP value to be stored to memory, the format type can be selected from among the types defined in the status registers 124 by programming, by the software programmer, the corresponding identifier in the store instruction. Furthermore, modifications or additions to the format types defined in the status registers 124 can be introduced by writing directly to the status registers 124.

Hardware Converters

Examples of the layout of a physical hardware converter able to deal with load and store operations for the Variable Precision (VP) Floating-point (FP) formats: IEEE-Like, Posit, Not Contiguous Posit and Modified Posit, will now be descried with reference to FIGS. 20 to 31.

One or more of these hardware converters can for example be incorporated inside a hardware architecture such as the one described by Bocco Andrea, Durand Yves and De Dinechin, Florent in "SMURF: Scalar Multiple-Precision Unum Risc-V Floating-Point Accelerator for Scientific Computing" 2019 URL: https://doi.org/10.1145/3316279.3316280, and in particular, these converters for example implement the converters 206, 207, 208, 216, 217 and 218 of FIGS. 2 and 18, as part of a g-number LSU or the like.

Figure 20:
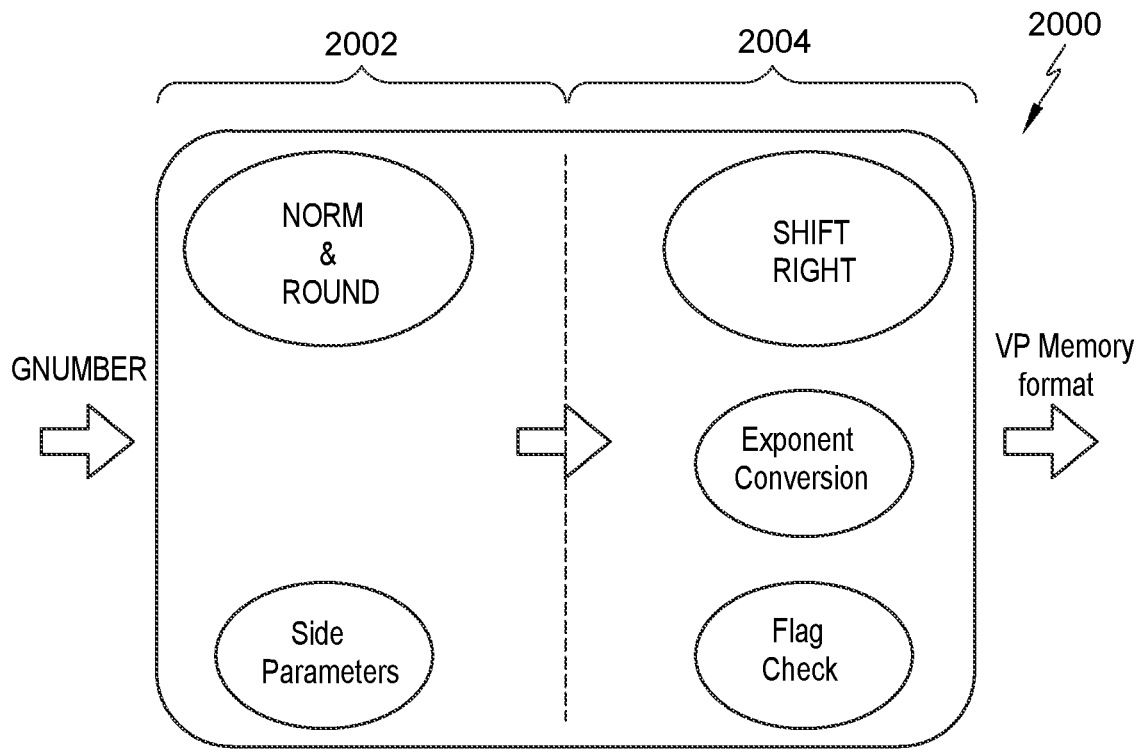
FIG. 20 schematically illustrates a hardware layout of a G-number to VP format converter according to an example embodiment of the present disclosure.

FIG. 20 provides a general layout 2000 suitable for the conversion from the g-number or similar format (GNUMBER), to any of the variable precision formats (VP Memory format). The converter 2000 for example comprises a first macro-stage 2002 comprising a normalizer and rounder block (NORM & ROUND), which is for example configured to perform normalization and rounding based on side parameters (Side Parameters), and a second macro-stage 2004 comprising a shift right circuit (SHIFT RIGHT), and exponent conversion circuit (Exponent Conversion) and a flag check circuit (Flag Check). In some embodiments, the exponent conversion circuit is instead implemented in one or more previous pipeline stages. A "macro-stage" is for example defined as the logic present between two timing barriers, and provides the result of an operation in one or more clock cycles.

Figure 21:
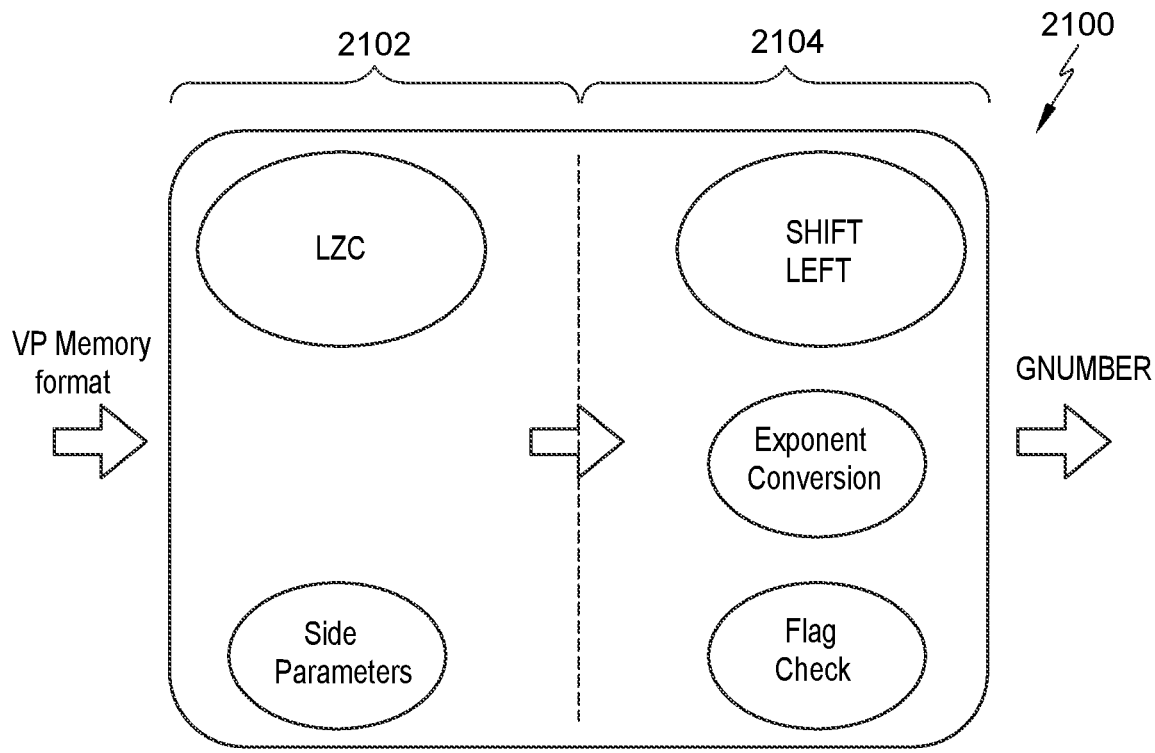
FIG. 21 schematically illustrates a hardware layout of a VP format to G-number converter according to an example embodiment of the present disclosure.

FIG. 21 provides a general layout 2100 suitable for the conversion from most of the variable precision formats (VP Memory format) to the g-number or similar format (GNUMBER). The converter 2100 for example comprises a first macro-stage 2102 comprising a leading zero count circuit (LZC), and a second macro-stage 2104 comprising a shift right circuit (SHIFT RIGHT), and exponent conversion circuit (Exponent Conversion) and a flag check circuit (Flag Check).

The LZC circuit is for example configured to detect the mantissa denormalization in the IEEE-like format, or to compute the regime bit-length in the Posit formats.

IEEE-Like Hardware Converters

Figure 22:
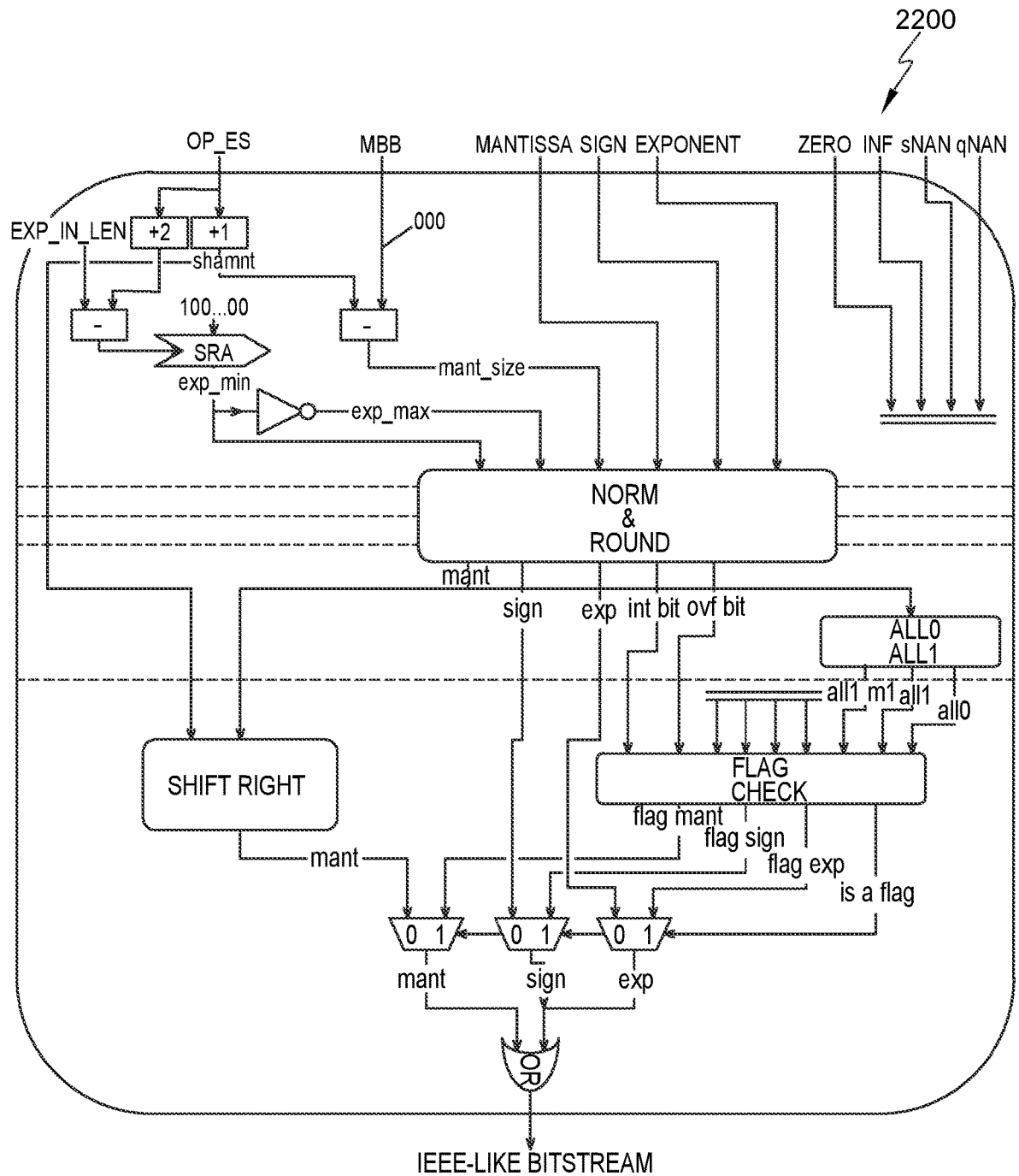
FIG. 22 schematically illustrates a converter for performing g-number to IEEE-like conversion according to an example embodiment of the present disclosure.

FIG. 22 schematically illustrates a converter 2200 for performing g-number to IEEE-like conversion according to an example embodiment of the present disclosure. This architecture is for example formed of four macro-stages, with an overall latency of at least 5 clock cycles depending on the size of the input, the rounder for example comprising, internally, four macro-stages: shift-amount, shift, round and shift. However, some of these macro-stages could be merged in order to reduce the number of macro-stages and the latency.

The first macro-stage comprises the normalization and Rounding operation performed by the normalize and round circuit (NORM & ROUND). In order to round the input mantissa, some parameters are for example computed before this normalization and rounding operator, such as the mantissa size (mant_size), and the parameters exp_min and exp_max, as shown in the top-left portion of the hardware. In particular, these parameters exp_min and exp_max are for example obtained by performing a Shift Right Arithmetic (SRA) of a constant 100~00, by a value computed as EXP_IN_LEN, for example equal to 18, minus OP_ES+2. The parameter exp_max is for example simply the negated version, generated by an inverter, of the parameter exp_min. The value EXP_IN_LEN could instead be computed in a previous pipeline stage, or be stored directly in the environment register files. This alternative implementation applies equally to the other format conversion architectures described below.

The mantissa size (mant_size) is for example generated based on a value shamnt (see below), for example equal to OP_ES+1, and the Maximum Byte Budget value MBB, which is for example extended by three zeros ("000"), thereby implementing a multiply by 8 operation. However, in the case that the bit length BIS is used instead of the byte length MBB, the length value is not extended by three zeros. This alternative implementation applies equally to the other format conversion architectures described below.

As mentioned above, the normalization and rounding circuit NORM & ROUND is for example formed of four internal stages (not illustrated in FIG. 22). The mantissa (mant) at the output of the NORM & ROUND circuit is analyzed by a circuit ALL0 ALL1, which is for example in charge of spotting whether the rounding step leads to a special encoding case (Zero, Inf, sNaN or qNaN), which is initially specified by the input g-number flags ZERO, INF, sNAN, qNAN.

The second macro-stage for example comprises the Shift Right circuit, which is configured to shift the rounded mantissa to the right in order to fill the final IEEE-Like bitstream, chaining it after the sign bit and the exponent field. In particular, the mantissa SHift AMouNT (shamnt) is for example computed in one of the previous stages, as well as the rounded mantissa mant. The SHIFT RIGHT circuit perform a Shift Right Logic (SRL), in order to making room for the sign bit and the exponent field. In parallel to this operation, the Flag Check circuit is configured to handle the special case encodings, coming from either the input g-number input flags ZERO, INF, sNAN, and qNAN, or due to the rounding process as indicated by the ALL0 ALL1 circuit. Based on this condition, three output multiplexers are used to select the correct fields mant, sign and exp. A 64-bit OR gate is for example used to link both the sign and the exponent parts, with the right-shifted mantissa part.

Figure 23:
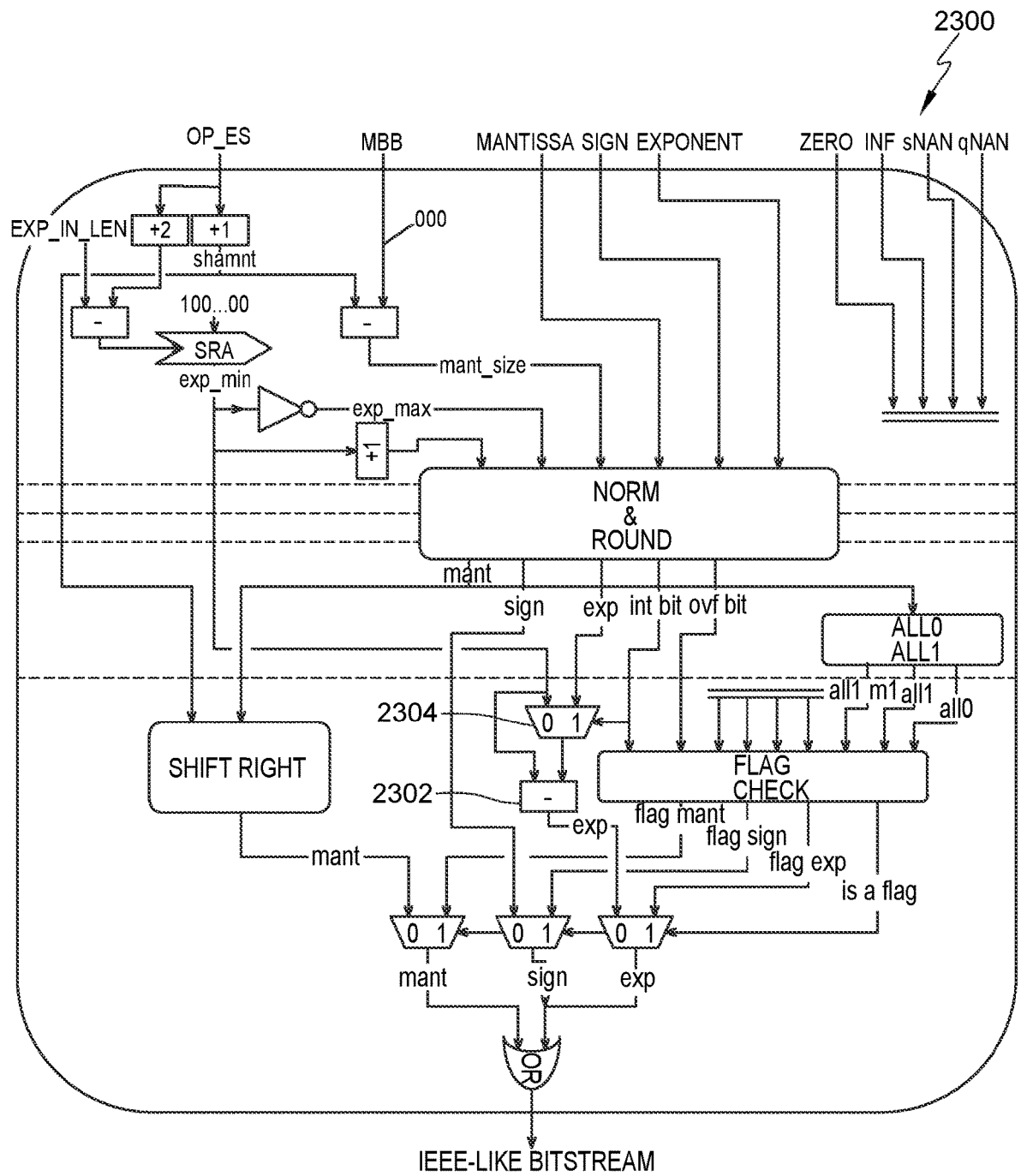
FIG. 23 schematically illustrates a converter for performing g-number to IEEE-like conversion similar to that of FIG. 22, but with support for subnormal and biased exponents, according to an example embodiment of the present disclosure.

FIG. 23 schematically illustrates a converter 2300 for performing g-number to IEEE-like conversion similar to that of FIG. 22, but with support for subnormal and biased exponents, according to an example embodiment of the present disclosure. Of course, the converter 2200 of FIG. 22 could equally be modified to support subnormal and biased exponents.

In particular, the converter 2300 is for example configured to support the biased exponent encoding, just as the IEEE-754 Standard format. This is a way of representing the exponent, different from the two's complement one. The main difference is just a fixed constant to sum to the exponent, which is always equal to the exp_min value. In order to support this, a further 16-bit adder 2302 is provided at the exponent output of the NORM & ROUND circuit.

It should be noted that the exponent that is provided as the input to the NORM & ROUND circuit, as well the parameters exp_min and exp_max, are not for example biased, due to the fact that both the g-number format, and the g-norm round itself, work for example with two's complement exponents.

Subnormal representation means that it is possible to represent a value smaller than the one fixed by the parameter exp_min. In particular, this is for example done by de-normalizing the mantissa when the minimum defined by the parameter exp_min is reached, meaning that the mantissa is no longer in the form 1.x, but in the form 0.0..01x. The mantissa is for example shifted by an amount subnorm_shamnt, defined by the following Equation 21:

$$\text{subnorm\_shamnt} = \text{exp\_min} - \text{exp} + 1 \qquad \text{[Math 20]}$$

where exp is the exponent value.

This subnormal representation is for example applied if the g-number input exponent is smaller or equal to the value defined by the parameter exp_min. This means that, if subnormal representation is supported, the parameter exp_min for which the mantissa is still normalized is no longer the minimum one, but rather the minimum one plus 1, also referred to as the subnormal bias (see Table 7 below). The difference is that the hidden integer bit of the mantissa is 0.x instead of 1.x.

The de-normalization is for example automatically performed by the logic performing the normalization of the final number.

In the embodiment of FIG. 23, support for the subnormal bias is for example implemented by the addition, with the respect to the embodiment of FIG. 22, of a multiplexer 2304 in order to perform selection of the correct exponent at the output of the NORM & ROUND circuit. This is because, again, the normalizer works in two's complement, and if the minimum defined by exp_min is reached, and so a denormalization is to be performed, the correct output of the NORM & ROUND circuit is exp_min+subnorm_bias. On the contrary, the correct parameter exp_min should be selected.

In order to perform the correct exponent selection in the subnormal case, it is for example sufficient to consider the mantissa Hidden Bit "int bit": when it is 0, it means that the mantissa has been de-normalized and the real parameter exp_min should be selected. Otherwise, the g-number exponent exp is selected.

Figure 24:
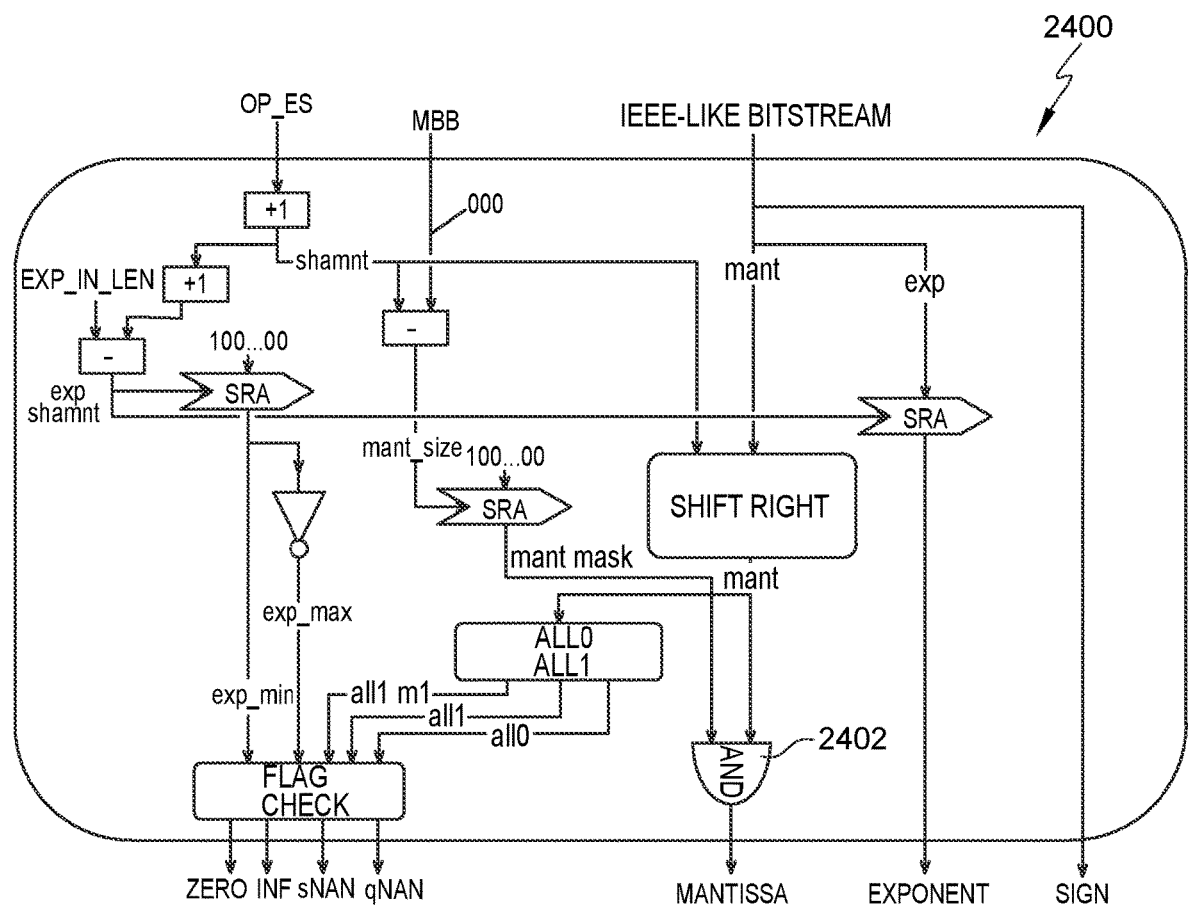
FIG. 24 schematically illustrates a converter for performing IEEE-like to g-number conversion according to an example embodiment of the present disclosure.

FIG. 24 schematically illustrates a converter 2400 for performing IEEE-like to g-number conversion according to an example embodiment of the present disclosure. This architecture for example comprises just one macro-stage, with an overall latency of 1 clock cycle, although this latency may increase with increases of precision.

From the IEEE-Like bitstream, the MSB is always the sign, and at most the next EXP_IN_LEN bits, 16 in this case, are used for storing the exponent. Therefore, the sign extraction is straightforward, and the exponent is isolated by performing a Shift Right Arithmetic (SRA) of the 16 MSBs, excluding the most significant bit of the stream, which is again the sign. The whole bitstream is also for example shifted left by the SHIFT LEFT circuit by a mantissa shift amount value shamnt, which is for example computed based on the Maximum Byte Budget (MBB) and OP_ES values. After the mantissa part mant has been extracted from the bitstream, it is for example combined, by an AND gate 2402 having a width equal to the width of the mantissa part, with a mask computed in parallel with the previous steps, based on the actual mantissa size. This is done due to the fact that the architecture is for example always fed with a 64-bit data value from the memory. Therefore, if the MBB specifies a lower number of bytes with respect to the one aligned in memory, the invalid data should be masked before providing the output data value of the converter.

Special cases, such as Infinite, Zeros, and Not a Number, are handled in parallel with the AND operation by the two circuits respectively called ALL0 ALL1 and Flag Check (FLAG CHECK), in a similar manner to FIG. 22. These two circuits are configured to detect special patterns in the bitstream and handle the output flags. The parameters exp_max and exp_min are computed as before.

Figure 25:
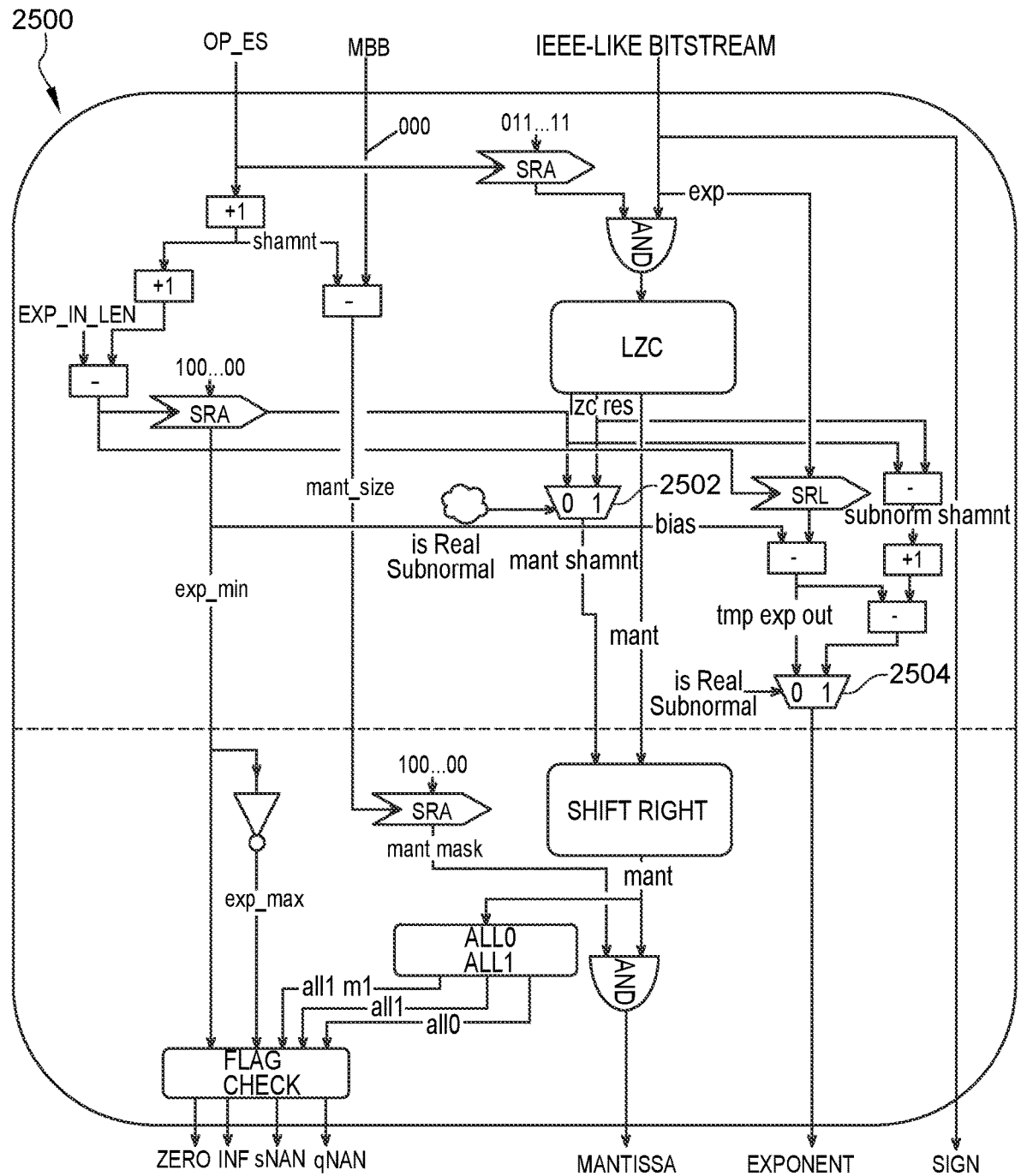
FIG. 25 schematically illustrates a converter for performing IEEE-like to g-number conversion similar to that of FIG. 24, but with support for subnormal and biased exponents, according to an example embodiment of the present disclosure.

FIG. 25 schematically illustrates a converter 2500 for performing IEEE-like to g-number conversion similar to that of FIG. 24, but with support for subnormal and biased exponents, according to an example embodiment of the present disclosure.

For the biased exponent encoding, the main difference with the two's complement representation is the implementation of a further addition: once the exponent is extracted, it is added to the bias. Moreover, a Shift Right Logic (SRL) instead of a Shift Right Arithmetic (SRA) is performed. Indeed, when handling a biased representation, there is no need to preserve the exponent MSB, because it does not represent the exponent sign.

Providing subnormal support leads to a bigger impact in terms of implementation and latency cost. Indeed, the first task to accomplish when dealing with a denormalized Floating-Point number is to count the leading zeros of the mantissa, in order to find the correct position of the Hidden Bit and so, perform a normalization step afterwards. This can for example be done by adding a pipeline stage before the one used in the standard IL2G conversion, containing an LZC circuit. The input of this unit is a masked version of the IEEE-Like encoding in order to remove the sign and exponent fields. Furthermore, in the first stage of this new architecture, some changes have to be made with the respect to the architecture 2400 of FIG. 24:

In case of a real subnormal representation (mantissa denormalized), the mantissa shift amount is different from the previous one, but is now equal to the result of the LZC circuit. In this way, at the output of the shifter, the mantissa is in the form 1.x. Therefore, two further multiplexers 2502, 2504 are included in order to select the correct signals for the cases that the input mantissa is denormalized or not. Logic for driving these multiplexers is also added, which for ease of illustration have not been illustrated in detail. However, this logic (represented as a cloud), is for example formed of one 16-bit adder, one 16-bit comparator, and two 2-input AND gates. The signal at the output of this logic is called isRealSubnormal (see Equation 22 below).

At the same time, the exponent conversion is handled accordingly. Indeed, in case the encoding is in a denormalized form (real subnormal number), the output exponent must be decoded taking into account the denormalization amount.

The following equations describe the IEEE-Like converters:

mbb_bit=MBB*8 mantissa_shift_amount=OP_ES+1 mantissa_size=mbb_bit−mantissa_shift_amount exp_min=100~00>>(EXP_IN_LEN−(OP_ES+2))

exp_max=not(exp_min)

isRealSubnormal=(is_exp_min='1')∧(sub_norm_shamnt−1<=mant_size_m1)∧(op_is_sub-norm='1')

mbb_min=OP_ES+2 mbb_max=FS_MAX+OP_ES+1    [Math 21]

The following tables 7 and 8 indicate the difference between Normal and Subnormal representation. In the driving example ES=2, biased exponent encoding, mantissa size=6

TABLE 6

NO SUBNORMAL SUPPORT

| EXP | HB | F | Value |
|---|---|---|---|
| 11 | 1 | 111111 | NaN |
| 11 | 1 | 111110 | INF |
| 11 | 1 | 111101 | MAX_VAL |
| 11 | 1 | 000000 | $(2^1)*1.000000$ |
| 10 | 1 | 111111 | $(2^0)*1.111111$ |
| 10 | 1 | 000000 | $(2^0)*1.000000$ |
| 01 | 1 | 111111 | $(2^{-1})*1.111111$ |
| 01 | 1 | 000000 | $(2^{-1})*1.000000$ |
| 00 | 1 | 111111 | $(2^{-2})*1.111111$ |
| 00 | 1 | 000001 | MIN_VAL |
| 00 | 0 | 000000 | ZERO |
| 00 | 0 | 000000 | ZERO |
| 00 | 0 | 000000 | ZERO |
| 00 | 0 | 000000 | ZERO |
| 00 | 0 | 000000 | ZERO |
| 00 | 0 | 000000 | ZERO |

TABLE 7

SUBNORMAL SUPPORT

| EXP | HB | F | Value |
|---|---|---|---|
| 11 | 1 | 111111 | NaN |
| 11 | 1 | 111110 | INF |
| 11 | 1 | 111101 | MAX_VAL |
| 11 | 1 | 000000 | $(2^1)*1.0000$ |
| 10 | 1 | 111111 | $(2^0)*1.111111$ |
| 10 | 1 | 000000 | $(2^0)*1.000000$ |
| 01 | 1 | 111111 | $(2^{-1})*1.111111$ |
| 01 | 1 | 000000 | $(2^{-1})*1.000000$ |
| 00 | 0 | 111111 | $(2^{-2})*1.111111$ |
| 00 | 0 | 100000 | $(2^{-2})*1.000000$ |
| 00 | 0 | 010000 | $(2^{-3})*1.000000$ |
| 00 | 0 | 001000 | $(2^{-4})*1.000000$ |

TABLE 7-continued

SUBNORMAL SUPPORT

| EXP | HB | F | Value |
|---|---|---|---|
| 00 | 0 | 000100 | $(2^{-5})*1.000000$ |
| 00 | 0 | 000010 | $(2^{-6})*1.000000$ |
| 00 | 0 | 000001 | MIN_VAL |
| 00 | 0 | 000000 | ZERO |

Figure 26:
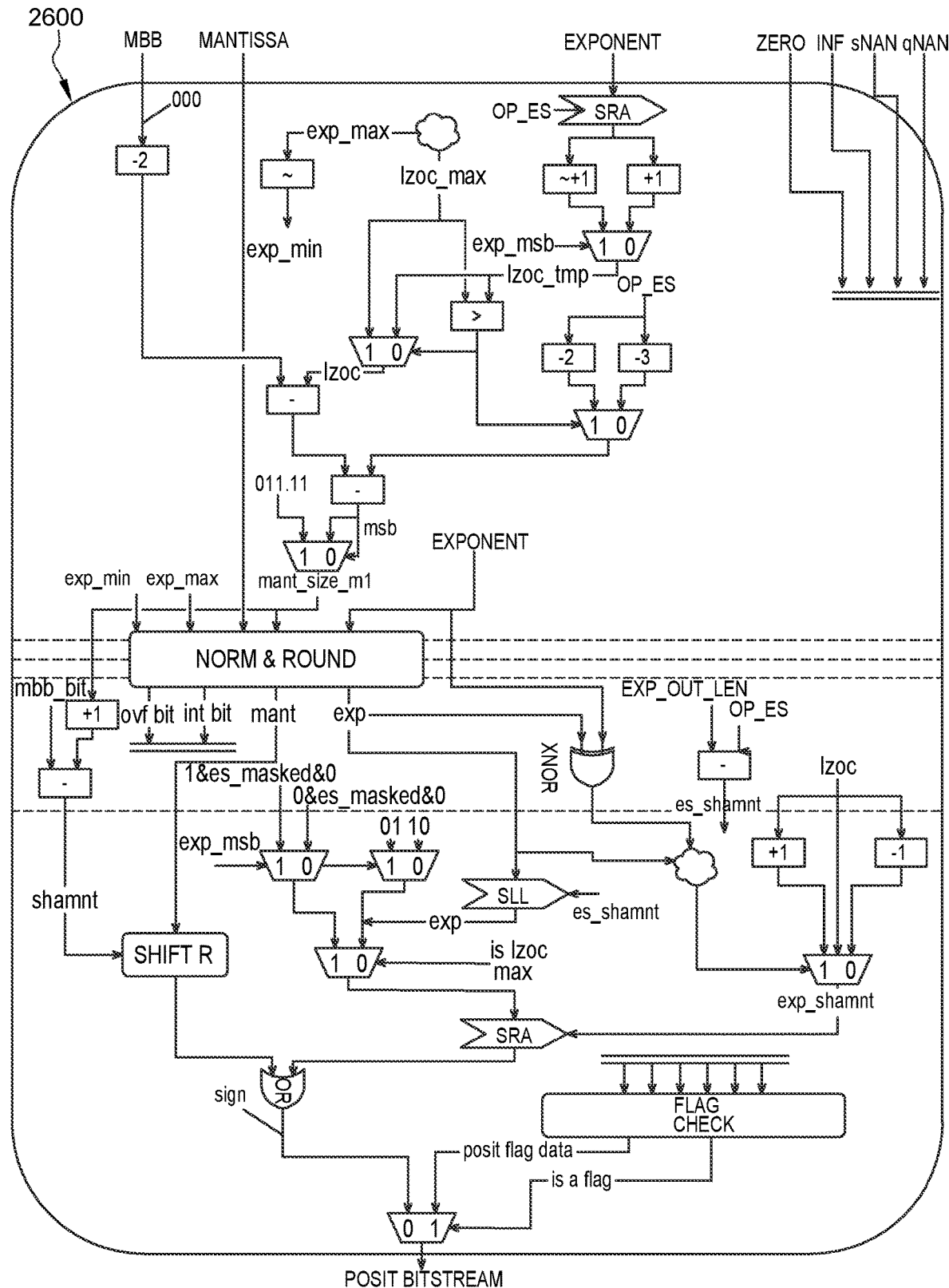
FIG. 26 schematically illustrates a converter for performing g-number to Custom Posit conversion according to an example embodiment of the present disclosure.

FIG. 26 schematically illustrates a converter 2600 for performing g-number to Custom Posit conversion according to an example embodiment of the present disclosure. This architecture is made of 2 macro-stages, with an overall latency of 4 clock cycles. This architecture benefits from the absence of the final two's complement stage used by Posit (see the publication Gustafson, John & Yonemoto, I., 2017). Beating floating point at its own game: Posit arithmetic. Super-computing Frontiers and Innovations. 4. 71-86. 10.14529/jsfi1170206).

Support for SUPPORT_ES_MAX features is introduced in order to overcome the problem of Posit, in which the user can define a very big number, characterized by a big exponent, actually equal to maxpos or minpos (see the above publication Gustafson et al. 2017), but leaving no space for the mantissa representation inside the FP encoding. In this case, the number has no precision, leading to a useless number in terms of algorithms computation.

In order to solve this problem, the custom implementation allows to specify an ES_MAX_DYNAMIC field. It has the purpose of define the parameter exp_max, and thus exp_min, that the Custom Posit can represent. This implicitly fixes the maximum span for the RB field, and so a minimum size mantissa is always guaranteed. Moreover, knowing a-priori the max length of the RB fields, in case it has a length of lzoc_max, there is no need to use a Termination Bit, used before to indicate the end of the RB stream. In this way, a further bit of precision is gained.

The computation of the parameter lzoc_max is for example performed in the first stage and uses several adders in order to implement the Equation 9 above. However, due to the combination of MBB, OP_ES and ES_MAX_DYNAMIC, at least a 1-bit mantissa should be always guaranteed by the user input.

In a configuration "Not support only NAR", the hardware is not supporting the Not a Real representation used by the Posit format (see the publication Gustafson, John & Yonemoto, I., 2017), in which a unique encoding is used for representing Infinite and Not a Number values. In this way there are further special encodings for the Posit, allowing to distinguish the special values. The main idea comes from using the same IEEE-Like policy for representing the Inf and NaN (Table 2):

NaN is represented as sign for distinguishing between Signaling and Quiet Not a Number. The exponent is set to the maximum, as well as the mantissa field, which is filled with 1s.

INF is represented as sign for distinguishing between +INF and −INF. The exponent is set to the maximum, as well as the mantissa field, which is filled with 1s and a 0 at the LSB.

Furthermore, in the standard Posit, the two's complement is used to avoid having a negative Zero representation. However, this implies further logic, which in our case, when handling multiple chunk mantissas, translates as a further pipeline stage, and so in a bigger latency. Therefore, two's complement is for example not supported, although it could be supported by additional computation.

Figure 27:
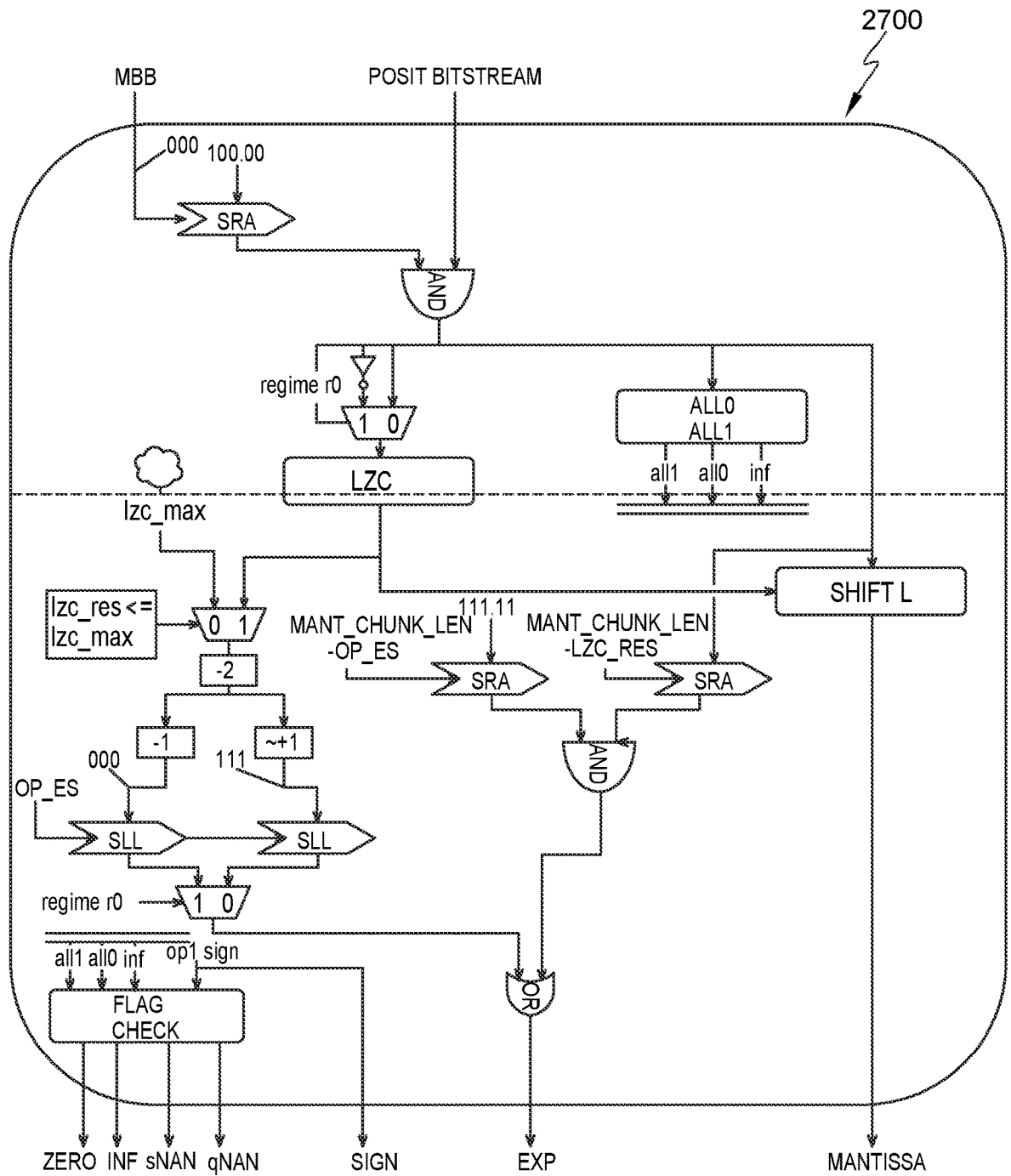
FIG. 27 schematically illustrates a converter for performing Custom Posit to g-number conversion according to an example embodiment of the present disclosure.

FIG. 27 schematically illustrates a converter 2700 for performing Custom Posit to g-number conversion according to an example embodiment of the present disclosure.

As for the G2PCUST conversion unit, this version of the architecture removes the two's complement stage. Thus, only the Leading Zero Counter and Shift Left stages are present, reducing the number of macro-stages to two, and in so doing, reducing the latency.

As far as SUPPORT_ES_MAX is concerned, the main difference with the respect to the Posit is that there are some further controls related to the computation of the regime bit size, the LZOC value. Indeed, in addition to the computation of lzoc_max, equally done in the other conversion block, the result at the output of the LZC circuits is for example truncated if it is greater than lzoc_max, allowing to have a correct exponent conversion, which, whether or not there us support for SUPPORT_ES_MAX, is computed in the same manner.

Regarding the support of Infinite and NaN special encodings:

In addition to the ALL0 check, which is now present in the same stage of the LZC circuit, an ALL1 component is also used. In this way, it is possible to distinguish between a Zero and Inf or NaN representations in the subsequent and last stage.

In the last stage, the Flag Check circuit for example also performs a check of the new signals coming from the ALL1 component, like mantissa all 1 s and mantissa all 1 s and a final 0. The correct output flag is for example raised also accordingly to the input stream sign.

The following equations describe the Custom Posit converters:

$$k = \frac{\exp - e}{2^{ES}} \qquad [\text{Math 22}]$$

where exp is the integer value of the input exponent, e is the integer value of the ES part of the input exponent.

$$lzoc = \begin{cases} -k, & \text{if } k < 0 \\ k+1, & \text{if } k >= 0 \end{cases} \qquad [\text{Math 23}]$$

$$es\_shift\_amount = EXP\_IN\_LEN - OP\_ES$$

$$k = \begin{cases} -lzoc, & \text{if } r_0 = 0 \\ lzoc - 1, & \text{if } r_0 = 1 \end{cases}$$

$$\exp = (k * 2^{ES}) + e$$

$$\exp\_max = \begin{cases} +2^{(MBB+8)-2} * 2^{ES}, & \text{Standard } Posit \\ -2^{(ES\_MAX\_DYNAMIC-1)} - 1, & \text{Custom } Posit \end{cases}$$

$$\exp\_min = \begin{cases} -2^{2-(MBB+8)} * 2^{ES}, & \text{Standard } Posit \\ -2^{(ES\_MAX\_DYNAMIC-1)} - 1, & \text{Custom } Posit \end{cases}$$

$$mantissa\_size = MBB * 8 - (3 + ES)$$

$$mant\_size\_max = MBB * 8 - (3 + ES)$$

$$mbb\_max = \begin{cases} FS\_MAX + ES + 2, & \text{Standard } Posit \\ FS\_MAX + (1 + \frac{(2^{ES\_MAX\_DYN-1} - 1) - 2^{ES-1}}{2^{ES}} + 1) + ES, & \text{Custom } Posit \end{cases}$$

$$mbb\_min = \begin{cases} ES + 3, & \text{Standard } Posit \\ (1 + \frac{(2^{ES\_MAX\_DYN-1} - 1) - 2^{ES-1}}{2^{ES}} + 1) - ES, & \text{Custom } Posit \end{cases}$$

Not Contiguous Posit Hardware Converters

Figure 28:
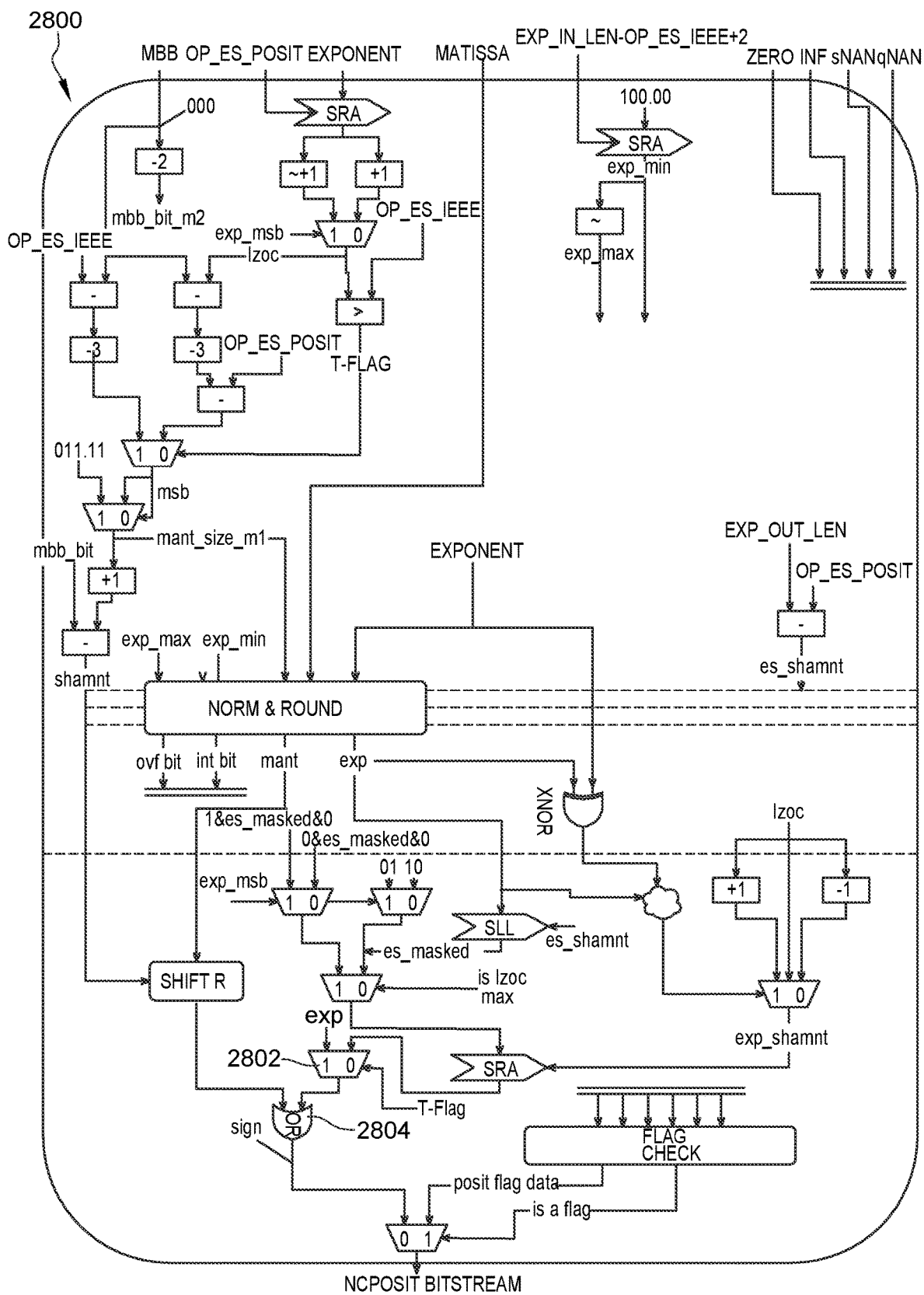
FIG. 28 schematically illustrates a converter for performing g-number to Not Contiguous Posit conversion according to an example embodiment of the present disclosure.

FIG. 28 schematically illustrates a converter 2800 for performing g-number to Not Contiguous Posit conversion according to an example embodiment of the present disclosure. This architecture is formed of 2 macro-stages, with an overall latency of 5 clock cycles.

The architecture 2800 is the same as the one implemented for the Custom Posit format, with the addition of some hardware related to the choice of the smaller exponent encoding size, as well as the IEEE-Like exponent conversion part. In the following, only the differences, in terms of hardware, with the respect to the Custom Posit are detailed.

In the NORM & ROUND circuit of the first macro-stage, the exponent size of Posit is computed and compared with the input parameter ES_IEEE. Thus, the value of the T-flag is decided accordingly (see Equation 12). However, the maximum exponent that an NCP can assume is for example always the one adopting the IEEE-Like format. On this basis, the parameters exp_max and exp_min can be computed as described herein in relation with the g-number to IEEE-Like conversion. All of the information needed to perform the Posit exponent conversion in the following stage is computed as before (lzoc, exponent sign, etc.), and forwarded to the next stage as before. The overall latency of this macro-stage is still just four clock cycles, given by the rounder internal pipeline.

In the Shift Right circuit (SHIFT R), apart from the mantissa right shift, this stage is the one that hosts the two formats exponent conversion in parallel. In particular, both the IEEE-Like and Posit exponents are computed and then, based on the T-Flag bit coming from the previous stage, the correct one is chosen by means, for example, of a multiplexer 2802. Also, in that case that the representation leads to a IEEE-Like exponent encoding, two's complement or biased formats can be selected by the user.

Finally, as before, the NCP encoding is obtained by doing an OR operation, using an OR gate 2804, between the shifted regime bit field+exponent and the shifted mantissa fields. The sign is inserted in the next stage.

Figure 29:
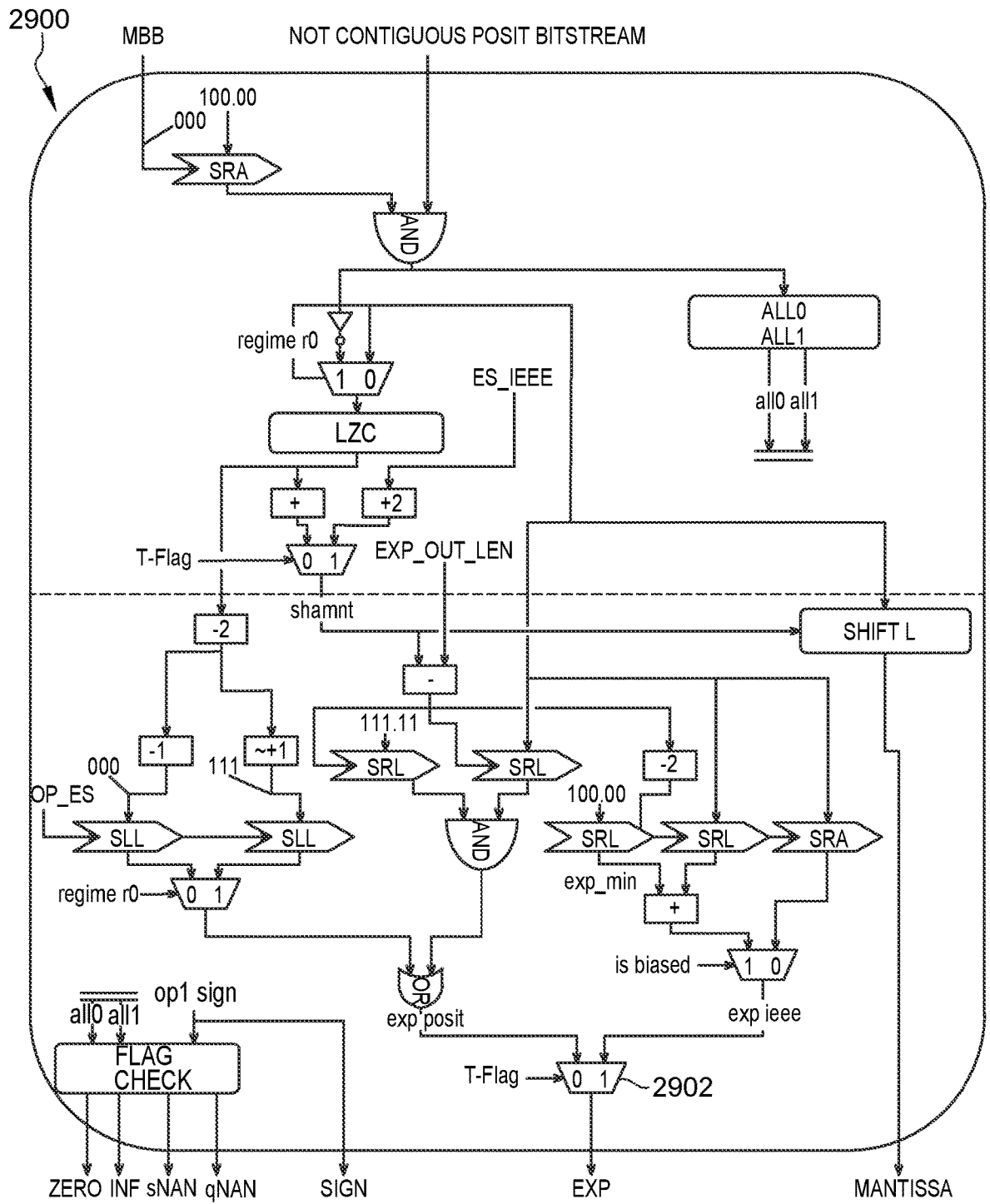
FIG. 29 schematically illustrates a converter for performing Not Contiguous Posit to g-number conversion according to an example embodiment of the present disclosure.

FIG. 29 schematically illustrates a converter 2900 for performing Not Contiguous Posit to g-number conversion according to an example embodiment of the present disclosure.

This architecture is made of 2 macro-stages, with an overall latency of 2 clock cycle.

As in the Custom Posit architecture, the input "bitstream" is provided as an input to the LZC circuit after being masked, in order to compute the size of the regime bits, in case the actual exponent is expressed in the Posit format. This information can be easily extracted from the "bitstream" by just considering the second MSB, the T-flag. In the case this is set to 1, the result of the LZC circuit is simply ignored. In parallel, the size of the exponent that has to be extracted is computed and, as always, the mantissa shift amount is calculated.

Regarding the shift left circuit (SHIFT L), based on the T-Flag value, the two methods of exponent extraction take place in parallel. Biased or two's complement exponent representation is supported in case it is an IEEE-Like encoding. A final multiplexer 2902 is used for deciding the correct extraction path, while the output mantissa is aligned. Usual checks for the representation of special values are performed.

The following equations describe the Custom Posit converters:

$$\text{mbb\_max} = \text{FS\_MAX} + \text{ES\_IEEE} + 2 \quad \text{[Math 24]}$$

$$\text{mbb\_min} = \text{MIN}(\text{ES\_POSIT} + 4, \text{ES\_POSIT} + 3)$$

$$\text{t\_flag} = \begin{cases} 0, & \text{if } (LZOC + \text{ES\_POSIT}) < \text{ES\_IEEE} \\ 1, & \text{otherwise} \end{cases}$$

$$\text{mant\_size\_m1} = \begin{cases} \text{mbb\_bit} - LZOC - 4 - \text{ES\_POSIT}, & \text{if t\_flag} = 0 \\ \text{mbb\_bit} - \text{ES\_IEEE} - 3, & \text{if t\_flag} = 1 \end{cases}$$

$$\text{shamnt} = \text{mbb\_bit} - \text{mant\_size}$$

$$\text{exp\_min} = 100{\sim}00 \gg (\text{EXPONENT\_IN\_LEN} - \text{ES\_IEEE} - 2)$$

$$\text{exp\_max} = \neg \text{exp\_min}$$

$$\text{ES\_POSIT} <= \text{ES\_IEEE} - 2$$

$$\text{lzoc\_max} = \text{ES\_IEEE} - \text{ES\_POSIT} - 1$$

Modified Posit Hardware Converters

Since what is essentially changing between one format and the other is the exponent conversion, the main steps are similar to the ones already discussed above. However, for both the conversion directions, the computation of the exponent is slightly more complex. This means that, in this case, the side parameters computation, such as Leading Zero One Count (LZOC), exp_max, exp_min and thus the shift amount and mantissa size needed for the other blocks, is not as straightforward as for the other cases.

In the Modified Posit hardware conversion blocks a more complex hardware design is expected due to the exponent encoding complexity. However, the number of main stages are still two for both the conversion directions.

Even if the MP format is parametrizable over K and S, the proposed hardware implementation is designed to support only as input parameter S=1. By doing so, the complexity of the algorithm is reduced during the exponent conversion steps.

Figure 30:
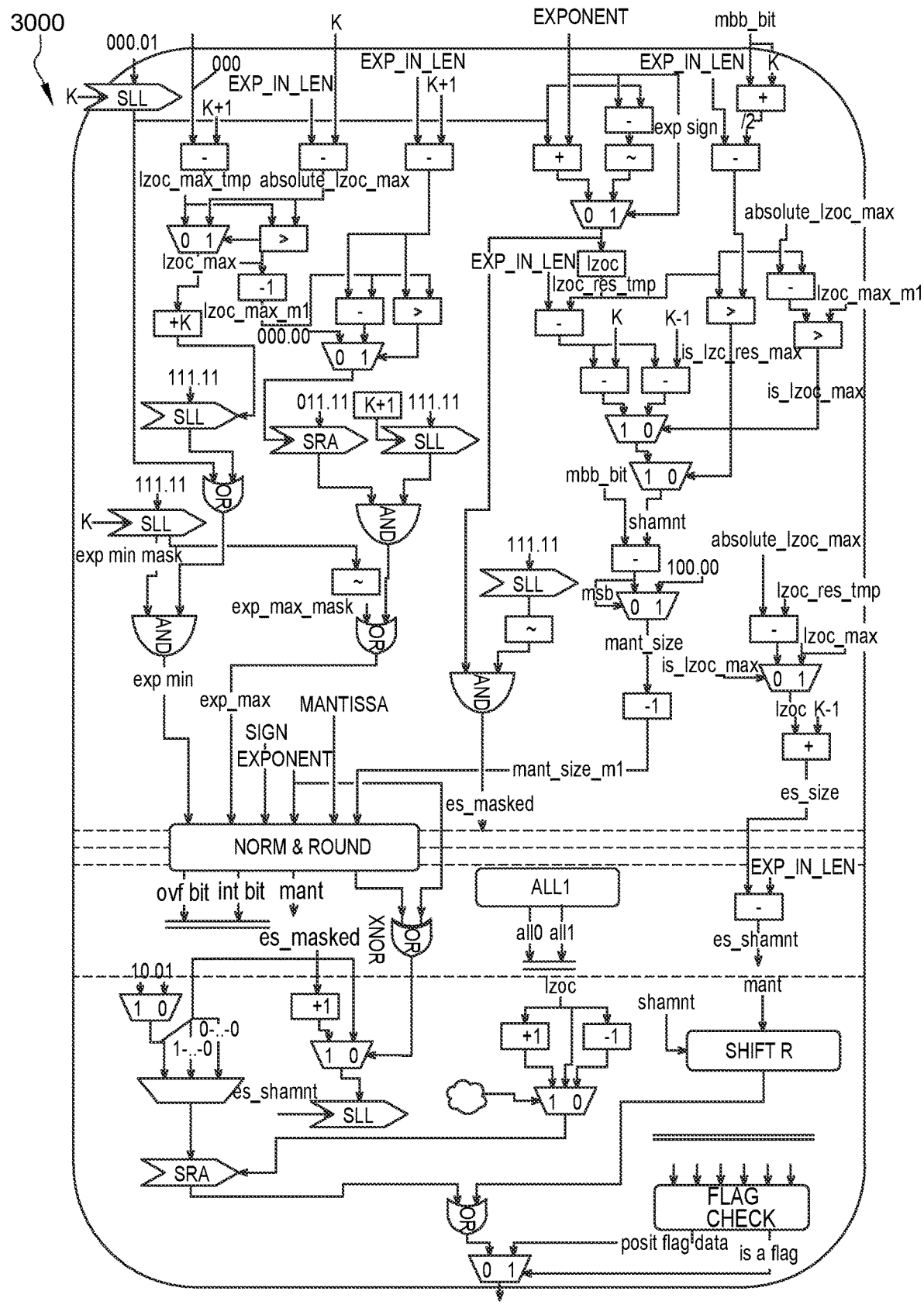
FIG. 30 schematically illustrates a converter for performing g-number to Modified Posit conversion according to an example embodiment of the present disclosure.

FIG. 30 schematically illustrates a converter 3000 for performing g-number to Modified Posit conversion according to an example embodiment of the present disclosure. This architecture is formed of 2 macro-stages, with an overall latency of 5 clock cycle.

The first stage is for example reserved for normalization and rounding of the input mantissa by the NORM & ROUND circuit. However, in order to get the usual parameters, some operations have to be carried out. The most intensive ones from a hardware point of view are the computations of both exp_max and exp_min, the es size (Equation 14) and so the mantissa size.

The first of these can be found using the same formula as the one for the general exponent (Equation 15), setting izoc=lzoc_max. In fact, given a two's complement exponent as the input, doing this in hardware leads to first computing the lzoc_max value, which is equal to $(\text{mbb}_{bit}-K-1)/2$ for this case S=1. However, this value should be less than the absolute lzoc_max. In order to generate exp_max, the string 111..11 is for example first shifted to the left by the lzoc_max_m1 amount, negated, and then by K+1 positions.

As for the shift right circuit (SHIFT R), after the normalization step, the cut mantissa is right-shifted for the final "bitstream". In parallel, knowing in advance the parameters lzoc and es_shamnt, the exponent conversion can be performed as the Posit one. The final value of lzoc used for shifting the initialized Regime Bits+e is chosen according to whether the round step made an exponent increasing or decreasing. Before sending out the final Modified Posit encoding, input flags, as well as rounding overflow or underflow, are checked in order to produce a special encoding if needed.

Figure 31:
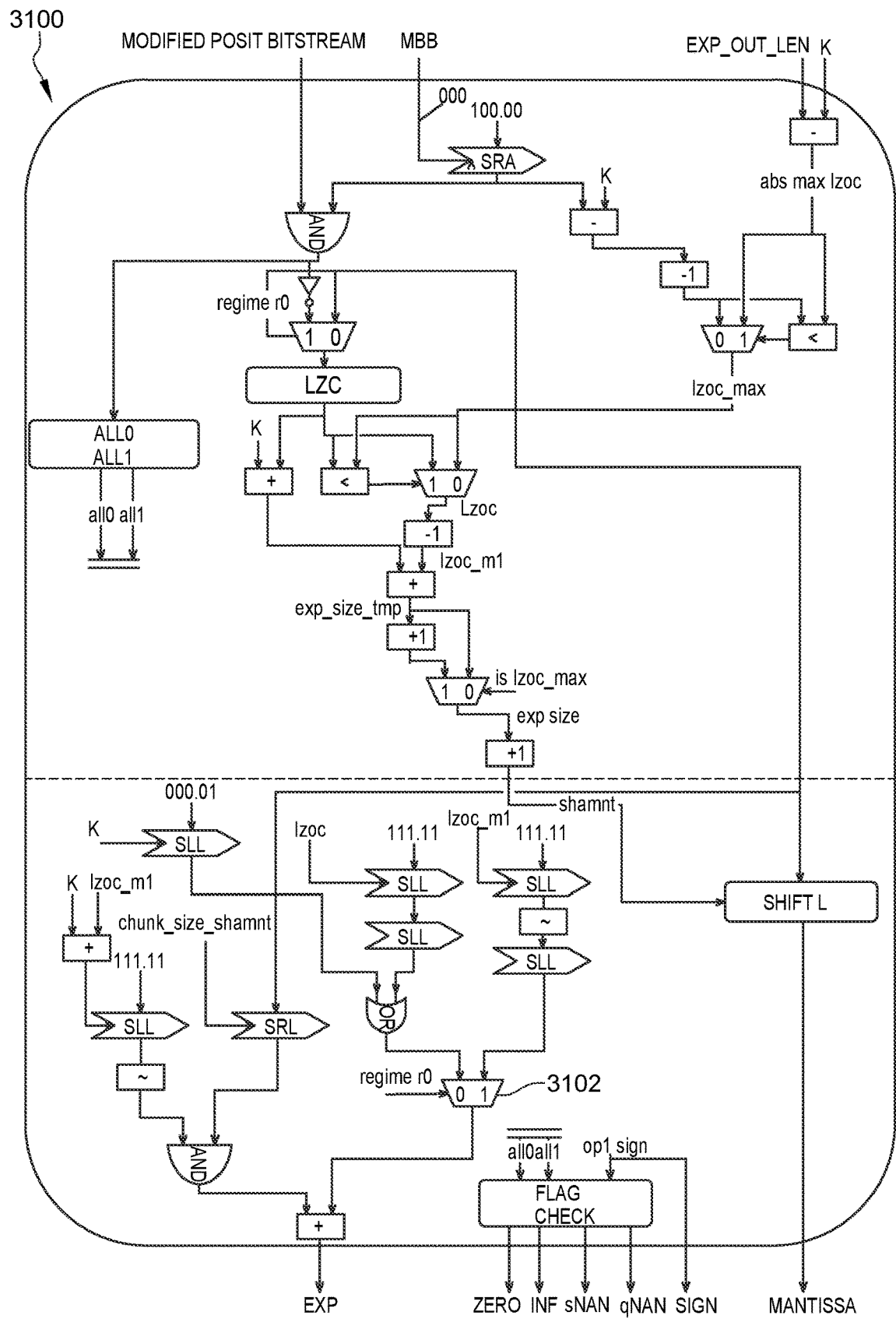
FIG. 31 schematically illustrates a converter for performing Modified Posit to g-number conversion according to an example embodiment of the present disclosure.

FIG. 31 schematically illustrates a converter 3100 for performing Modified Posit to g-number conversion according to an example embodiment of the present disclosure. This architecture is made of two macro-stages, with an overall latency of two clock cycle.

Leading Zero Counter: the input "bitstream" might have some random bits coming from the outside 64-bit aligned memory. Therefore, the bits exceeding the MBB limit are for example filtered out. Subsequently, the Leading Zero One Count (LZOC) value is computed by means of the LZC circuit. However, the LZOC result is for example limited to the lzoc_max value. Once the real lzoc has been computed, it is possible to also compute the parameter es_size, based on Equation 14, and so the following stage shift amount (see Equations 26 below). A part from this, the special values are checked using the All0-All1 components, which check whether the whole encoding is made of all bits of the same sign. The Flag Check component in the following stage handles this information.

The second stage for example hosts the Shift circuit (SHIFT L), taking the input "bit-stream", delayed by a pipeline stage, and shifting it left by the shift amount (see Equation 26 below). FIG. 31 demonstrates that most of the logic is used for the exponent conversion. Indeed, in this case, the g-number exponent reconstruction is not that straightforward: the idea is to compute the final exponent by means of adding two separate contributions, the base exponent and an offset. Due to the fact that, for the positive and negative exponents, the base computation is changing, they are for example computed in parallel, each by means of a couple of Shift Left Logic (SLL). Just by considering the first Regime Bit, the correct exponent base can for example be chosen by means of a multiplexer 3102. The other branch is realized by first right shifting the encoding, and then masking it with the K+lzoc_m1 least significant bits. Finally, the resulting exponent can be obtained by summing the exponent base and its offset.

The following equations describe the Modified Posit converters:

$$mbb\_max = FS\_MAX + K + 2 \quad \text{[Math 25]}$$

$$mbb\_min = K + 2$$

$$lzc\_exp\_in = \begin{cases} EXP\_IN - (1 << K), & \text{if } EXP\_IN < 0 \\ EXP\_IN + (1 << K), & \text{otherwise} \end{cases}$$

$$lzc\_exp = LZC(lzc\_exp\_in)$$

$$RFIELD\_LEN\_MAX = EXP\_IN\_LEN - K + 1$$

$$RFIELD\_LEN = EXRFIELD\_LEN\_MAX - lzc\_exp$$

$$es\_size = RFIELD\_LEN + (K - 2)$$

$$shamnt = 2 \cdot (EXP\_IN\_LEN - lzc\_exp) - K$$

$$mant\_size = mbb\_bit - shamnt$$

$$absolute\_lzoc\_max = EXPONENT\_IN\_LEN - K$$

$$lzoc = absolute\_lzoc\_max - lzc\_exp$$

$$lzoc\_max = \left\lfloor \frac{mbb\_bit - (K - S) - 2}{S + 1} \right\rfloor$$

It will be noted that the architectures of FIGS. 22 to 31 have certain features in common, notably the NORM & ROUND circuit, the SHIFT RIGHT/SHIFT LEFT circuits, and Flag Check circuit. While in the described embodiments these elements are duplicated among the converters, in alternative embodiments it would be possible to implement one or more of these circuits as a shared circuit, which is shared by a plurality of the format conversion circuits. Such an approach would for example lead to reduced circuit area.

Second Aspect—FP Rounding

Figure 32:
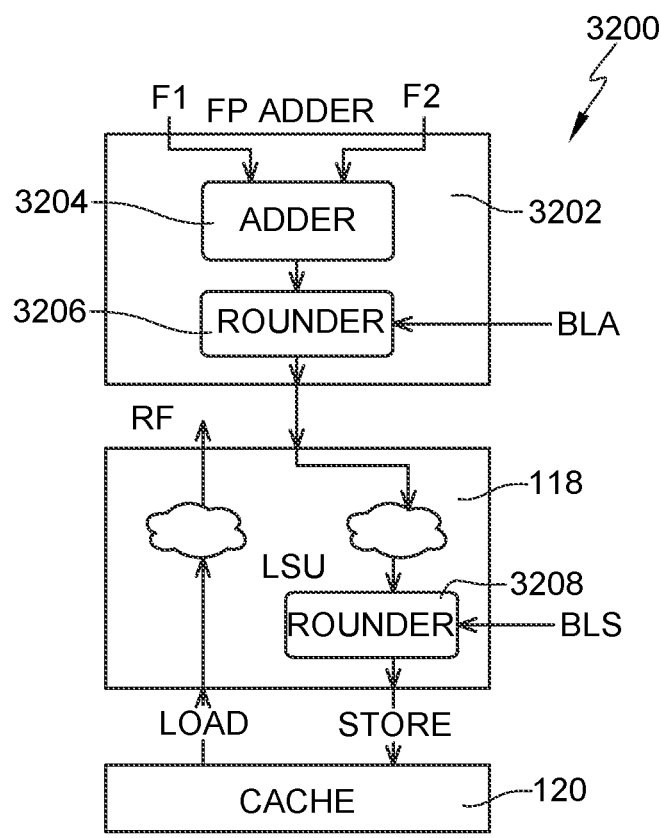
FIG. 32 schematically illustrates an example of an FP adder circuit.

FIG. 32 schematically illustrates an example of an FP addition chain 3200, comprising a floating-point adder (FP ADDER) 3202, the LSU 118, and the memory, such as the cache (CACHE) 120. FIG. 32 is based on a solution adopted in the publication: A. Bocco, "A Variable Precision hardware acceleration for scientific computing", July 2020, the difference in precision between the Floating-point Unit (FPU) and the data stored in memory is achieved by performing a rounding operation inside the g-number Load and Store Unit (gLSU).

The FP adder 3202 is configured to receive two floating-point values F1 and F2, and to add them using an adder circuit (ADDER) 3204. The FP adder 3202 further comprises a rounder circuit (ROUNDER) 3206, configured to selectively perform a rounding operation based on a control signal Byte-length ADD (BLA). Alternatively, the signal BLA indicates a bit length rather than a byte length. For example, the control signal BLA is based on the Working G-number Precision (WGP) value, which is for example held in the status register, and for example sets the addition bit or byte length. The output of the rounder circuit 3206 provides the rounded result of the addition.

The output of the FP adder 3202 is provided to the LSU 118, which in this embodiment comprises a further rounder circuit (ROUNDER) 3208, configured to selectively perform a rounding operation based on a control signal Byte-length STORE (BLS). For example, the control signal BLS is for example based on the Maximum Byte Budget (MBB) value, which sets the load/store byte length, and is for example held in the status register. Alternatively, the control signal BLS is based on the bit stored (BIS) value, which sets the load/store bit length, and is for example held in the status register. The result generated by the rounder circuit 3208 is provided as a store value STORE to the memory 120.

It is desirable to perform a rounding operation prior to storage of a data value by the LSU. Indeed, situations can occur in which the data inside the FPU is computed with a higher precision than the desired precision of the data to be stored. As a result, the mantissa of the number to be store should be rounded prior to storage.

For example, the code snippet below provides a pseudo-code example in which two number are consecutively added with a given precision (e.g. 64-bit), and then 3 bytes are stored in memory.

```
start:
    ADD.D      R2, R0, 0 ;            R2 = 0
    ADD.D      R6, R0, 5 ;            R6 = 5
loop:
    MUL.D      R3, R2, R1 ;           R3 = R2 × R1
    ADD.D      R4, R3, R4 ;           R4 = R3 + R4
    INC        R2 ;                   R2 = R2 + 1
    DEC        R6 ;                   R6 = R6 – 1
    BEZ        R6, loop
    ADD.D      R4, R3, R4 ;           R4 = R3 + R4
    ST         R4, 01, 3 ;            Store R4 in 01 with 3 byte-length
    (Need to round here as well)
```

Since the data is computed with a higher precision than the one to be stored in memory, the rounding is performed twice: 1) in the ADD.D adder (FP adder should have a rounding stage) for casting data to 64-bits, 2) in the store operator before sending data to the memory for casting data to 48-bits.

However, a drawback of the implementation of FIG. 32 is that there is a duplication of the relatively complex rounding circuits 3206, 3208, leading to a relatively high chip area and relatively high-power consumption. Furthermore, the rounding operation performed by the rounder circuit 3208 adds latency to the store operation. An additional drawback of performing rounding twice is that it can lead to an arithmetic error.

Figure 33:
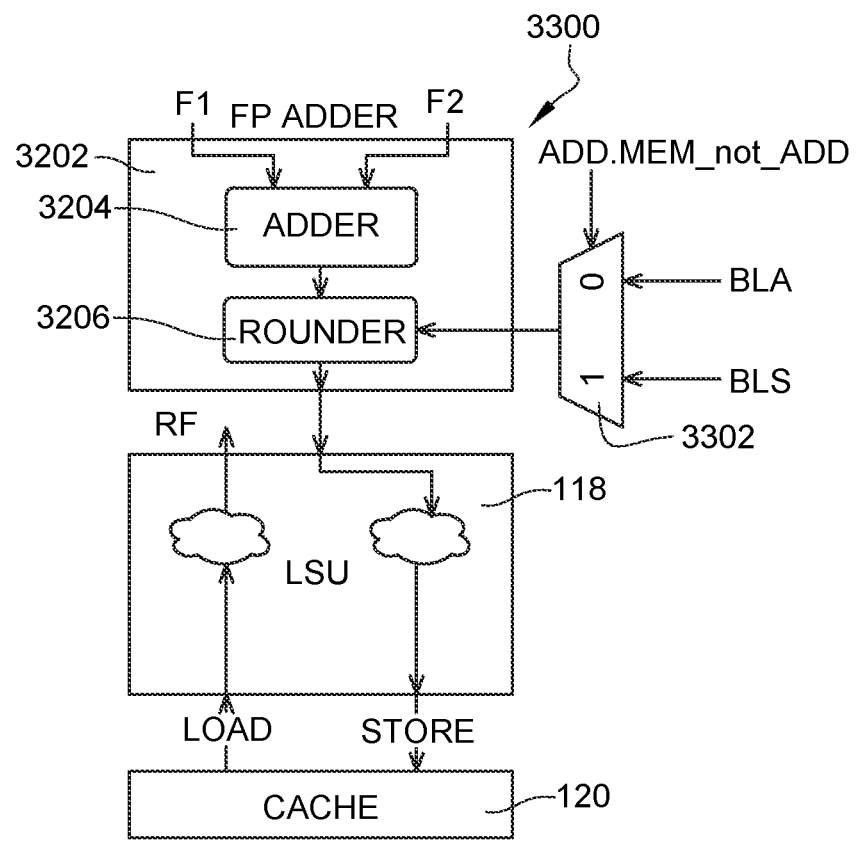
FIG. 33 schematically illustrates an FP adder circuit according to an example of the present disclosure.

FIG. 33 schematically illustrates an FP addition chain 3300 according to an example of the present disclosure. The chain 3300 for example comprises the same FP adder 3202 as the solution of FIG. 32, except that the rounder circuit (ROUNDER) 3206 is selectively controlled by one of two signals, the signal BLA or the signal BLS. For example, a multiplexer 3302 has one input coupled to receive the signal BLA, a second input coupled to receive the signal BLS, and a control input coupled to receive a control signal ADD.MEM_not_ADD, indicating whether or not the result of the FP addition by the FP adder 3202 is to be stored directly to memory or cache 120, or whether it is an intermediate result to be stored to the register file. In the case that the control signal ADD.MEM_not_ADD is at logic "0", the multiplexer 3302 for example supplies the control signal BLA to the rounder circuit 3206, such that rounding is based only on the needs of the computation being performed. Alternatively, in the case that the control signal ADD.MEM_not_ADD is at logic "1", the multiplexer 3302 for example supplies the control signal BLS to the rounder circuit 3206, such that rounding is based directly on the needs of the store operation.

Thus, the solution of FIG. 33 relies on anticipating the final rounding operation inside the adder, instead of inside the load and store unit 118. The rounder circuit 3208 in the load and store unit 118 is for example removed. This means that, for results of operations that are to be stored to external memory, a single rounding operation is applied prior to this storage, rather than a first rounding operation by the operation circuit (e.g. adder 3202) and then a second rounding operation by the load and store circuit 118.

While a single FP adder 3202 is illustrated in FIG. 33, in the case that the FPU comprises multiple FP adders 3202, each is for example equipped with the rounder circuit 3206 with a corresponding multiplexer 3302 for providing either the control signal BLA or the control signal BLS, adapted to the operation being performed.

For example, the signal ADD.MEM_not_ADD is generated based on a software instruction to an instruction set architecture (ISA) indicating when the result of the addition is to be stored to memory and not to be added again. Therefore, the ISA for example contains support for an instruction such as "ADD.MEM" that indicates when rounding is to be performed by the FPU prior to storage, and indicates, as a parameter in the instruction, the value BLS indicating the bit or byte length of the rounded number. In some embodiments, the instruction ADD_MEM also indicates the parameters exp_max and exp_min. This instruction differentiates from the "ADD.D" instruction because the precision of the add result can be decided by an instruction input parameter, or by the Status Registers described above. The following code snippet provides an example using ADD.MEM as a last add operation. By doing so, the last value of R4 will be casted by the adder itself as a 3-byte VP FP variable. In this way, the additional rounding stage inside the store operator can be avoided.

| 1 | start: | | |
|---|---|---|---|
| 2 | ADD.D | R2, R0, 0 : | R2 = 0 |
| 3 | ADD.D | R6, R0, 5 : | R6 = 5 |
| 4 | loop: | | |
| 5 | MUL.D | R3, R2, R1 : | R3 = R2 × R1 |
| 6 | ADD.D | R4, R3, R4 : | R4 = R3 + R4 |
| 7 | INC | R2 : | R2 = R2 + 1 |
| 8 | DEC | R6 : | R6 = R6 − 1 |
| 9 | BEZ | R6, loop | |
| 10 | | | |
| 11 | ADD.MEM | R4, R3, R4, 3 : | Round R4 to 3 byte while adding |
| 12 | ST | R4, 01, 3 : | Store R4 in 01 (No need to round here) |

Rather than being based on a specific instruction such as "ADD.MEM", rounding prior to storage could be triggered by the detection of a storage instruction. For example, logic in the architecture is configured to detect when a next instruction is a storage operation of the same destination register as a current operation, and if so, the currently running operation is changed to include the rounding prior to the storage operation. For example, in some embodiments, this involves automatically transforming, internally in the ISA, the current operation to one which includes rounding, such as from an ADD to an ADD.MEM operation in the case of the adder described in relation with FIG. 33.

While the rounding solution of FIG. 33 is described in relation with an FP adder, it will be apparent to those skilled in the art that the principle could be applied to other floating-point operation circuits, such as other arithmetic operation circuits, for example circuits configured to perform subtraction, multiplication, division, sqrt, 1/sqrt, log base e, log base 2, polynomial acceleration (i.e. division, sqrt, 1/sqrt, 1/x etc., performed by a Taylor sequence) etc., and/or to operation circuits for performing other operations, such as a move operation.

FIG. 33 illustrates the case of one FP operation circuit 3202. In alternative embodiments, an FP unit could comprise a plurality of the operation circuits 3202 each performing a different FP operation, and each comprising a corresponding rounder circuit 3206 and associated control circuit 3302. All of the operation circuits for example share a common load and store unit 118. Alternatively, it would be possible for an FP unit to comprise a plurality of the operation circuits 3202 each having a processing unit 3204 for performing a different FP operation, the plurality of operation circuits sharing a common rounder circuit 3206 and associated control circuit 3302. In other words, each of the operation circuits supplies its result to the rounder circuit 3206, which is configured to adapt the rounding operation based on the desired bit or byte length.

Furthermore, while the multiplexer 3302 forms part of the execute stage in the example of FIG. 33, in alternative embodiments the bit or byte length information could be multiplexed by the multiplexer 3302 integrated in a control unit of the instruction decode stage or issue stage, and the result forwarded to the operation unit 3202 of the execute stage.

Various embodiments and variants have been described. Those skilled in the art will understand that certain features of these embodiments can be combined and other variants will readily occur to those skilled in the art.

For example, while in the various formats biasing of the exponent value is described in order to center on zero, in alternative embodiments these formats could be biased in order to center the region where the encoding is more compact somewhere else other than the exp value 0.

In some embodiments, the floating-point computation circuit comprises a plurality of format conversion circuits according to the following example embodiments.

Example A1: a floating-point computation circuit comprising:
an internal memory (104, 114) storing one or more floating-point values in a first format;
a load and store unit (108, 118) for loading floating-point values from an external memory (120, 122) to the internal memory and storing floating-point values from the internal memory (104, 114) to the external memory (120, 122), the load and store unit (108, 118) comprising:
 a first internal to external format conversion circuit (206) configured to convert at least one of the floating-point values in the internal memory (104, 114) from the first format to a first variable precision floating-point format; and
 a second internal to external format conversion circuit (207) configured to convert at least one of the floating-point values in the internal memory (104, 114) from the first format to a second format different to the first variable precision floating-point format.

Example A2: The floating-point computation circuit of example A1, wherein the load and store unit (108, 118) further comprises:
 a first demultiplexer (205) configured to selectively supply the at least one floating-point value to a selected one of the first and second internal to external format conversion circuits (206, 207); and
 a first multiplexer (209) configured to selectively supply the converted value generated by the first or second internal to external format conversion circuit (206, 207) to the external memory (120, 122), wherein the selections made by first demultiplexer (205) and first multiplexer (209) are controlled by a first common control signal (S_CTRL).

Example A3: The floating-point computation circuit of example A1, wherein the load and store unit (108, 118) is configured to supply the at least one floating-point value to both of the first and second internal to external format conversion circuits (206, 207), the load and store unit (108, 118) further comprising a control circuit (220) configured to selectively enable either or both of the first and second internal to external format conversion circuits (206, 207) in order to select which is to perform the conversion.

Example A4: A floating-point computation circuit comprising:
an internal memory (104, 114) storing one or more floating-point values in a first format;
a load and store unit (108, 118) for loading floating-point values from an external memory (120, 122) to the internal memory (104, 114) and storing floating-point values from the internal memory (104, 114) to the external memory (120, 122), the load and store unit (108, 118) comprising:
 a first external to internal format conversion circuit (216) configured to convert at least one variable precision floating-point value loaded from the external memory (120, 122) from a first variable precision floating-point format to the first floating-point format, and to store the result of the conversion to the internal memory (104, 114); and
 a second external to internal format conversion circuit (217) configured to convert at least one further value loaded from the external memory (120, 122) from a second format to the first floating-point format, and to store the result of the conversion to the internal memory (104, 114).

Example A5: the floating-point computation circuit of example A4, wherein the load and store unit (108, 118) further comprises:
 a second demultiplexer (215) configured to selectively supply the at least one floating-point value to a selected one of the first and second external to internal format conversion circuits (216, 217); and
 a second multiplexer (219) configured to selectively supply the converted value generated by the first or second external to internal format conversion circuit (216, 217) to the internal memory (104, 114), wherein the selections made by second demultiplexer (215) and second multiplexer (219) are controlled by a second common control signal (L_CTRL).

Example A6: the floating-point computation circuit of example A4, wherein the load and store unit (108, 118) is configured to supply the at least one floating-point value to both of the first and second external to internal format conversion circuits (216, 217), the load and store unit (108, 118) further comprising a control circuit (220) configured to selectively enable either the first or second external to internal format conversion circuit (206, 207) in order to selection which is to perform the conversion.

Example A7: A method of floating-point computation comprising:
storing, by an internal memory (104, 114) of a floating-point computation device, one or more floating-point values in a first format;
loading, by a load and store unit (108, 118) of a floating-point computation device, floating-point values from an external memory (120, 122) to the internal memory (104, 114), and storing, by the load and store unit (108, 118), floating-point values from the internal memory (104, 114) to the external memory (120, 122), wherein the load and store unit (108, 118) is configured to perform said storing by:
 converting, by a first internal to external format conversion circuit (206), at least one of the floating-point values in the internal memory (104, 114) from the first format to a first variable precision floating-point format; and
 converting, by a second internal to external format conversion circuit (207), at least one of the floating-point values in the internal memory (104, 114) from the first format to a second format different to the first variable precision floating-point format.

Example A8: the method of example A7, wherein the load and store unit (108, 118) is configured to perform said loading by:
 converting, by a first external to internal format conversion circuit (216), at least one variable precision floating-point value loaded from the external memory (120, 122) from the first variable precision floating-point format to the first floating-point format and storing the result of the conversion to the internal memory (104, 114); and
 converting, by a second external to internal format conversion circuit (217), at least one further value loaded from the external memory (120, 122) from the second format to the first floating-point format, and storing the result of the conversion to the internal memory (104, 114).

Example A9: a method of floating-point computation comprising:

storing, by an internal memory (104, 114) of a floating-point computation device, one or more floating-point values in a first format;

loading, by a load and store unit (108, 118) of a floating-point computation device, floating-point values from an external memory (120, 122) to the internal memory (104, 114), and storing, by the load and store unit (108, 118), floating-point values from the internal memory (104, 114) to the external memory (120, 122), wherein the load and store unit (108, 118) is configured to perform said loading by:

converting, by a first external to internal format conversion circuit (216), at least one variable precision floating-point value loaded from the external memory (120, 122) from the first variable precision floating-point format to the first floating-point format and storing the result of the conversion to the internal memory (104, 114); and converting, by a second external to internal format conversion circuit (217), at least one further value loaded from the external memory (120, 122) from a second format to the first floating-point format, and storing the result of the conversion to the internal memory (104, 114).

Example A10: The method of example A7, A8 or A9, further comprising performing, by a floating-point unit (116), a floating-point arithmetic operation on at least one floating-point value stored by the internal memory (104, 114).

Example A11: The method of example A7, A8, A9 or A10, wherein the second format is a second variable precision floating-point format different to the first variable precision floating-point format.

Furthermore, while embodiments have been described in which a floating-point computation circuit may comprise a plurality of format conversion circuits, the following further example embodiments are also possible.

Example B1: a floating-point computation circuit comprising:

an internal memory (104, 114) storing one or more floating-point values in a first format;

a load and store unit (108, 118) for loading floating-point values from an external memory (120, 122) to the internal memory and storing floating-point values from the internal memory (104, 114) to the external memory (120, 122), the load and store unit (108, 118) comprising:

a first internal to external format conversion circuit (206) configured to convert at least one of the floating-point values in the internal memory (104, 114) from the first format to the Custom Posit variable precision floating-point format.

Example B2: a floating-point computation circuit comprising:

an internal memory (104, 114) storing one or more floating-point values in a first format;

a load and store unit (108, 118) for loading floating-point values from an external memory (120, 122) to the internal memory (104, 114) and storing floating-point values from the internal memory (104, 114) to the external memory (120, 122), the load and store unit (108, 118) comprising:

a first external to internal format conversion circuit (216) configured to convert at least one variable precision floating-point value loaded from the external memory (120, 122) from the Custom Posit variable precision floating-point format to the first floating-point format, and to store the result of the conversion to the internal memory (104, 114).

Example B3: in the circuit of example B1 or B2, the Custom Posit variable precision floating-point format for example comprises, for representing a number, a sign bit(s), a regime bits field (RB) filled with bits of the same value, the length of the regime bits field indicating a scale factor (useedk) of the number and being bounded by an upper limit (lzoc_max), an exponent part of at least one bit and a fractional part of at least one bit, and wherein the first internal to external format conversion circuit comprises circuitry for computing the upper limit (lzoc_max).

Example B4: a floating-point computation circuit comprising:

an internal memory (104, 114) storing one or more floating-point values in a first format;

a load and store unit (108, 118) for loading floating-point values from an external memory (120, 122) to the internal memory and storing floating-point values from the internal memory (104, 114) to the external memory (120, 122), the load and store unit (108, 118) comprising:

a first internal to external format conversion circuit (206) configured to convert at least one of the floating-point values in the internal memory (104, 114) from the first format to the Not Contiguous Posit variable precision floating-point format.

Example B5: a floating-point computation circuit comprising:

an internal memory (104, 114) storing one or more floating-point values in a first format;

a load and store unit (108, 118) for loading floating-point values from an external memory (120, 122) to the internal memory (104, 114) and storing floating-point values from the internal memory (104, 114) to the external memory (120, 122), the load and store unit (108, 118) comprising:

a first external to internal format conversion circuit (216) configured to convert at least one variable precision floating-point value loaded from the external memory (120, 122) from the Not Contiguous Posit variable precision floating-point format to the first floating-point format, and to store the result of the conversion to the internal memory (104, 114).

Example B6: in the circuit of example B4 or B5, the Not Contiguous Posit variable precision floating-point format for example comprises, for representing a number, either:

a flag bit having a first value, and a Custom Posit format comprising a sign bit (s), a regime bits field (RB) filled with bits of the same value, the length of the regime bits field indicating a scale factor (useedk) of the number and being bounded by an upper limit (lzoc_max), an exponent part of at least one bit and a fractional part of at least one bit; or the flag bit having a second value, and a default format representing the number, the default format having a sign bit (s), an exponent part of at least one bit and a fractional part of at least one bit;

wherein the first or second internal to external format conversion circuit (206, 207) comprises circuitry for computing an exponent size (ES) based on the Custom Posit format and comparing the exponent size (ES) of the Custom Posit format with an exponent size of the default format, and setting the value of the flag bit accordingly.

Example B7: a floating-point computation circuit comprising:

an internal memory (104, 114) storing one or more floating-point values in a first format;

a load and store unit (108, 118) for loading floating-point values from an external memory (120, 122) to the internal memory and storing floating-point values from the internal memory (104, 114) to the external memory (120, 122), the load and store unit (108, 118) comprising:
 a first internal to external format conversion circuit (206) configured to convert at least one of the floating-point values in the internal memory (104, 114) from the first format to the Modified Posit variable precision floating-point format.

Example B8: a floating-point computation circuit comprising:
an internal memory (104, 114) storing one or more floating-point values in a first format;
a load and store unit (108, 118) for loading floating-point values from an external memory (120, 122) to the internal memory (104, 114) and storing floating-point values from the internal memory (104, 114) to the external memory (120, 122), the load and store unit (108, 118) comprising:
 a first external to internal format conversion circuit (216) configured to convert at least one variable precision floating-point value loaded from the external memory (120, 122) from the Modified Posit variable precision floating-point format to the first floating-point format, and to store the result of the conversion to the internal memory (104, 114).

Example B9: in the circuit of example B7 or B8, the Modified Posit variable precision floating-point format for example comprises a sign bit (s), a regime bits field (RB) filled with bits of the same value, the length (lzoc) of the regime bits field indicating a scale factor (useedk) of the number and being bounded by an upper limit (lzoc_max), an exponent part of at least one bit and a fractional part of at least one bit, wherein the first or second internal to external format conversion circuit (206, 207) comprises circuitry for computing the parameter lzoc such that the exponent exp of the number is encoded by the following equation:

$$\exp = \begin{cases} +\left[\left(\sum_{i=1}^{lzoc} 2^{i+(K-2)+((S-1)\cdot(i-2))}\right) - 2^{(K-1)+((S-1)\cdot(i-2))}\right] + e & \text{if positive exponent} \\ -\left[\left(\sum_{i=1}^{lzoc} 2^{i+(K-1)+((S-1)\cdot(i-1))}\right)\right] + e & \text{if negative exponent} \end{cases}$$ [Math 26]

where K is the minimal exponent length, and S is the regime bits increment gap.

Example B10: in the circuit of any of the examples B1 to B9, the load and store unit (108, 118) further comprises:
 a second format conversion circuit configured to convert at least one of the floating-point values in the internal memory (104, 114) from the first format to a second variable precision floating-point format; and/or
 a third format conversion circuit configured to convert at least one variable precision floating-point value loaded from the external memory (120, 122) from a second variable precision floating-point format to the first floating-point format, and to store the result of the conversion to the internal memory (104, 114).

Finally, the practical implementation of the embodiments and variants described herein is within the capabilities of those skilled in the art based on the functional description provided hereinabove.

What is claimed is:
1. A floating-point computation circuit comprising:
 an internal memory storing one or more floating-point values in a first format;
 status registers defining a plurality of floating-point number format types associated with corresponding identifiers, each format type indicating at least a maximum size; and
 a load and store unit for loading floating-point values from an external memory to the internal memory and storing floating-point values from the internal memory to the external memory, the load and store unit being configured:
  to receive, in relation with a first store operation, a first floating-point value from the internal memory and a first of said identifiers; and
  to convert the first floating-point value from the first format to a first external memory format having a maximum size defined by the floating-point number format type designated by the first identifier.

2. The floating-point computation circuit of claim 1, wherein each maximum size is designated with a bit granularity.

3. The floating-point computation circuit of claim 1, wherein a floating-point number format type designated by a second of the identifiers corresponds to a second external memory format different to the first external memory format, the load and store unit comprising:
 a first internal to external format conversion circuit configured to convert floating-point values from the first format to the first external memory format; and
 a second internal to external format conversion circuit configured to convert floating-point values from the first format to the second external memory format.

4. The floating-point computation circuit of claim 3, wherein the load and store unit further comprises:
 a first demultiplexer configured to selectively supply the at least one floating-point value to a selected one of the first and second internal to external format conversion circuits; and
 a first multiplexer configured to selectively supply the converted value generated by the first or second internal to external format conversion circuit to the external memory, wherein the selections made by first demultiplexer and first multiplexer are controlled by a first common control signal.

5. The floating-point computation circuit of claim 3, wherein the load and store unit is configured to supply the at least one floating-point value to both of the first and second internal to external format conversion circuits, the load and store unit further comprising a control circuit configured to selectively enable either or both of the first and second internal to external format conversion circuits in order to select which is to perform the conversion.

6. The floating-point computation circuit of claim 3, wherein the load and store unit further comprises:
 a first external to internal format conversion circuit configured to convert at least one variable precision floating-point value loaded from the external memory from the first external memory format to the first format, and to store the result of the conversion to the internal memory; and
 a second external to internal format conversion circuit configured to convert at least one further value loaded from the external memory from the second external memory format to the first format, and to store the result of the conversion to the internal memory.

7. The floating-point computation circuit of claim 1, wherein the first external memory format is a Custom Posit variable precision floating-point format comprising, for representing a number, a sign bit, a regime bits field filled with bits of the same value, the length of the regime bits field indicating a scale factor of the number and being bounded by an upper limit, an exponent part of at least one bit and a fractional part of at least one bit, and wherein the load and store unit comprises circuitry for computing the upper limit.

8. The floating-point computation circuit of claim 1, wherein the first external memory format is of a type, such as the Not Contiguous Posit variable precision floating-point format, comprising, for representing a number, either:
- a flag bit having a first value, and a Posit or Custom Posit format comprising a sign bit, a regime bits field filled with bits of the same value, the length of the regime bits field indicating a scale factor of the number and being bounded by an upper limit, an exponent part of at least one bit and a fractional part of at least one bit; or
- the flag bit having a second value, and a default format representing the number, the default format having a sign bit, an exponent part of at least one bit and a fractional part of at least one bit;
- wherein the load and store unit comprises circuitry for computing an exponent size based for example on the Custom Posit format, and comparing the exponent size with an exponent size of the default format, and setting the value of the flag bit accordingly.

9. The floating-point computation circuit of claim 1, wherein the first external memory format is a Modified Posit variable precision floating-point format comprising a sign bit, a regime bits field filled with bits of the same value, a length lzoc of the regime bits field indicating a scale factor of the number and being bounded by an upper limit, an exponent part of at least one bit and a fractional part of at least one bit, wherein the load and store unit comprises circuitry for computing the length lzoc such that the exponent exp of the number is encoded by the following equation:

$$\exp = \begin{cases} +\left[\left(\sum_{i=1}^{lzoc} 2^{i+(K-2)+((S-1)\cdot(i-2))}\right) - 2^{(K-1)+((S-1)\cdot(i-2))}\right] + e & \text{if positive exponent} \\ -\left[\left(\sum_{i=1}^{lzoc} 2^{i+(K-1)+((S-1)\cdot(i-1))}\right)\right] + e & \text{if negative exponent} \end{cases}$$

where K represents the minimal exponent length when the size of the regime bits field equals one bit, and S represents the regime bits increment gap.

10. The floating-point computation circuit of claim 3, wherein the first external memory format is a first variable precision floating-point format, and the second external memory format is a second variable precision floating-point format different to the first variable precision floating-point format.

11. The floating-point computation circuit of claim 10, wherein the first variable precision floating-point format and/or the second variable precision floating-point format supports both unbiased and biased exponent encoding.

12. The floating-point computation circuit of claim 1, wherein the floating-point number format type designated by the first identifier corresponds to a first external memory format, a floating-point number format type designated by a second of the identifiers corresponds to a second external memory format different to the first external memory format, and a floating-point number format type designated by a third of the identifiers corresponds to a third external memory format different to the first and second external memory formats.

13. The floating-point computation circuit of claim 1, further comprising a floating-point unit configured to perform a floating-point arithmetic operation on at least one floating-point value stored by the internal memory, wherein the floating-point unit comprises the load and store unit or is configured to communicate therewith.

14. A method of floating-point computation comprising:
- storing, by an internal memory of a floating-point computation device, one or more floating-point values in a first format;
- loading, by a load and store unit of a floating-point computation device, floating-point values from an external memory to the internal memory, and storing, by the load and store unit, a first floating-point value from the internal memory to the external memory, wherein the load and store unit is configured to perform said storing by:
  - receiving, in relation with a first store operation, the first floating-point value from the internal memory and a first identifier;
  - obtaining, from status registers defining a plurality of floating-point number format types associated with corresponding identifiers, at least a maximum size associated with the first identifier; and
  - converting the first floating-point value from the first format to an external memory format having a maximum size defined by the floating-point number format type designated by the first identifier.

15. The method of claim 14, wherein the floating-point number format type designated by the first identifier corresponds to a first external memory format, and the load and store unit is configured to perform said converting by:
- converting, by a first internal to external format conversion circuit, the first floating-point value from the first format to the first external memory format; and wherein the method further comprises:
- receiving, by the load and store unit in relation with a second store operation, a second floating-point value from the internal memory and a second identifier;
- obtaining, from the status registers, at least a maximum size associated with the second identifier; and
- converting, by a second internal to external format conversion circuit, the second floating-point value from the first format to a second external memory format having a maximum size defined by the floating-point number format type designated by the second identifier.

16. The method of claim 15, wherein the load and store unit is configured to perform said loading by:
- converting, by a first external to internal format conversion circuit, at least one variable precision floating-point value loaded from the external memory from the first external memory format to the first floating-point format and storing the result of the conversion to the internal memory; and
- converting, by a second external to internal format conversion circuit, at least one further value loaded from the external memory from the second external memory format to the first floating-point format, and storing the result of the conversion to the internal memory.

17. The method of claim 14, further comprising performing, by a floating-point unit, a floating-point arithmetic operation on at least one floating-point value stored by the internal memory.

\* \* \* \* \*